United States Patent
Ryan et al.

(10) Patent No.: US 9,989,624 B2
(45) Date of Patent: *Jun. 5, 2018

(54) SYSTEM AND METHOD FOR ESTIMATING THE POSITION AND ORIENTATION OF A MOBILE COMMUNICATIONS DEVICE IN A BEACON-BASED POSITIONING SYSTEM

(71) Applicant: ABL IP HOLDING LLC, Conyers, GA (US)

(72) Inventors: Daniel Ryan, San Francisco, CA (US); Kelby Edward Green, Boston, MA (US); Emanuel Paul Malandrakis, Boston, MA (US); Konstantin Klitenik, Cambridge, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/066,656

(22) Filed: Mar. 10, 2016

(65) Prior Publication Data

US 2016/0195605 A1    Jul. 7, 2016

Related U.S. Application Data

(63) Continuation of application No. 14/823,074, filed on Aug. 11, 2015, now Pat. No. 9,594,152.
(Continued)

(51) Int. Cl.
*H04B 10/116* (2013.01)
*G01S 5/16* (2006.01)
(Continued)

(52) U.S. Cl.
CPC .............. *G01S 5/16* (2013.01); *G01C 21/206* (2013.01); *H04B 10/116* (2013.01);
(Continued)

(58) Field of Classification Search
None
See application file for complete search history.

(56) References Cited

U.S. PATENT DOCUMENTS 6,964,107 B1 * 11/2005 Ahola .................... G01C 17/28
33/355 R
7,969,297 B2    6/2011 Haartsen et al.
(Continued)

FOREIGN PATENT DOCUMENTS

WO    2014064431         5/2014
WO    2015049614 A1      4/2015

OTHER PUBLICATIONS

Notice of Allowance for U.S. Appl. No. 14/823,074, dated Oct. 28, 2016, 5 pages.
(Continued)

*Primary Examiner* — Li Liu
(74) *Attorney, Agent, or Firm* — RatnerPrestia

(57) ABSTRACT

An example of a technique for compensating for effects of Earth's magnetic field variations on a mobile device positioning system. A mobile device utilizes a compass to obtain an absolute heading when located relative to a visible light source. The mobile device obtains a heading correction value based on an identifier of the visible light source. An orientation of a map displayed on the mobile device is rotated based on the absolute heading and the heading correction value in order to provide an indication of a location of the mobile device properly oriented on the map.

13 Claims, 65 Drawing Sheets

Related U.S. Application Data

(60) Provisional application No. 62/036,254, filed on Aug. 12, 2014.

(51) Int. Cl.

| | |
|---|---|
| *H04W 4/04* | (2009.01) |
| *H05B 33/08* | (2006.01) |
| *H04W 4/02* | (2018.01) |
| *G01C 21/20* | (2006.01) |
| *H04B 10/114* | (2013.01) |

(52) U.S. Cl.
CPC ..... *H04B 10/1141* (2013.01); *H04B 10/1149* (2013.01); *H04W 4/02* (2013.01); *H04W 4/026* (2013.01); *H04W 4/04* (2013.01); *H05B 33/0845* (2013.01)

(56) References Cited

U.S. PATENT DOCUMENTS

| | | | |
|---|---|---|---|
| 8,768,171 B2 | 7/2014 | Schenk | |
| 9,564,966 B1* | 2/2017 | Breuer | H04B 10/0795 |
| 2004/0061676 A1 | 4/2004 | Sitrick | |
| 2005/0213109 A1 | 9/2005 | Schell et al. | |
| 2006/0058928 A1 | 3/2006 | Beard | |
| 2006/0132939 A1* | 6/2006 | Blank | B60R 1/12 |
| | | | 359/838 |
| 2007/0264023 A1 | 11/2007 | Gorrell | |
| 2008/0281515 A1 | 11/2008 | Ann et al. | |
| 2009/0171571 A1 | 7/2009 | Son et al. | |
| 2009/0243932 A1 | 10/2009 | Moshfeghi | |
| 2009/0284366 A1 | 11/2009 | Haartsen | |
| 2011/0106474 A1* | 5/2011 | Kulik | G01C 17/38 |
| | | | 702/92 |
| 2011/0153201 A1 | 6/2011 | Park | |
| 2012/0143639 A1 | 6/2012 | Rollert | |
| 2012/0257050 A1* | 10/2012 | Simon | G01S 11/12 |
| | | | 348/135 |
| 2013/0026942 A1 | 1/2013 | Ryan et al. | |
| 2013/0027528 A1 | 1/2013 | Staats et al. | |
| 2013/0027576 A1* | 1/2013 | Ryan | H04N 5/3532 |
| | | | 348/222.1 |
| 2013/0028475 A1 | 1/2013 | Ganick | |
| 2013/0141554 A1 | 6/2013 | Ganick et al. | |
| 2013/0141555 A1 | 6/2013 | Ganick et al. | |
| 2013/0208132 A1 | 8/2013 | Ryan | |
| 2013/0247117 A1* | 9/2013 | Yamada | G08C 17/02 |
| | | | 725/93 |
| 2013/0251365 A1 | 9/2013 | Sone | |
| 2014/0130361 A1* | 5/2014 | Oliver | G01C 17/38 |
| | | | 33/301 |
| 2014/0171107 A1* | 6/2014 | Kao | G01C 21/206 |
| | | | 455/456.1 |
| 2014/0180627 A1* | 6/2014 | Naguib | G01C 17/38 |
| | | | 702/150 |
| 2014/0241730 A1 | 8/2014 | Jovicic | |
| 2014/0286644 A1 | 9/2014 | Oshima | |
| 2014/0372072 A1* | 12/2014 | Guo | H04B 10/116 |
| | | | 702/150 |
| 2015/0153160 A1* | 6/2015 | James | H04W 4/043 |
| | | | 356/51 |
| 2015/0188632 A1 | 7/2015 | Aoyama | |
| 2015/0189149 A1 | 7/2015 | Oshima | |
| 2015/0310310 A1 | 10/2015 | Hesch | |
| 2015/0356482 A1 | 12/2015 | Whipple | |
| 2016/0094830 A1 | 3/2016 | Taubin | |
| 2016/0119761 A1 | 4/2016 | Ryan | |

OTHER PUBLICATIONS

Non Final Office Action for U.S. Appl. No. 14/990,163, dated Apr. 7, 2017, 30 pages.
Non Final Office Action for U.S. Appl. No. 14/989,843, dated Apr. 10, 2017, 21 pages.
Notice of Allowance for U.S. Appl. No. 14/990,196, dated Apr. 11, 2017, 16 pages.
Han et al., White LED Ceiling Lights Positioning Systems for Optical Wireless Indoor Applications, ECCC 2010, Sep. 19-23, 2010, pp. 1-3.
Non Final Office Action for U.S. Appl. No. 14/990,259, dated Mar. 29, 2017, 33 pages.
Non Final Office Action dated May 9, 2016 for U.S. Appl. No. 14/823,074, entitled "System and Method for Estimating the Position and Orientation of a Mobile Communications Device in a Beacon-Based Positioning System."
International Search Report and Written Opinion for International patent Application No. PCT/US15/44667, dated Feb. 23, 2016.
Entire Patent Prosecution History of U.S. Appl. No. 14/823,074, filed Aug. 11, 2015, entitled "System and Method for Estimating the Position and Orientation of a Mobile Communications Device in a Beacon-Based Positioning System."
Notice of Allowance for U.S. Appl. No. 14/990,196, dated Jul. 25, 2017, 6 pages.
Notice of Allowance for U.S. Appl. No. 14/990,259, dated Jul. 25, 2017, 6 pages.
Notice of Allowance for U.S. Appl. No. 14/989,843, dated Sep. 13, 2017, 7 pages.
Non Final Office Action for U.S. Appl. No. 15/066,602, dated Sep. 21, 2017, 35 pages.
Final Office Action for U.S. Appl. No. 14/990,163, dated Sep. 15, 2017, 25 pages.
Non Final Office Action for U.S. Appl. No. 15/048,490, dated Nov. 1, 2017, 46 pages.
Extended European Search Report for European Application No. 15832012.7, dated Mar. 2, 2018, 15 pages.
Notice of Allowance for U.S. Appl. No. 15/066,602, dated Feb. 16, 2018, 9 pages.

* cited by examiner

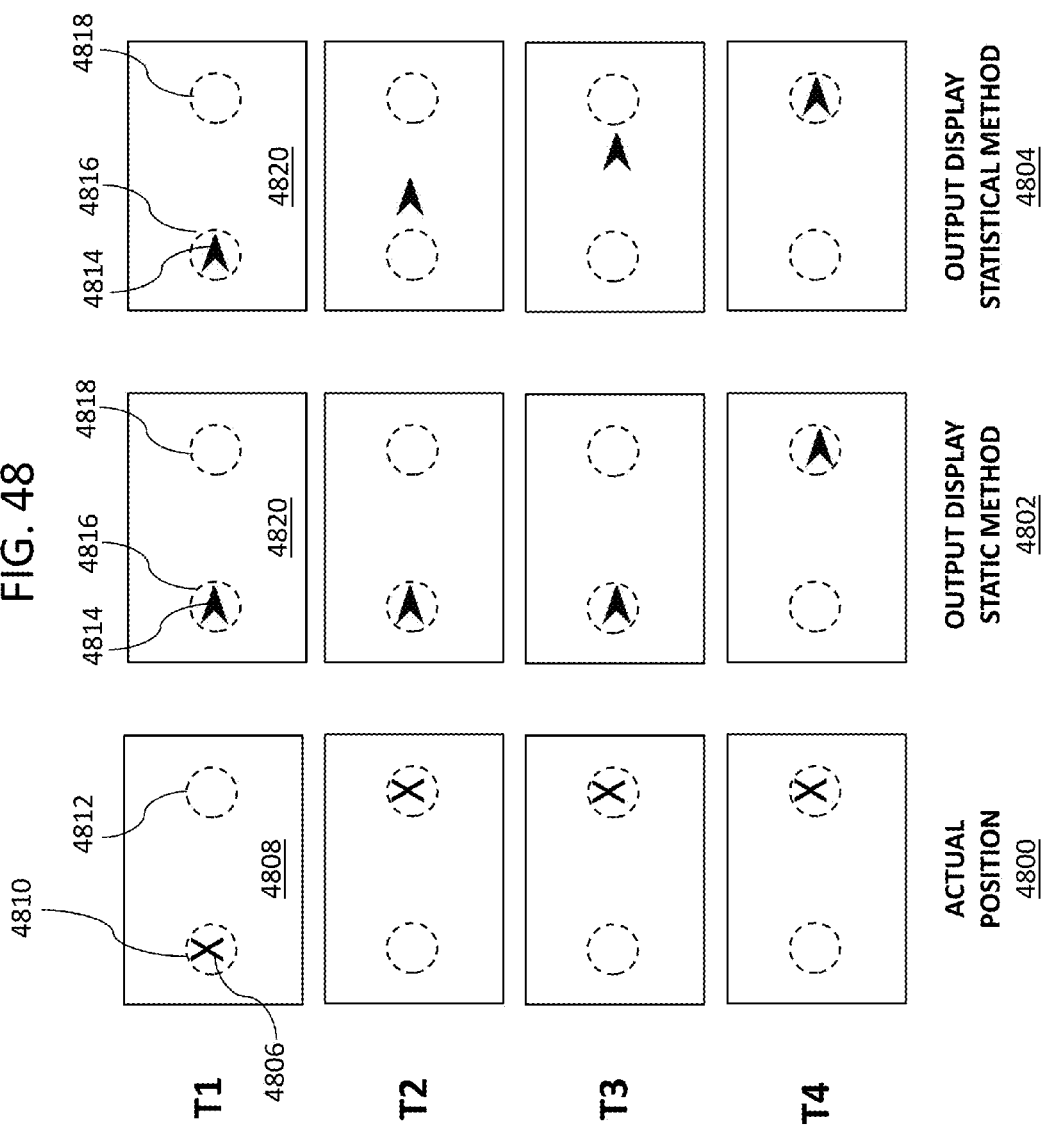

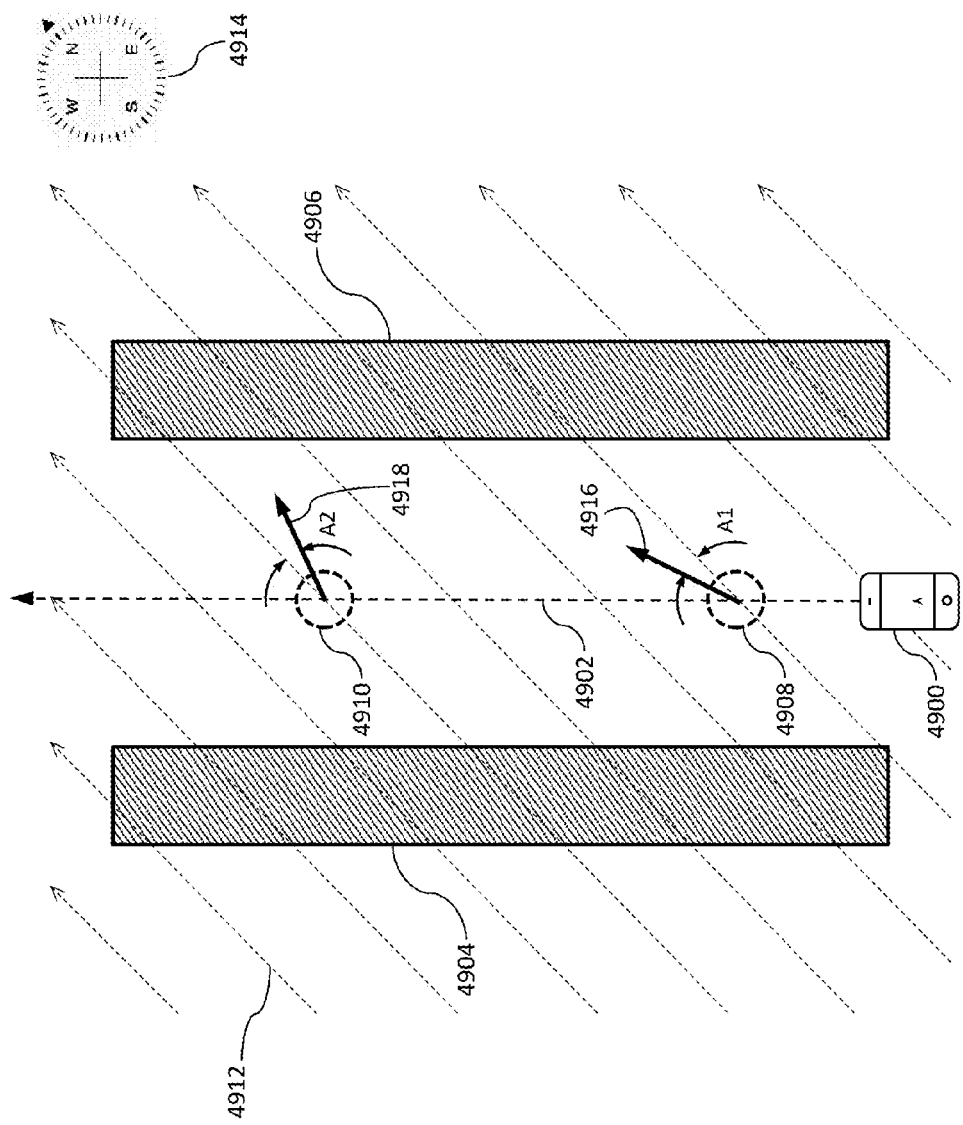

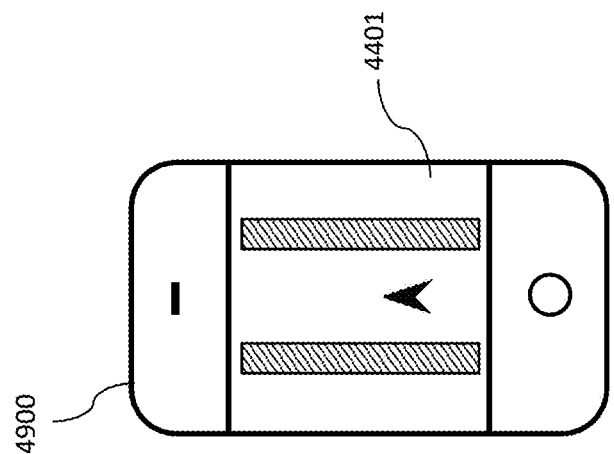
FIG. 51B
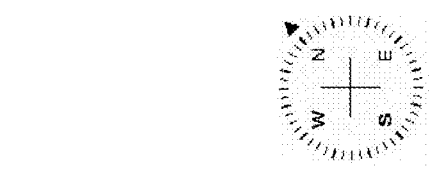
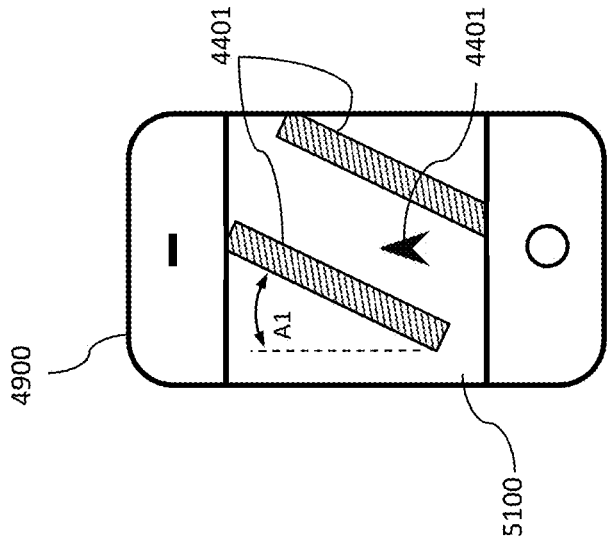
FIG. 51A

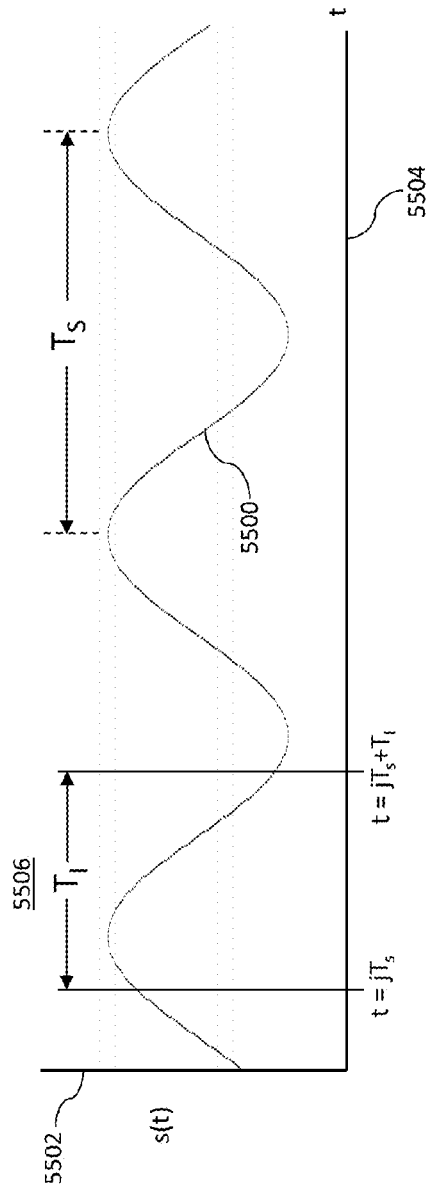
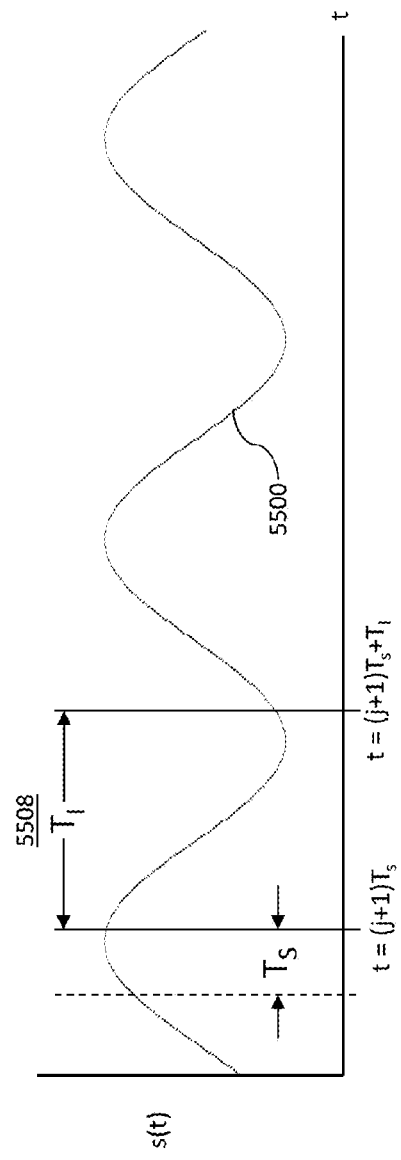
FIG. 55A
FIG. 55B

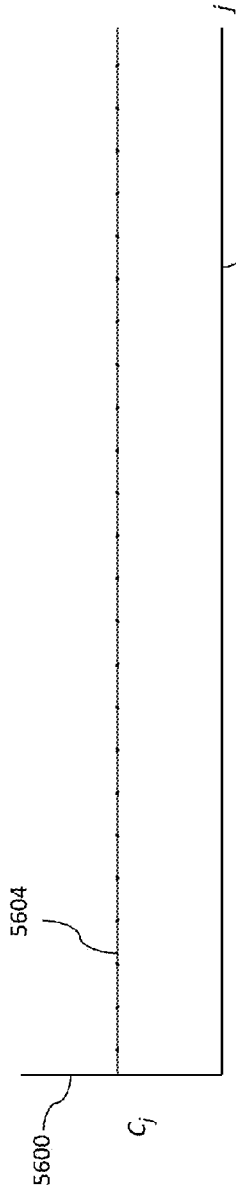
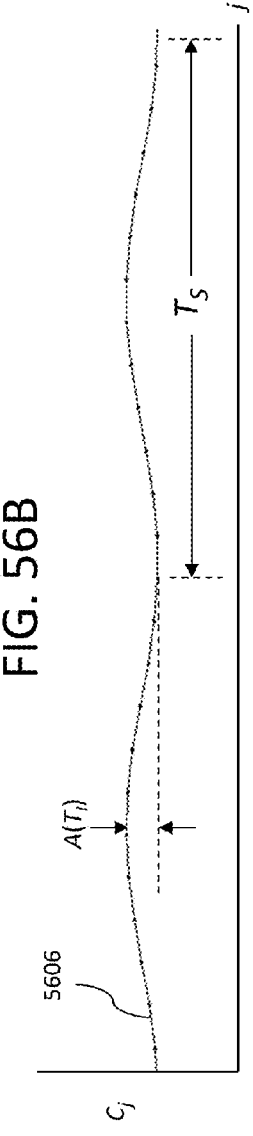
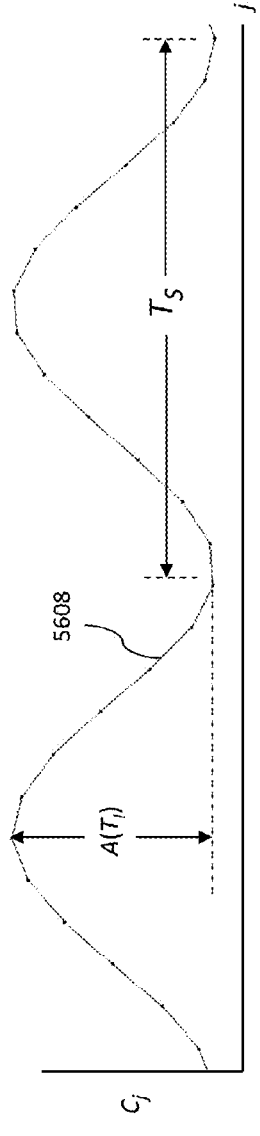

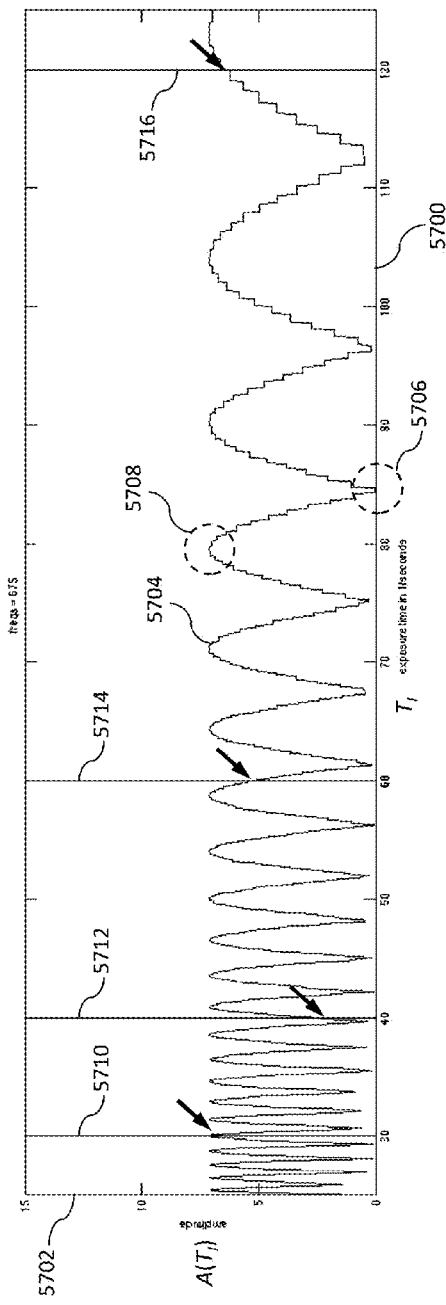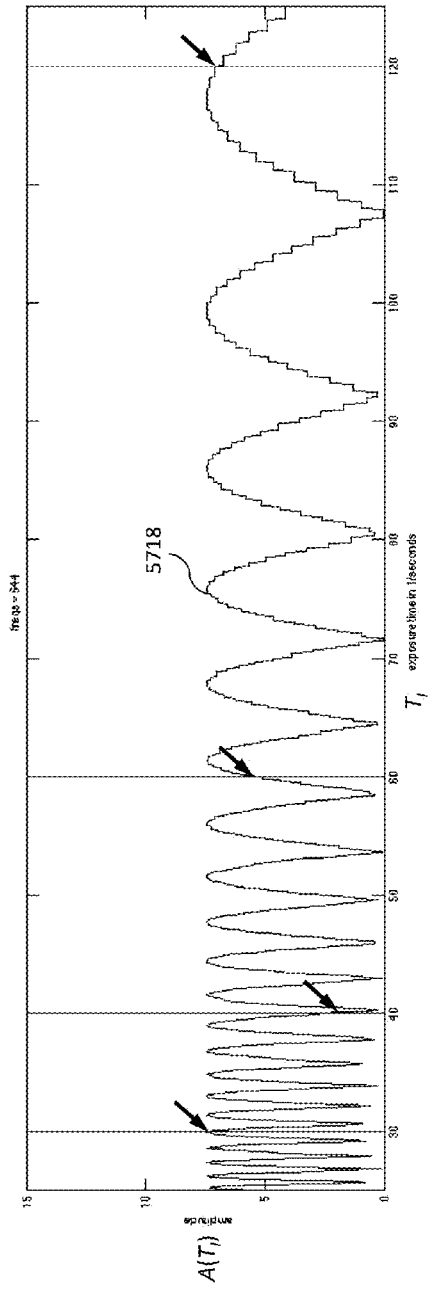
FIG. 57A
FIG. 57B

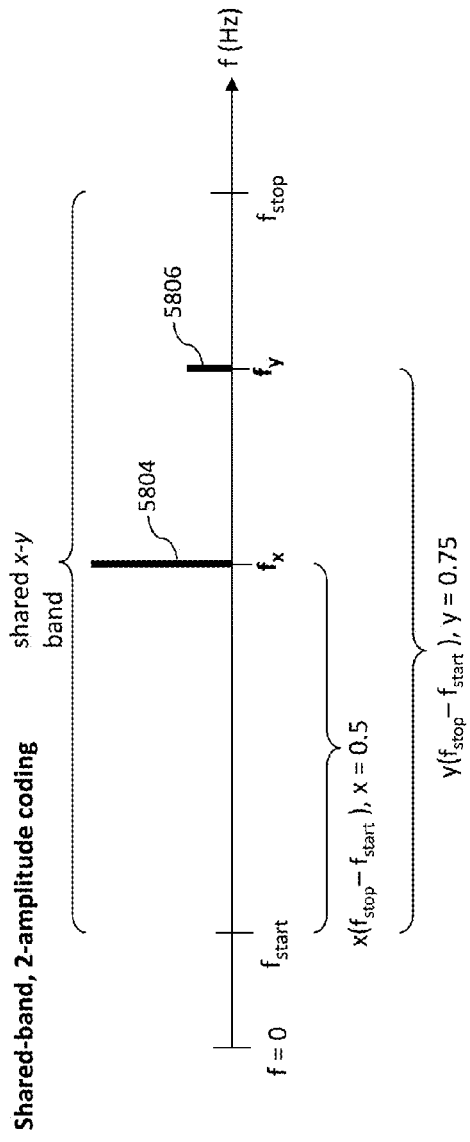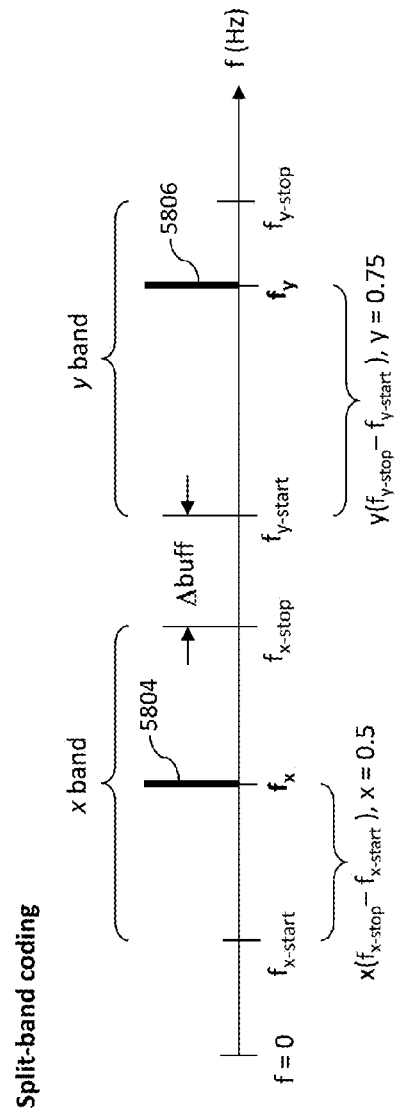

Shared-band, three-frequency coding: permitted ranges for $f_x$, $f_{y\text{-plus}}$, and $f_{y\text{-minus}}$ Shared-band, three-frequency coding: (x, y) = (0.5, 0.25)

SYSTEM AND METHOD FOR ESTIMATING THE POSITION AND ORIENTATION OF A MOBILE COMMUNICATIONS DEVICE IN A BEACON-BASED POSITIONING SYSTEM

RELATED APPLICATION

This application is a continuation of U.S. patent application Ser. No. 14/823,074 filed Aug. 11, 2015, entitled "SYSTEM AND METHOD FOR ESTIMATING THE POSITION AND ORIENTATION OF A MOBILE COMMUNICATIONS DEVICE IN A BEACON-BASED POSITIONING SYSTEM," the disclosure of which also is entirely incorporated herein by reference.

U.S. patent application Ser. No. 14/823,074 claims the benefit of U.S. Provisional Application No. 62/036,254 filed Aug. 12, 2014, entitled "SYSTEM AND METHOD FOR ESTIMATING THE POSITION AND ORIENTATION OF A MOBILE COMMUNICATIONS DEVICE IN A BEACON-BASED POSITIONING SYSTEM," the disclosure of which also is entirely incorporated herein by reference.

FIELD OF THE INVENTION

This disclosure relates generally to a system and method for estimating the position and orientation of a mobile device with respect to a light-based positioning system.

BACKGROUND

Described herein are techniques for estimating the position and orientation of a light-detecting mobile communications device (e.g., cellular telephone, tablet computer, wearable computing device, electronically enhanced eyeglasses) by identifying light beacons in the vicinity of the mobile device and by compensating at least in part for motion of the mobile device, the presence of visual noise, and local irregularities in the Earth's magnetic field.

Indoor positioning services relate to methods in which networks of devices and algorithms are used to locate mobile devices within buildings. Indoor positioning is regarded as a key component of location-aware mobile computing and is a critical element in providing augmented reality (AR) services. Location-aware computing relates to applications that utilize a mobile device user's location to provide content relevant to that location. Additionally, AR is a technology that overlays a virtual space onto a real (physical) space. To successfully enable AR and location-aware computing, accurate indoor positioning is a key requirement. Moreover, indoor positioning and AR services may include displaying on a user's mobile device in real time a spatial map which includes "you are here" information; such information not only should be accurate enough to assist user navigation (e.g., in a retail space) but should be presented in a manner that is clear and agreeable to the user.

Signals from Global Positioning System (GPS) satellites lose significant power when passing through construction materials, and suffer from multi-path propagation effects that make GPS unsuitable for indoor environments. Techniques based on received signal strength indication (RSSI) from WiFi and Bluetooth wireless access points have also been explored for indoor positioning. However, complex indoor environments cause radio waves to propagate in dynamic and unpredictable ways, limiting the accuracy of positioning systems based on RSSI. Ultrasonic techniques, which transmit acoustic waves to microphones, can also be used to approximate indoor position. However, ultrasonic sound waves operate at lower frequencies than systems based on WiFi and attenuate significantly when passing through walls. This attenuation, which limits the spatial reach of waves from an ultrasound source, potentially makes ultrasonic techniques more accurate than WiFi or Bluetooth techniques.

Optical indoor positioning techniques use optical signals, either visible or infrared, and can be used to accurately locate mobile devices indoors. These are more accurate than the approaches mentioned previously, since optical signals are highly directional and cannot penetrate solid objects. However, several limitations, drawbacks, or potential sources of error in optical indoor positioning techniques may need to be addressed.

These include, firstly, a need to reduce noise in the signal derived by a mobile device from images or ambient light levels. Any scheme to detect a signal mixed with noise is made more reliable by reduction of the noise. In particular, an illustrative light-source detection scheme described herein, according to various embodiments of the invention, depends on the detection of spectral peaks (i.e., peaks in the frequency domain) that correspond to identification signals emitted by light sources. The spectrum of a digital image (or other data obtained by sensing light, whether using an image-forming camera, a non-image-forming sensor, or both) is estimated by calculating a Fast Fourier Transform (FFT) of the image or a signal derived by averaging from the data. Each light source emits light having an at least locally unique spectrum whose distinct features (e.g., peaks) constitute the identification code (ID) of that light. ID detection depends on the identification of patterns of peaks that may be obscured or rendered ambiguous by noise in the signal. In essence, signal-to-noise ratio must exceed some threshold for detection to be possible.

A second limitation of indoor positioning that may be addressed is the presentation of location information in a user-friendly way. In a beacon-based positioning system that may show a user of a mobile device their approximate position and orientation on a map displayed on the mobile device, sudden movement of the user's position indicator from one point to another (e.g., from one beacon location to another beacon location, or to the centroid of two or more beacon locations) tends to be disconcerting or irksome to the user. It is therefore desirable to form an estimate of a user's position that moves smoothly, or nearly so, between points on a map.

Thirdly, it is desirable that usefully accurate orientation information be delivered to users of an indoor position system, including the bearers of mobile devices who may be viewing maps of their spatial context on their device displays. Many mobile devices contain a compass or magnetometer that provides heading or orientation information by sensing the Earth's magnetic field. However, in portions of many indoor spaces, the Earth's magnetic field may, in effect, be locally distorted by the proximity of masses of metal or devices that generate magnetic fields. In such areas, raw device measurements of orientation may be misleading. It is therefore desirable to assure that a user's map is accurately oriented.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 48 depicts the motion of a mobile device in a physical space and the representation of that motion according to two methods of estimating the device's position.

FIG. 49 depicts the relationship of a mobile device to the Earth magnetic field and to a locally perturbed magnetic field.

FIG. 51A depicts an incorrect map orientation on a mobile device caused by a local perturbation of the Earth magnetic field.

FIG. 51B depicts a correct map orientation on a mobile device after compensation a local perturbation of the Earth magnetic field.

FIG. 55A depicts the relationship of sinusoidal brightness signal to a rolling shutter exposure interval.

FIG. 55B depicts the relationship of sinusoidal brightness signal to another rolling shutter exposure interval.

FIG. 56A depicts the contribution of a sinusoidal brightness signal to rows of pixels in a rolling shutter image when the exposure interval equals the period of the sinusoid.

FIG. 56B depicts the contribution of a sinusoidal brightness signal to rows of pixels in a rolling shutter image when the exposure interval only approximately equals the period of the sinusoid.

FIG. 56C depicts the contribution of a sinusoidal brightness signal to rows of pixels in a rolling shutter image when the exposure interval is distinct from the period of the sinusoid.

FIG. 57A depicts the amplitude of a sinusoidal brightness signal, frequency 675 Hz, detected in a rolling shutter image for a range of exposure durations.

FIG. 57B depicts the amplitude of a sinusoidal brightness signal, frequency 644 Hz, detected in a rolling shutter image for a range of exposure durations.

FIG. 58B depicts the encoding of the location of the light source in FIG. 58A using a first position-encoding method according to various embodiments of the invention.

FIG. 58C depicts the encoding of the location of the light source in FIG. 58A using a second position-encoding method according to various embodiments of the invention.

DETAILED DESCRIPTION

Figure 1:
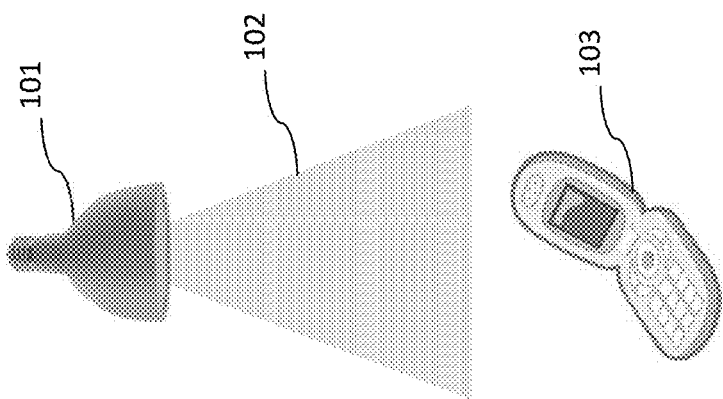
FIG. 1 is a representation of a mobile device receiving light from a LED light source.

The present disclosure relates, for example, to a method for frequently updating an estimate of a mobile device's position with respect to one or more beacon light sources. The method, in some examples, updates a device position estimate (e.g., a two-dimensional position estimate) as a sum of weighted position vectors derived from detections by the device of beacons having previously determined locations. A light-sensing apparatus (e.g., forward-facing camera, rear-facing camera, and/or other light-sensing device comprised by the mobile device) of the mobile device is employed, in various examples, to acquire digital images (or non-image data) at a certain frame rate; the images are processed in a manner described herein in order to detect the presence of one or more beacon light sources; and an estimate of the mobile device's position is modified (updated) based on the one or more beacon light sources detected. Updates to the position estimate may be made at a rate limited by the image frame acquisition rate of the mobile device. The position estimate changes discretely both in time (i.e., upon beacon detection in image frames) and in space (by vector increments based on beacon detections), but in general, the position estimate will be perceived by a user as changing smoothly or nearly so. Herein, "camera" is to be construed broadly as referring, as appropriate, not only to image-sensing devices but to all optical sensors capable of acquiring data that contain light-encoded information. Also, herein "image" is to be construed broadly as referring, as appropriate, to any data set, however obtained, that may contain light-encoded information.

Various examples employ noise reduction techniques in images to enable more sensitive and accurate detection of beacon light sources as a basis for position-estimate updating. Such techniques include, but are not limited to, (a) background subtraction employing multiple images of a single scene or portions thereof and (b) deliberate defocusing of images to mitigate the potentially confounding presence of regular patterns. Defocusing effectively increases signal-to-noise ratio in various embodiments of the present invention.

Other various examples enable correction of a mobile device's sensed orientation (e.g., compass heading) by information contained in a server. The correction to be applied may vary with the estimated location of the mobile device (e.g., in different parts of a retail space) and with time, as local deviations from the earth magnetic field may change when equipment, wiring, and the like are installed or repositioned. A local correction to be applied may also be specific to the particular model of mobile device in question, as different device models may experience different deviation errors even under identical environmental conditions.

Various examples employ adaptive, crowd-sourced data collection from one or more mobile devices to update the corrections to be applied to the compass headings of one or more models of mobile device.

In another example, the frequencies of signals transmitted by light sources are "swept" or varied through time, either continuously or in discrete increments, in order to assure robust detection of the signals regardless of the exposure parameters independently selected by a mobile device (e.g., exposure time of a photograph of video frame).

In another example, the physical coordinates of a light source are encoded by modulating the output of the light source. Such encoding may be achieved by a variety of methods in various embodiments: such methods include, but are not limited to, (a) the simultaneous modulation of light-source brightness by two sinusoids of different frequency and amplitude in a single frequency band, (b) the simultaneous modulation of light-source brightness by two sinusoids of different frequency and amplitude in two non-overlapping frequency bands, or (c) the simultaneous modulation of light-source brightness by three sinusoids of different frequency in a single frequency band. The frequencies of such positional information signals may be "swept" or varied through time, either continuously or in discrete increments, in order to mitigate the effects of destructive interference by multiple lights illuminating overlapping areas and so facilitate robust detection of the signals. The duration and other aspects of such sweeping may be varied in a random or pseudorandom manner in order to minimize or substantially eliminate destructive interference at any point in the working space of the system.

Thus, various examples provide for the frequent, robust, and adaptive updating of both absolute position information and orientation information for mobile devices in a beacon-based positioning system. It is among the advantages realized by the invention that a user of a mobile device in the operating space will, in general, be offered a more timely, easily-observed estimate of their location and a more accurate estimate of their device orientation than would offered using conventional techniques.

Systems and methods are provided that disclose providing a positioning service for devices based on light received from one or more light sources. This light-based positioning service uses light information transmitted by each light source to determine the position of the device. The device captures the one or more light sources and is then able to detect the information transmitted by each of the light sources. The light information may include an identification code that is used to identify the position of the light source. By capturing more than one light source on the device the accuracy of the device's position may be improved. The position information may then be used to provide relevant content information to the user. The light sources are each independent beacons that transmit individual identification information through light.

In some embodiments light sources are used to provide an indoor positioning service to mobile devices. Each light source is given an identification code, corresponding to an associated database, which contains information that ties the light source to specific location data. The identification codes are broadcasted through visible light by modulating the LED light source. The modulation occurs at speeds that are undetectable by the human eye, yet appropriate to be received by a camera equipped mobile device. The mobile device receives the identification information, and uses it to lookup its indoor position in the form of location data. Since the identification information is transmitted through visible light, which is highly directional, the mobile device is known to be within the line of sight of the LED light source. Since the indoor position of the LED light source is known from building floor plans and lighting plans, the corresponding indoor position of the mobile device can be determined.

Another embodiment describes a scenario where a mobile device is in view of three or more LED light sources. Each source emits unique identification information and, with knowledge of the relative positions of each LED light source, one can calculate the device's relative position in three dimensions. This process utilizes photogrammetric image processing techniques to identify and calculate coordinates for the positions of the light sources in order to relatively locate the mobile device.

Yet another embodiment includes a system by which a mobile device 103 may receive content based upon identification information received from either one or more LED light sources. The identification information is used to access a database that correlates LED lights and content. An example of such a use case is a mobile device user in a museum, who receives identification information from a light source illuminating an exhibit, and then uses the received identification information to obtain additional content about the exhibit.

FIG. 1 represents a mobile device 103 receiving light 102 from a LED light source 101. The LED light source 101 may be any lighting source used for general purpose, spot illumination, or backlighting. The LED light source may come in several form factors but is not limited to: Edison screw in, tube style, large and small object backlighting, or accent lighting spots and strips. For the purposes of this disclosure, any form of LED light is considered as a potential source capable of transmitting information.

Light 102 is a modulated LED light source 101, and is part of the visible electromagnetic wireless spectrum. LEDs are considered digital devices which may be rapidly switched on and off, to send signals above the rate that the human eye can see. This allows them to be exploited to send digital data through the visible light itself. By modulating the LEDs, turning them on and off rapidly, one may send digital information that is unperceivable to the human eye, but is perceivable by applicable sensors, including but not limited to image sensors and other types of photosensors.

There are many modulation techniques used to send information through light 102. One technique, "On Off Keying" (OOK), is a scheme to transmit digital data by rapidly switching a signal source on and off. OOK is the simplest form of amplitude-shift keying (ASK) which is a modulation technique that represents digital data through either the presence or absence of a carrier wave. When communicating with visible light, the carrier wave takes the form of the transmitted light signal. Therefore at a rudimentary level, when the light signal is turned "on" a digital "one" is perceived, and when the light signal is turned "off" a "zero" is perceived. Furthermore the rate at which the light signal is turned on and off represents the modulation frequency. Note that regardless of changing the modulation frequency, the "carrier wave" remains unchanged as this is an inherent property of the light itself. For example the carrier wave corresponding to a blue light signal is uniquely different than the carrier wave corresponding to a red light signal. While these two signals differ only in the wavelength specific to their perceived color, they can be perceived as two discrete signals.

In addition to OOK, another possible technique is defined as "Digital Pulse Recognition" (DPR). This modulation technique exploits the rolling shutter mechanism of a complementary metal-oxide-semiconductor (CMOS) image sensor. Due to their superior energy efficiency, CMOS sensors are preferred to charge-coupled device (CCD) sensors on mobile devices. When a CMOS image sensor with a rolling shutter takes an image, it does not expose the entire image simultaneously. Instead, the rolling shutter partially exposes different portions of the frame at different points in time. Typically, this causes various unwanted effects: skew, wobble, and partial exposure. In the presence of an LED light driven by a pulse width modulated signal, images received from a CMOS sensor exhibit "residual banding" in the form of visible distortions. The image appears to have alternating dark/white stripes. The stripes are a direct result of the rolling shutter mechanism, and their width is proportional to the frequency of the pulse width modulated (PWM) signal. Higher frequencies correspond to narrower stripes, and lower frequencies result in wider stripes. Practical frequency ranges for use with this technique are between 60 Hz and 5000 Hz. This technique allows one to exploit the rolling shutter mechanism to recover digital data from an optically encoded signal.

DPR has the potential for much higher data rates than both OOK and frequency shift keying (FSK). In FSK and OOK, the camera's frame rate limits the data rate. The highest possible data rate is half of the frame rate, since each symbol spans over two frames. In DPR modulation, a single frame is sufficient for capturing the transmitted symbol. Furthermore, symbols are not "binary"—there are can be as many as 30 different possibilities for a symbol.

In the DPR modulation scheme, image processing is used to measure the stripe width of the recorded image. By successively changing the LED driver frequency for each frame, information is essentially transmitted through recognition of the band widths. In the current design, 10 separate frequencies are used. For a 30 frames per second (FPS) camera, this corresponded to an effective data transfer rate of ~100 bits per second (bps).

Both of these techniques are interesting because they can allow the transmission of information through single color light sources, instead of having to create lighting sources which contain multiple color lights. In the world of LED lighting products, white light is majorly achieved by layering a phosphorous coating on top of blue LEDs. The coating creates the visible perception of "white" light, instead of blue. The alternative to this can be achieved through combining red, green, and blue LED lights; however this approach is expensive and power inefficient as the lumens per watt properties differ between different colored LEDs. Blue LEDs are generally more energy efficient than their red and green counterparts, which is why they are used in most commercial LED lighting products. It is because of this reason that it makes the most sense to use a data modulation technique that uses a single wavelength of light, rather than multiple, because this complies with LED lighting products.

In addition to LED light sources, other types of light sources are also capable of transmitting information through modulation. Alternative incandescent and fluorescent technologies can also be exploited to achieve data transmission, however the circuitry is more complex because the turn-on and turn-off times of incandescent and fluorescent lights are subject to additional factors.

The modulation frequency of the light source is highly dependent on the receiving circuitry. While incandescent and fluorescent technologies generally do not "flicker" on and off during the course of normal operation, LED lighting sources are sometimes designed to flicker above the rate which the eye can see in order to increase their longevity, and consume less power. Most humans cannot see flicker above 60 Hz, but in rare instances can perceive flicker at 100 Hz to 110 Hz. To combat this, lighting manufacturers design flicker above 200 Hz into their lighting products.

Mobile device 103 may be a smart mobile device and is most commonly found in the form of mobile phones, tablets, and portable laptop computers. In order for a mobile device 103 to receive information 102 from the LED light source 101 it has an embedded or attached sensor which is used to receive the incoming light 102 signals. One such sensor is a camera, which has a typical frame refresh rate between fifteen and sixty frames per second (fps). The fps is directly related to the speed at which optical signals can be transmitted and received by the camera. The sensor may capture a number of successive image frames that may later be analyzed to determine if a light source is providing information through light.

Mobile device 103 may include a processor, module, memory, and sensor in order to capture and analyze light received from light sources. The mobile device may analyze the successive image frames captured by the sensor by using the module. The module may be logic implemented in any combination of hardware and software. The logic may be stored in memory and run by processor to modify the successive images and analyze the successive images to determine information encoded in the light of one or more light sources. The module may be built in to the mobile device to provide the capabilities or it may be downloaded and installed. The module may be an application that runs on the mobile device when selected by a user. The module may also be used to receive content and other information related to the position of the mobile device and to provide this content to other modules or to the mobile device.

The reception of optically transmitted information is particularly interesting when used as an indoor positioning system. In a light-based positioning system, the physical locations of light sources may be used to approximate the relative position of a mobile device 103 within line of sight. On the mobile side, in addition to a receiving module, the mobile device 103 may use information to determine position of the mobile device. The mobile device may access a data source containing information about where the lights are physically located to determine position. This data source may be stored locally, or in the case where the mobile device 103 has a network connection, the data source may be stored on an external server 703.

For scenarios where a network connection is not available, before entering an indoor space the mobile device 103 may optionally download a "map pack" containing the information used to locate itself indoors, instead of relying on an external server 703. In order to automate this process, the mobile device 103 would first use an alternative existing technique for resolving its position and would use the gained location information to download the appropriate map pack. The techniques for receiving geo-location information include, for example, GPS, GSM, WiFi, user input, accelerometer, gyroscope, digital compass, barometer, Bluetooth, and cellular tower identification information. These techniques may also be used to fill gaps between when a position of the mobile device is determined using the light-based technique. For example, a mobile device may be placed at times so its camera does not capture light sources. Between these times these alternative existing techniques may be used for filling in position and location information that may be helpful to the user. The map pack would contain a map 902 of the indoor space the user is entering, locations of the lights from some sort of existing or third-party lighting plan 1103, and any location-dependent content 903 for the mobile device 103 to consume. Any requests for location information would simply access data stored locally on the mobile device 103, and would not need to access a remote server via a network 601.

In terms of the experience when using a light-based positioning system, the indoor location reception and calculation may happen with little to no user input. The process operates as a background service, and reads from the receiving module without actually writing them to the display screen of the mobile device. This is analogous to the way WiFi positioning operates, signals are read in a background service without requiring user interaction. The results of the received information may be displayed in a number of ways, depending on the desired application. In the case of an indoor navigation application, the user would see an identifying marker overlaid on a map of the indoor space they are moving around in. In the case of content delivery, the user might see a mobile media, images, text, videos, or recorded audio, about the objects they are standing in front of.

Figure 2:
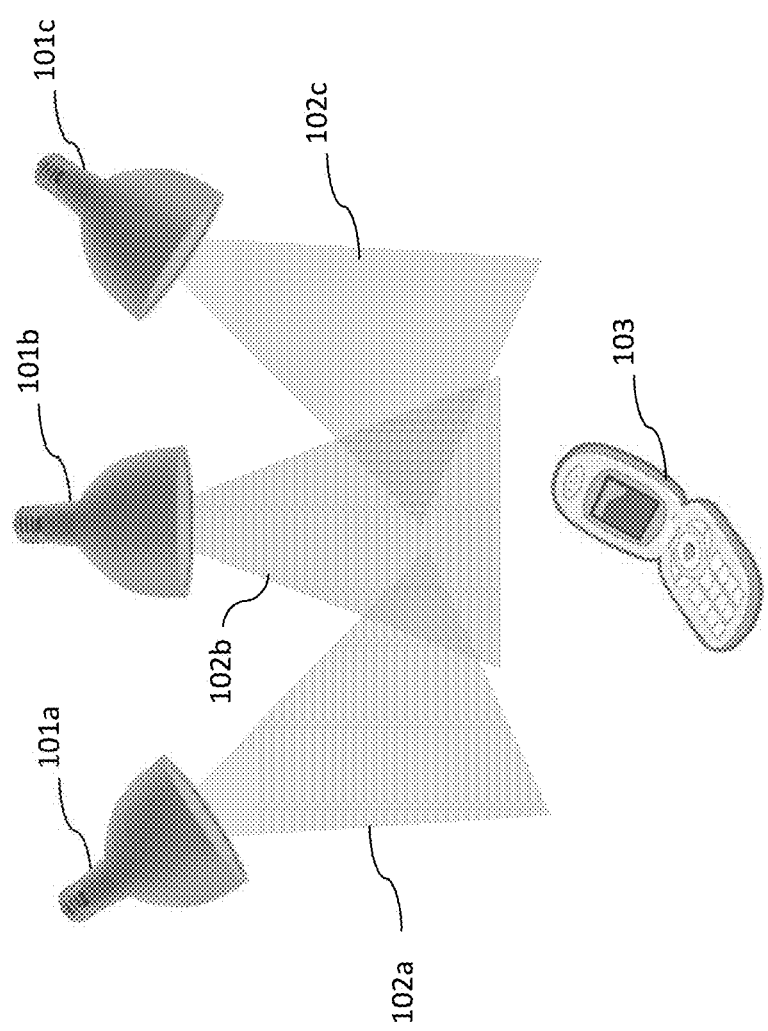
FIG. 2 is a representation of a mobile device receiving multiple sources of light simultaneously from multiple LED light sources.

In scenarios where the mobile device 103 is in view of several light sources, it may receive multiple signals at once. FIG. 2 is a representation of a mobile device 103 receiving identification information 102a-102c from multiple LED light sources 101a-101c. Each light source is transmitting its own unique piece of information. In order to identify its position or receive location-based content, the mobile device 103 may then use the received information to access a database 802 containing information about the relative positions of the LED light sources 101a-101c and any additional content 903. When three or more sources of light are in view, relative indoor position may be determined in three dimensions. The position accuracy decreases with less than three sources of light, yet remains constant with three or more sources. With the relative positions of lights 101a-101c known, the mobile device 103 may use photogrammetry to calculate its position, relative to the light sources.

Photogrammetry is a technique used to determine the geometric properties of objects found in photographic images. In the context of locating mobile devices using light sources, photogrammetry refers to utilizing the corresponding positions of LED light sources, and their positions in 3-D space, to determine the relative position of a camera equipped mobile device. When three unique sources of light are seen by the camera on a mobile device, three unique coordinates may be created from the various unique combinations of 101a-101c and their relative positions in space can be determined.

For a mobile device 103 equipped with an image sensor the following scenario may be considered. When multiple LED light sources appear in the image sensors field of view, the sources appear brighter relative to the other pixels on the image. Thresholds may then be applied to the image to isolate the light sources. For example, pixel regions above the threshold are set to the highest possible pixel value, and the pixel regions below the threshold are set to the minimum possible pixel value. This allows for additional image processing to be performed on the isolated light sources. The end result is a binary image containing white continuous "blobs" where LED light sources are detected, and dark elsewhere where the sources are not detected.

A blob detection algorithm may then be used to find separate LED light sources. A minimum of three separate LED blobs are used to resolve the 3-D position of a mobile device 103. Each LED blob represents a "region of interest" for the information reception, and is simultaneously transmitting a unique piece of information via the modulated visible signal from the light source. For the purposes of reception, each region of interest is processed independently of other regions of interest and is considered to be uniquely identifiable. A center of mass calculation for each region may be performed to determine the pixel coordinates of the center of each LED light source. This center of mass calculation is performed for each frame to track the regions of interest as they move around the image.

Once the regions of interest are established, a detection algorithm captures multiple image frames for each region of interest in order to receive the visible light signal contained in each blob. For each frame in a detected region of interest, a threshold algorithm determines whether the frame contains a "1" (in the case of an aggregate pixel value above the threshold), or a "0" (in the case of an aggregate pixel value lower than the threshold). The threshold algorithm is used since the communication is asynchronous, so the camera receiver period may overlap between the transmission of a "1" and a "0" from the LED light source.

The result of converting successive image frames in a region of interest to binary values is in essence a down-sampled digital version of the signal received from the LED light source. Next, demodulation of the down-sampled digital signal is used to recover the transmitted bits. This down sampling is used due to the fact that the signal modulation frequency should be above the rate at which the human eye can see, and the image sensor frame rate is typically limited to 15-30 fps.

At a lower level, the mobile device 103 processes data on a frame-by-frame basis. Each frame is split into separate regions of interest, based on the detection of light sources. For each region of interest, a thresholding algorithm is used to determine whether a given region is "on" or "off". This is done by taking the average pixel value for the region and comparing it to the threshold value. If the region is "on", the demodulator assumes the light source has just transmitted a "1". If the region is "off", the demodulator assumes the light source has sent a "0". The result of this is the equivalent of a 1-bit analog-to-digital conversion (ADC), at a sampling rate which is equal to the frame rate of the camera.

After a frame is processed, the results of the ADC conversation are stored in a circular buffer. A sliding correlator is applied to the buffer to look for the presence of start bits 402. If start bits 402 are found, the demodulation algorithm assumes it is reading a valid packet of information 401 and proceeds to capture the rest of the transmission. Two samples are used for each bit, so the algorithm creates a linear buffer that is twice the size of the remaining packet. Each subsequent ADC is written sequentially to the linear buffer. When the linear buffer is filled, the demodulation algorithm performs a Fast Fourier Transform (FFT) on the buffer to recover the transmitted signal.

Figure 3:
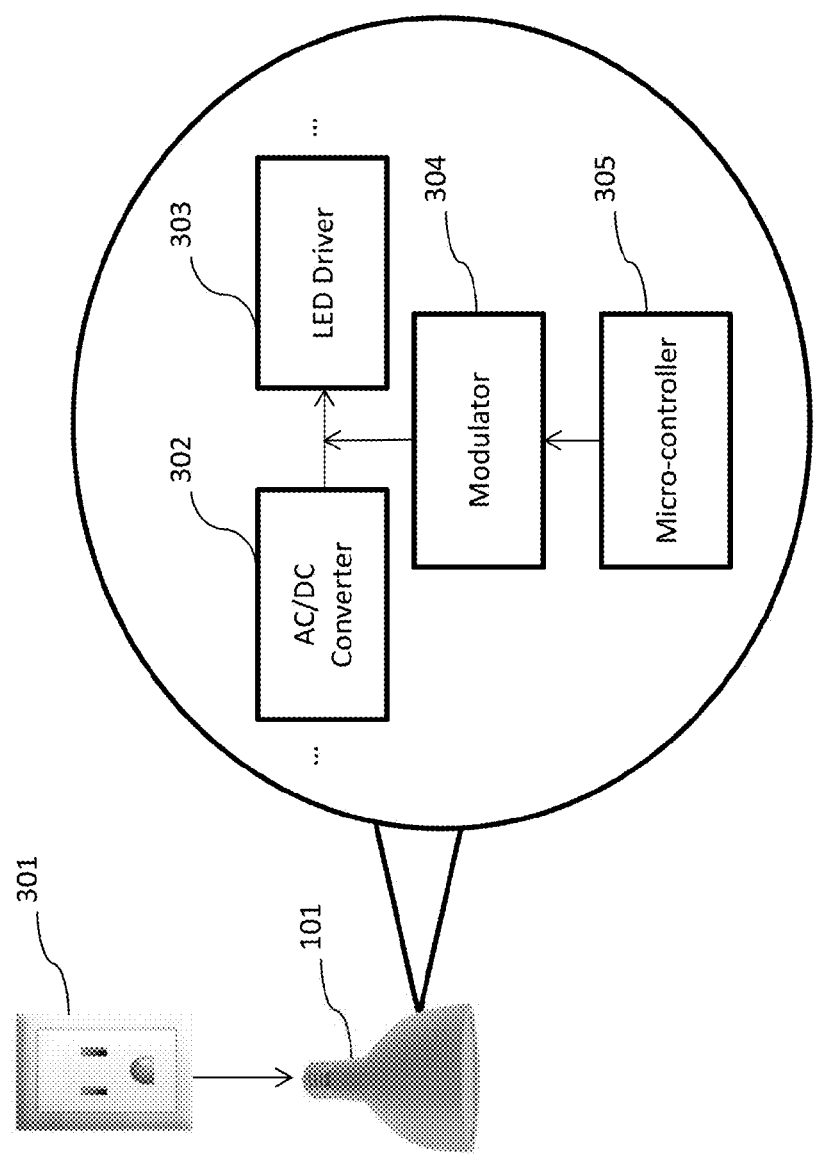
FIG. 3 is a representation of the internal components commonly found in a LED light source that is capable of being modulated to send digital data.

FIG. 3 describes internal components commonly found in LED light source 101 with the addition components to allow for the transmission of optical signals. The LED light source 101 typically contains an alternating current (AC) electrical connection 301 where it connects to an external power source, an alternating current to direct current (AC/DC) converter 302 which converts the AC signal from the power source into an appropriate DC signal, a modulator 304 which interrupts power to the LEDs in order to turn them on and off, a microcontroller 305 which controls the rate at which the LEDs are modulated, and a LED driver circuit 303 which provides the appropriate amount of voltage and current to the LEDs.

Electrical connection 301 is an electrical source that is used to supply power to the LED light source 101. This most commonly comes in the form of a 120 Volt 60 Hz signal in the United States, and 230 Volt 50 Hz in Europe. While depicted in FIG. 3 as a three pronged outlet, it may also take the form of a two terminal Edison socket which the bulb is screwed into, or a bundle of wires containing a live, neutral, and/or ground. When considering other forms of lighting such as backlighting and accent lighting, the electrical connection may also come in the form of a DC source instead of an AC source.

Most LED light sources contain an AC/DC converter 302 that converts the alternating current from the power source 301 to a direct current source used internally by the components found inside the bulb or light source. The converter takes the alternating current source commonly found in existing lighting wiring and converts it to a direct current source. LED light sources generally use direct current, therefore an AC/DC converter is found in most lighting products regardless of form factor.

LED driver 303 provides the correct amount of current and voltage to the LEDs contained inside the lighting source. This component is commonly available and may have either a constant-current or constant-voltage output. The LEDs found inside most lighting sources are current-controlled devices, which require a specific amount of current in order to operate as designed. This is important for commercial lighting products because LEDs change color and luminosity in regards to different currents. In order to compensate for this, the LED driver circuitry is designed to emit a constant amount of current while varying the voltage to appropriately compensate for the voltage drops across each LED. Alternatively, there are some high voltage LEDs which require a constant voltage to maintain their color and luminosity. For these cases the LED driver circuitry provides a constant voltage while varying the current.

Modulator 304 serves the function of modulating the LED light source 101 on and off to optically send light 102 signals. The circuits featuring the modulator may simply consist essentially of solid-state transistors controlled by a digital input. In essence, the modulator 304 turns the LEDs on and off by allowing or preventing current flow. When current flows through the modulator with the switches closed the LEDs turn on, and when the switches are open in the modulator no current can flow and the LEDs turn off. When the modulator is controlled by an additional logic component, it has the ability to send repeating patterns of on/off signals in order to transmit digital data through the visible light 102. The modulator interfaces directly in between the AC/DC converter 302 and the LED driver 303, and is controlled by a microcontroller 305.

The microcontroller 305 provides the digital input signal to the modulator unit 304. This function may also be achieved using a field-programmable gate array (FPGA), but typically consumes more power with added complexity. The microcontroller's 305 task is to send a pre-determined sequence of signals to the modulator 304 which then interfaces with the LED driver 303 to modulate the outgoing visible light from the LED source 101. The microcontroller contains a nonvolatile memory storage area, which stores the identification code of the light signal. Examples of possible nonvolatile memory sources include programmable read only memory (PROM), electrically erasable programmable read only memory (EEPROM), or Flash.

In regards to the microcontroller pins, the microcontroller 305 contains a digital output pin, which is used to modulate the light output. To generate the output signal waveforms, timer modules within the microcontroller 305 are used. Typical logic levels for the digital output are 3.3V and 5V. This digital output feeds into the modulator 304 which interrupts the driver circuit 303 for the LED light source 101. Alternatively, if the LED light source requires lower power, such as backlighting or individual LED diodes, the output of the microcontroller 305 could also be used to drive the light sources directly.

Figure 4:
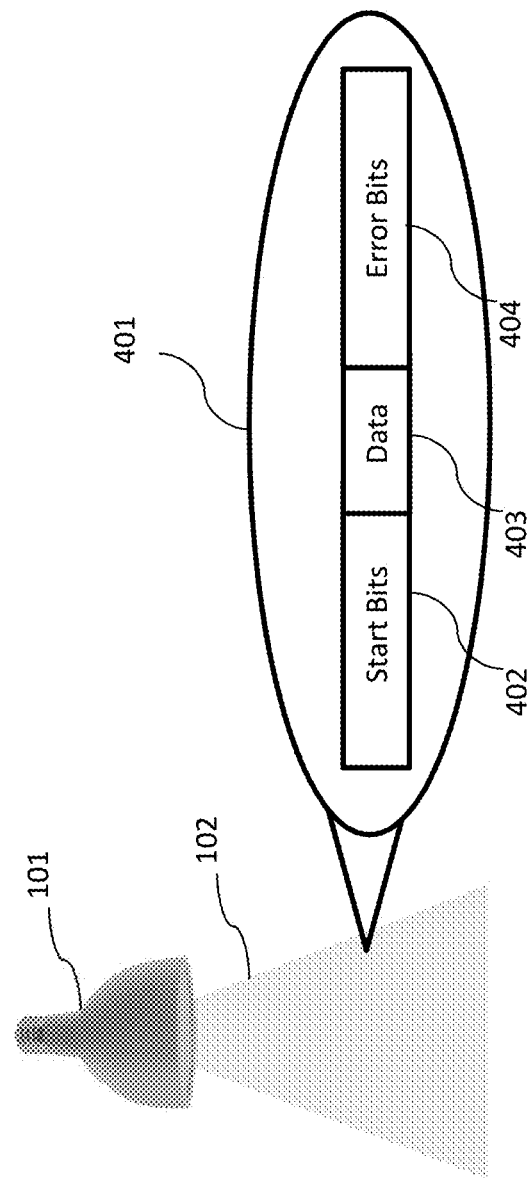
FIG. 4 illustrates information which can be optically transmitted from an LED light source.

The sequence of signals sent from the microcontroller 305 determines the information that is transmitted from the LED light source 101. FIG. 4 describes the information 401 format of the optically transmitted information from the light 102. At the highest level, each packet of information contains some sort of starting bit sequence, which indicates the beginning of a packet, followed by data 403, and some sort of error detection identifier. The size and position of each portion of information is dependent on the application and is also constrained by requirements of the receiving device.

Each packet of information 401 transmitted from the LED light source 101 contains a sequence of starting bits 402, followed by data 403, and then terminated with an error detection code 404. Since the LED light sources 101 are continually broadcasting information 401, erroneous packets are simply discarded while the receiver listens for the starting bits 402, indicating the beginning of the next packet. In cases where multiple sources of light are observed by a mobile device 103, multiple pieces of information 401 are received simultaneously.

Information 401 describes the encoded information that is transmitted by the LED light source 101. The information 401 is contained in a packet structure with multiple bits which correspond to numeric integer values. The data 403 portion of the information packet may include unique ID codes 701. Currently the data 403 size is set to 10 bits, but may be of varying length. Each bit represents a binary "1" or "0", with 10 bits of data 103 corresponding to 1024 possible values. This corresponds to 1024 unique possibilities of ID codes 701 before there is a duplicate. The ID code may include location information in the ID code that provides a general indication of geographical location of the light. This geographical location information may be used to more quickly locate light source information that is used in determining indoor positioning on the mobile device. For example, the geographical information may point to a database to begin searching to find relevant information for positioning. The geographical information may include existing location identifiers such as area code, zip code, census tract, or any other customized information.

The ID code 701 is static and is assigned during the calibration phase of the LED light source 101 during the manufacturing process. One method to assign the ID code 701 is to place instructions to generate a random code in the nonvolatile memory. Once the LED light source 101 is powered on the microcontroller reads the ID code 701 from the nonvolatile memory storage area, and then uses this code for broadcasting each and every time it is subsequently powered on. Since the ID code 701 is static, once it is assigned it will be forever associated locally to the specific LED light source 101 which contains the microcontroller 305.

Figure 5:
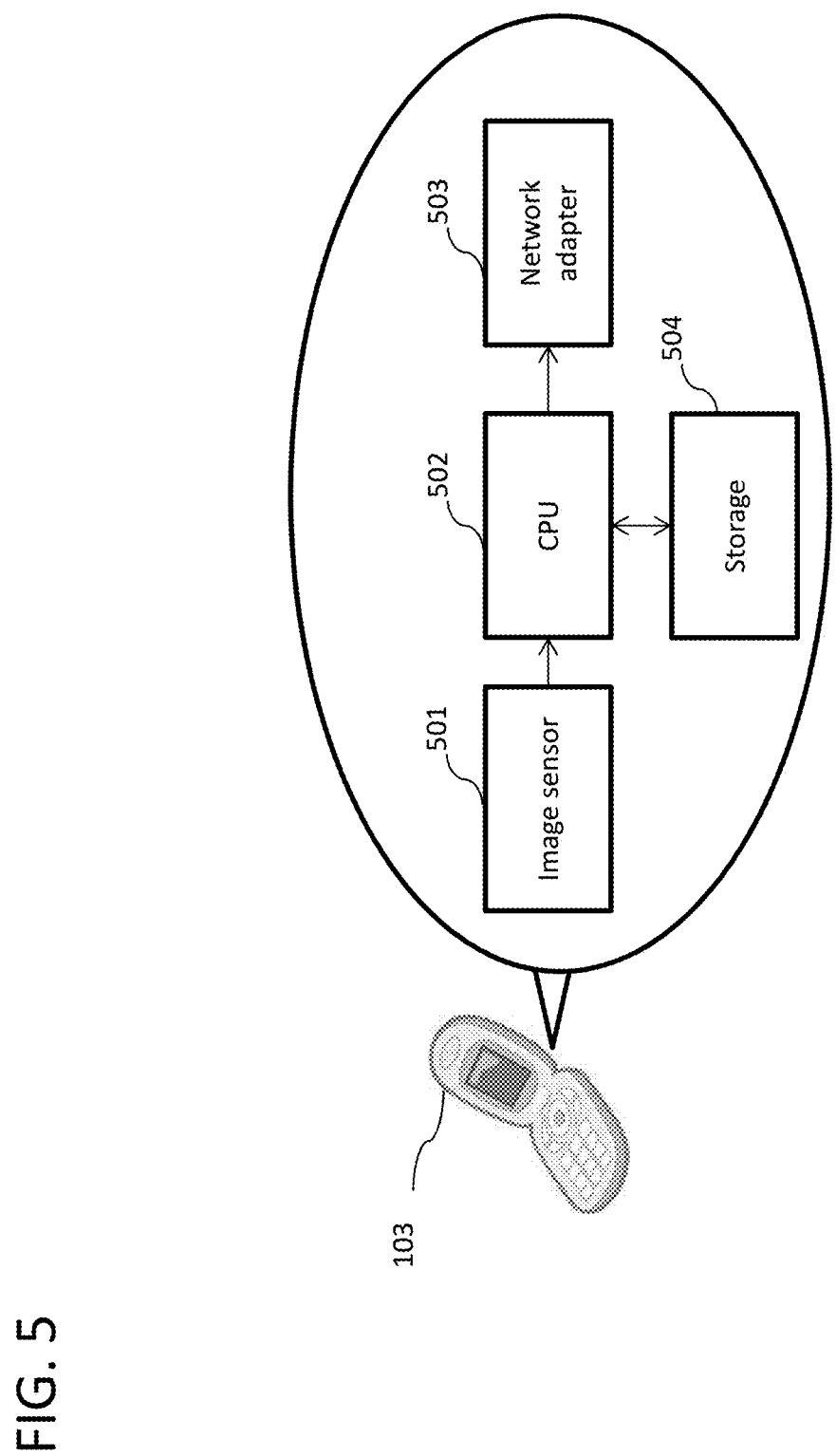
FIG. 5 is a representation of the components which are commonly found in mobile devices which enable them to receive optical signals from LED sources.

FIG. 5 describes the components found in mobile devices 103 that are capable of receiving optical information. At the highest level the mobile device contains an image sensor 501 to capture optically transmitted information, a central processing unit 502 to decipher and manage received information, and a network adapter 503 to send and receive information.

Photosensors are devices which receive incoming electromagnetic signals, such as light 102, and convert them to electrical signals. In a similar fashion, image sensors are arrays of photosensors that convert optical images into electronic signals. The ability to receive signals from multiple sources is an important benefit when using image sensors for receiving multiple optical signals.

Image sensor 501 is a typical sensor which is found in most smart devices. The image sensor converts the incoming optical signal into an electronic signal. Many devices contain complementary metal-oxide-semiconductor (CMOS) image sensors; however, some still use charge-coupled devices (CCD). CMOS image sensors are the more popular choice for mobile devices due to lower manufacturing costs and lower power consumption. There are several tradeoffs to consider when choosing an image sensor to perform photogrammetry on multiple LED light sources 101. One tradeoff is between the camera resolution and the accuracy of the photogrammetric process when triangulating between multiple light sources—increasing the number of pixels will increase the accuracy. There is also another tradeoff between the data rate of the transmission and the sampling rate (in frames per second) of the camera. The data rate (in bits/second) is half the frame rate of the camera (e.g., a 30 fps camera will receive 15 bps). And finally when determining the length of the information 401 packet, the larger the size the longer the reception period, as more bits generally requires longer sampling periods to capture the full message.

CPU 502 is typically a generic CPU block found in most smart devices. The CPU 502 is in charge of processing received information and sending relevant information to the network adapter 503. Additionally the CPU has the ability to read and write information to embedded storage 504 within the mobile device 103. The CPU 502 may use any standard computer architecture. Common architectures for microcontroller devices include ARM and x86.

The network adapter 503 is the networking interface that allows the mobile device 103 to connect to cellular and WiFi networks. The network connection is used in order for the mobile device 103 to access a data source containing light ID codes 701 with their corresponding location data 702. This may be accomplished without a data connection by storing location data 702 locally to the mobile device's 103 internal storage 504, but the presence of a network adapter 503 allows for greater flexibility and decreases the resources needed. Furthermore, the network adapter 503 is also used to deliver location dependent content to the mobile device when it is connected to a larger network 601.

Figure 6:
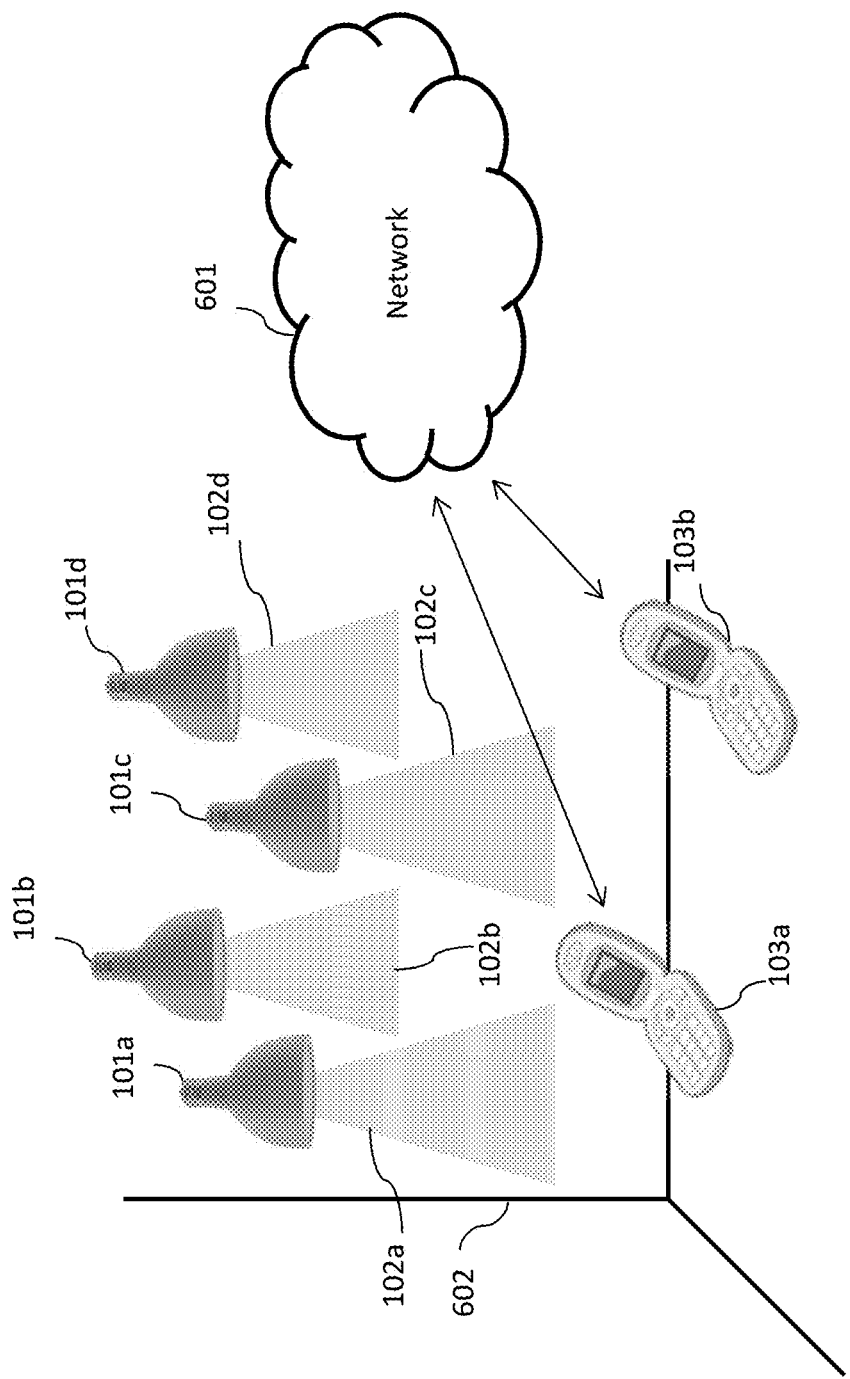
FIG. 6 is a representation of multiple LED light sources sending unique information to multiple mobile devices.

FIG. 6 is a representation of multiple LED sources sending light 102a-d containing identification information 102 to multiple mobile devices 103a-103b. In this instance the light sources are acting as non-networked broadcast beacons; there are no networking modules or physical data wires connecting them. This property is desirable when looking towards a commercial installation of numerous LED light sources 103a-103b, as additional wiring and networking will not be required. However, in order to receive relevant information the mobile devices have the ability to send and receive additional information from a local source or a network 601. Once the mobile device 103 receives identification information 401 from the light sources, it then asks a local or remote source for additional information.

Enclosed area 602 is a spatial representation of an enclosed room containing four LED sources 101a-101d and two mobile devices 103a-103b, meaning that they may operate next to each other without interference. As a rule of thumb if the received image feed from the mobile device sees one or more distinct bright sources of light, it has the ability to differentiate and receive the unique information without interference. Because the light capture is based on line of sight, interference is mitigated. In this line of sight environment, interference may arise when the light capture mechanism of the mobile device is blocked from the line of sight view of the light source.

Network 601 represents a data network that may be accessed by mobile devices 103a-103b via their embedded network adapters 503. The network may consist of a wired or wireless local area network (LAN), with a method to access a larger wide area network (WAN), or a cellular data network (Edge, 3G, 4G, LTS, etc). The network connection provides the ability for the mobile devices 103a-103b to send and receive information from additional sources, whether locally or remotely.

Figure 7:
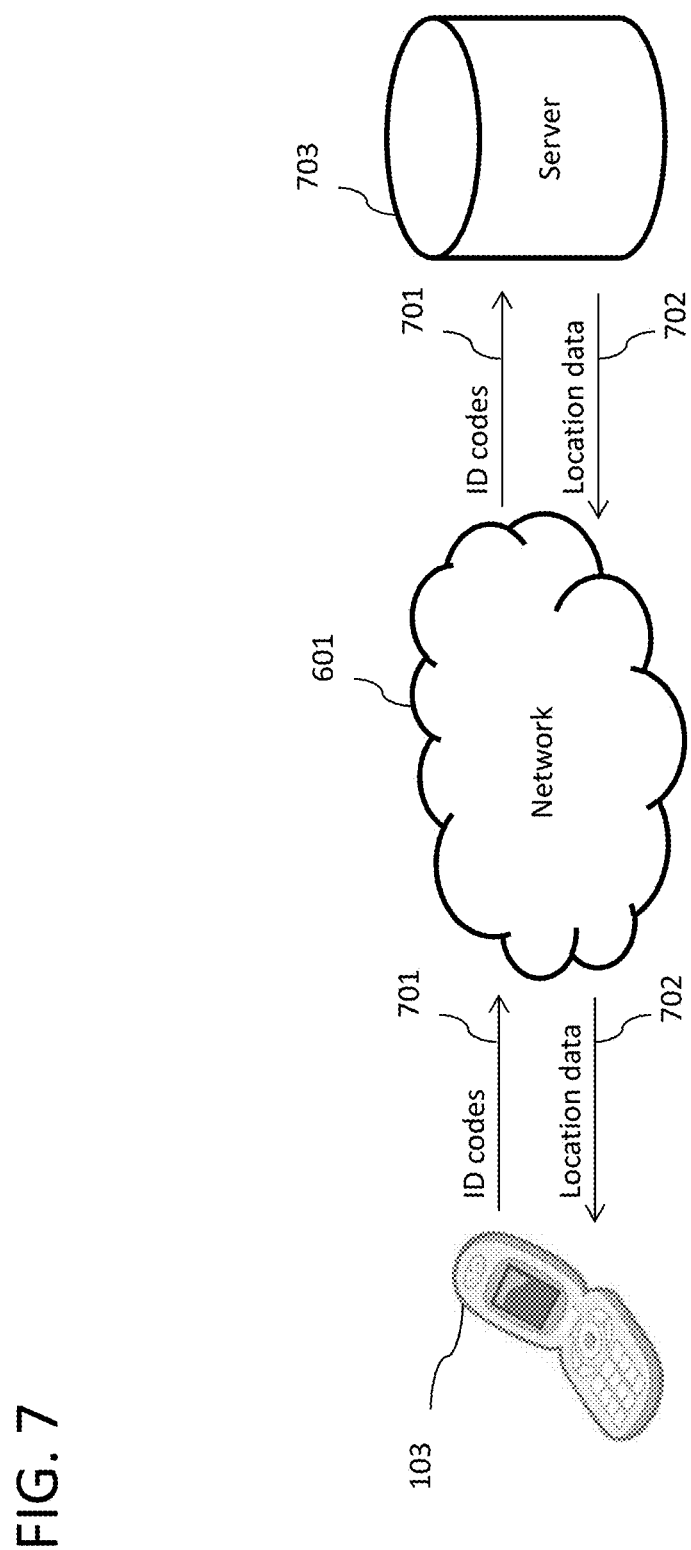
FIG. 7 illustrates the process of a mobile device sending identification information and receiving location information via a network to a server.

FIG. 7 describes how the mobile device 103 receives location data 702. In essence, the mobile device 103 sends decoded ID codes 701 through a network 601 to a server 703, which sends back location information 702. The decoded ID codes 701 are found in the information 401, which is contained in the optically transmitted signal. After receiving this signal containing a unique ID code 701 the mobile device 103 sends a request for location data 702 to the server 703, which sends back the appropriate responses. Additionally the request could include other sensor data such as but not limited to GPS coordinates and accelerometer/gyroscope data, for choosing between different types of location data 702 and any additional information.

Location data 702 is the indoor location information which matches the received information 401. The location data 702 corresponds to indoor coordinates which match the ID code 701, similar to how outdoor GPS tags known locations of interest with corresponding information. The location data 702 could also contain generic data associated with the light identification information 401. This could include multimedia content, examples of which include recorded audio, videos, and images. The location data 702 may also vary depending, for example, on other criteria such as temporal criteria, historical criteria, or user-specified criteria.

The temporal criteria may include the time of day. The historical criteria may include user location history (e.g., locations visited frequently), Internet browsing history, retail purchases, or any other recorded information about a mobile device user. The user-specified criteria may include policies or rules setup by a user to specify the type of content they wish to receive or actions the mobile device should take based on location information. For example, the user-specified criteria may include how the mobile device behaves when the user is close to an item that is on sale. The user may specify that a coupon is presented to the user, or information about the item is presented on the mobile device. The information about the item may include videos, pictures, text, audio, and/or a combination of these that describe or relate to the item. The item may be something that is for sale, a display, a museum piece, or any other physical object.

Server 703 handles incoming ID codes 701, and appropriately returns indoor location data 702 to the mobile devices 103. The handling may include receiving incoming ID codes, searching databases to determine matches, calculating position coordinates based on the ID codes, and communicating indoor location data 702. Since the LED light sources 101 are acting as "dumb" one-way communication beacons, it is up to other devices to determine how to use the ID codes to calculate position information and deliver related content. In some embodiments, the server 703 may include the information used to link ID codes 701 to physical spaces and to deliver location-specific content. The server is designed to handle the incoming requests in a scalable manner, and return results to the mobile devices in real-time.

The server may include one or more interfaces to the network that are configured to send and receive messages and information in a number of protocols such as Internet Protocol (IP) and Transmission Control Protocol (TCP). The protocols may be arranged in a stack that is used to communicate over network 601 to mobile device 103. The server may also include memory that is configured to store databases and information used in providing position coordinates and related location based content. The server may include one or more modules that may be implemented in software or other logic. These modules may perform calculations and perform operations to implement functionality on the server. The server may use one or more processors to run the modules to perform logical operations.

Figure 8:
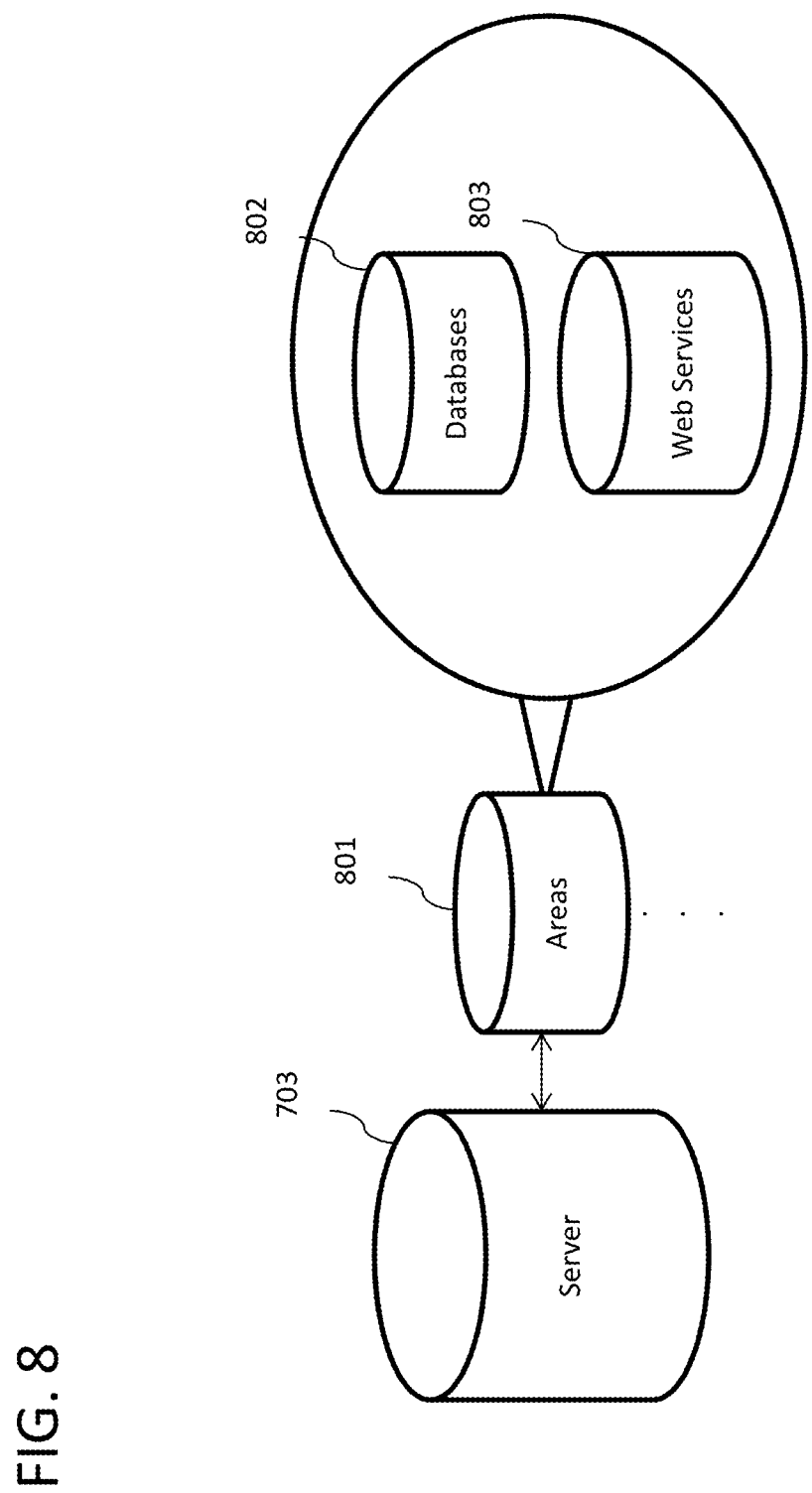
FIG. 8 illustrates the high level contents of the server which includes databases and web services for individual areas enabled with light positioning systems.

To describe the server interaction in more detail, FIG. 8 delves into location-specific areas 801 containing databases 802 and web services 803. The areas 801 represent a subset of databases 802 and web services 803 for individual locations where there are installed LED light sources 101. The server 703 directly communicates with these installations, which have their own separate sets of information. At a high level, databases 802 represent the stored information pertaining to a specific area 801, while the web services 803 represent services which allow users, customers, administrators, and developers access to the ID codes, indoor locations, and other information.

In order to send relevant information, after each received ID code 701, the server 703 requests information pertaining to the specific area 801. Contained in each area 801, are databases which contain information corresponding to the specific ID code 701. This information can take multiple formats, and has the ability to be content specific to a variety of static and dynamic parameters.

In order to optimize response time, the server 703 may constrain its search space by using existing positioning technologies available to the mobile device 103 or from information in the light source ID code depending on the embodiment. In essence the server looks for the light IDs 901 within a specific radius of the current approximate position of the mobile device 103, and ignores those that are geographically irrelevant. This practice is known as "geofencing", and dramatically reduces the request/response time of the server 703. As final verification, if the database 802 contains one or more of the same IDs within the current search space that match the ID codes received by the mobile device 103 within a specific time frame, then a successful transaction can be assumed.

Figure 9:
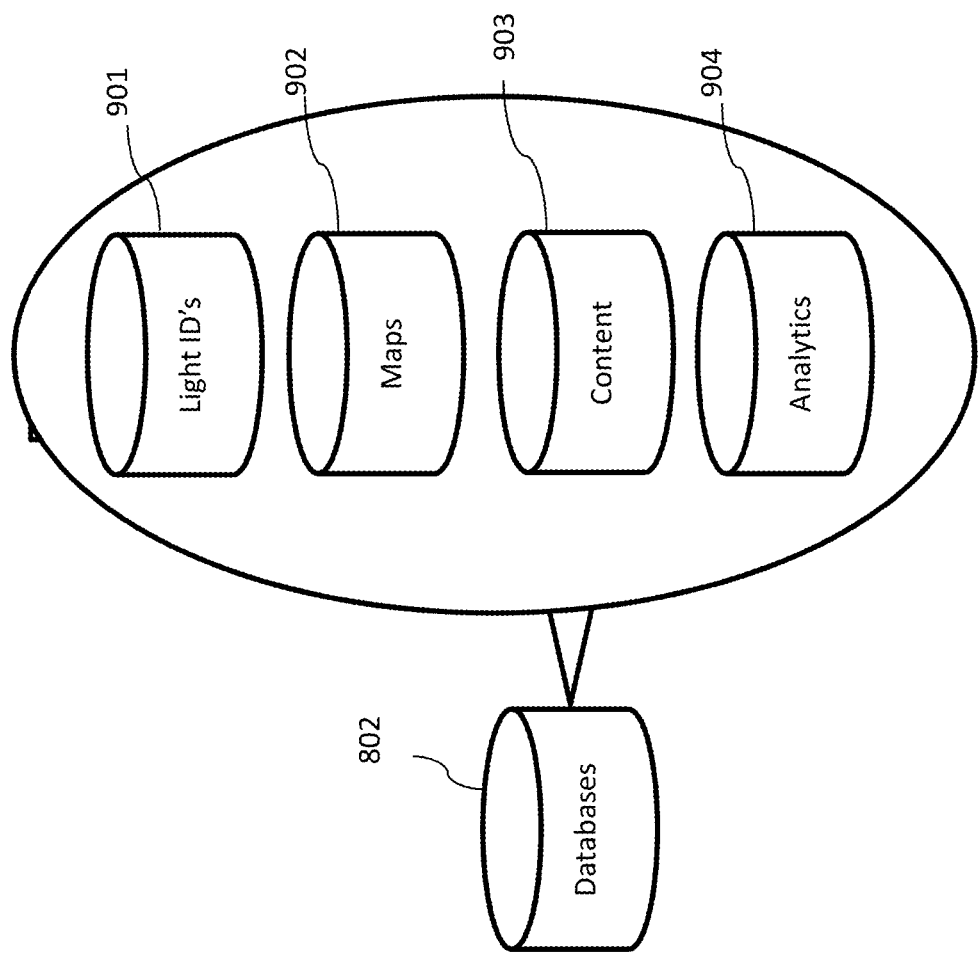
FIG. 9 illustrates the components inside the databases.

As seen in FIG. 9, each database 802 contains numerous sub-categories which store specific types of information. The categories are labeled light IDs 901, maps 902, content 903, and analytics 904.

Light IDs 901 is a category which contains records of the individual light ID codes 701 which are contained in an area 801. In a typical light positioning enabled installation, there will be tens to hundreds of unique LED light sources 101 broadcasting unique ID codes 701. The purpose of the light IDs 901 database is to maintain and keep a record of where the ID codes 701 are physically located in the area 801. These records may come in the form of but are not limited to GPS (latitude, longitude, and altitude) coordinates that are directly mapped into an indoor space. For instance, most indoor facilities have information about the number of installed lights, how far apart they are spaced, and how high the ceilings are. This information may be matched with building floor plans or satellite imagery to create a digital mapping of where each light is positioned.

To expand upon the Light IDs 901 category, additional information may come in the form of location-specific maps 902. These maps may take on many physical and digital forms, either directly from the management of the location, or a third-party vendor or outside source. In addition to mapping information, location-specific content 903 and analytics 904 are also contained inside the databases 802.

Figure 10:
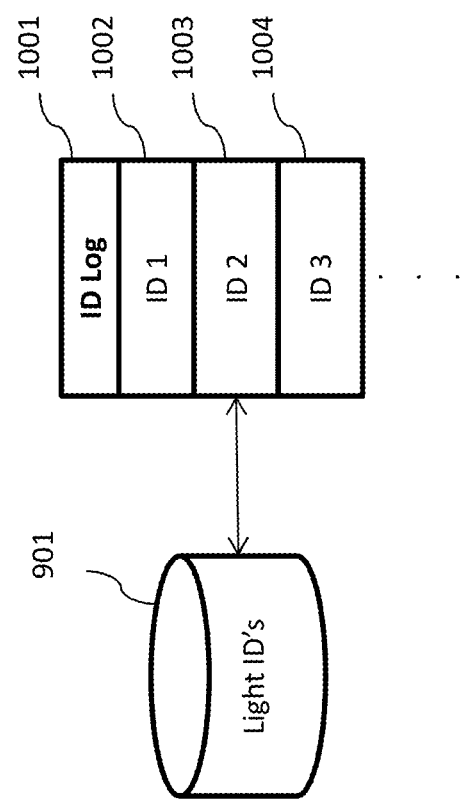
FIG. 10 illustrates the information contained in the Light IDs database.

FIG. 10 is a description of the ID log 1001 information contained in the Light IDs database 901. It is a representation of the file structure that contains individual records corresponding to individual light ID codes 701 found within different areas 801. In a typical area 801 there is a possibility of having duplicate ID codes 701 since there are a finite number of available codes. The size of the ID code 701 is proportional to the length of the data 403 field contained in the optical information 401.

To deal with duplicate ID codes 701, additional distinguishing information may be contained inside of the individual log records; ID 1 1001, ID 2 1003, and ID 3 1004. This information may contain additional records about neighboring ID codes 701 that are in physical proximity of the LED light source 101, or additional sensor data including but not limited to: accelerometer or gyroscope data, WiFi triangulation or fingerprinting data, GSM signature data, infrared or Bluetooth data, and ultrasonic audio data. Each additional sensor is an input into a Bayesian model that maintains an estimation of the current smartphone position and the uncertainty associated with the current estimation. Bayesian inference is a statistical method used to calculate degrees of probability due to changes in sensory input. In general, greater numbers of sensory inputs correlate with lower uncertainty.

In order to calibrate the light-based positioning system, a user equipped with a specific mobile application (app) will need to walk around the specific area 801. The mobile application contains map 902 information of the indoor space, with the positions of the LED light sources 101 overlaid on the map. As the user walks around, they will receive ID codes 701 from the lights. When the user receives an ID code 701, they will use the map on the mobile app to select which LED light source 101 they are under. After the user confirms the selection of the light, the mobile application sends a request to the server 703 to update the light location contained in the lighting plan 1103 with the ID code 701. Additional user-provided 1104 metadata including but not limited to current WiFi access points, RSSI, and cellular tower information may also be included with the server request to update additional databases.

In addition to manual calibration, calibration of LED light source 101 locations may also be achieved via crowdsourcing. In this algorithm, as mobile application users move around an indoor space receiving ID codes 701, they will send requests to the server 703 containing the light ID code 701 received, the current approximate position (based on other positioning techniques such as WiFi, GPS, GSM, and inertial sensors) and the error of the current approximation. Given enough users, machine learning algorithms on the server 703 may be used to infer the relative position of each LED light source 101. The accuracy of this calibration method depends heavily on the number of mobile application users.

Figure 11:
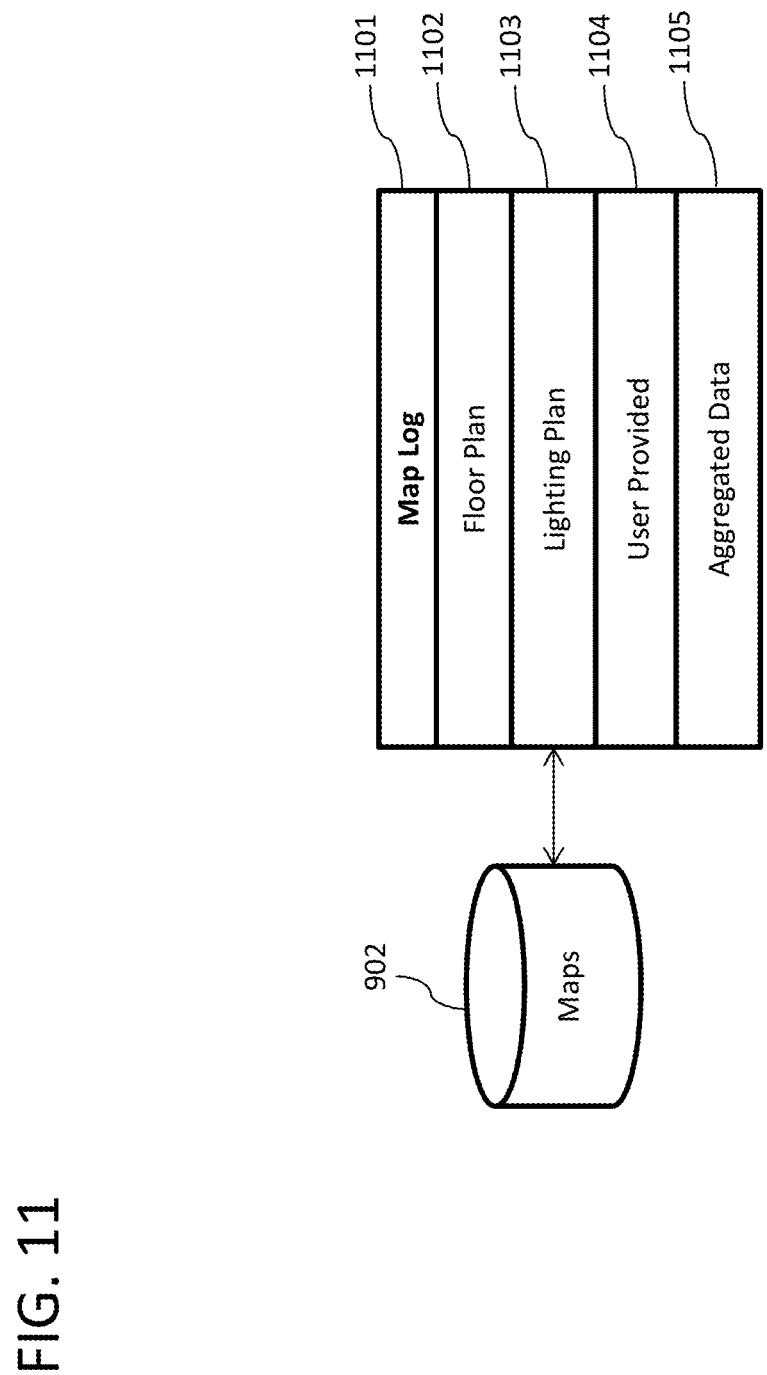
FIG. 11 illustrates the information contained in the Maps database.

FIG. 11 is a description of the maps database 902 and map log 1101 information containing floor plans 1102, lighting plans 1103, user-provided information 1104, and aggregated data 1105. Map log 1101 is a representation of the file structure that contains the information found inside the maps database 902. Information may come in the form of but is not limited to computer-aided drafting files, user-provided computerized or hand drawn images, or portable document formats. The information residing in the maps database 902 may be used both to calibrate systems of multiple LED light sources 101, and to augment the location data 702 that is sent to mobile devices 103.

Floor plan 1102 contains information about the floor plan for specific areas 801. The contained information may be in the form of computer-aided drafting files, scanned images, and legacy documents pertaining to old floor plans. The information is used to build a model corresponding to the most recent building structure and layout. These models are subject to changes and updates through methods including but not limited to crowd sourcing models where users update inaccuracies, third-party mapping software updates, and additional input from private vendors.

Lighting plan 1103 contains information about the physical lighting fixture layout, electrical wiring, and any additional information regarding the lighting systems in the area 801. This information may also come in a variety of physical and digital forms such as the floor plan 1102 information. The lighting plan 1103 information is used in the calibration process of assigning light ID codes 701 to physical coordinates within an area 801. In essence, a location with multiple LED light sources 101 acts as a large mesh network except, in this case, each node (light ID 701) is a non-networked beacon of information that does not know about its surrounding neighbors. To help make sense of multiple light ID codes 701, the lighting plan 1103 information is used as one of many ways to tell the backend server 703 where LED light sources 101 are located.

User-provided information 1104 contains additional data that the user manually uploads in regards to building changes, updates, or new information that is acquired. The user in this case is most likely the facility manager or staff member, but such information may also originate from an end user of the system who contributes via a crowd sourcing or machine learning mechanism. For instance, if an end user was using a light-based positioning system in a museum and was unable to find a particular exhibit or noticed inaccurate information in regards to location or classification of the exhibit, they could red flag the occurrence using their mobile device 103. When coupled with data from additional users, sometimes known as a crowd-sourcing method, this user-provided information 1104 may be used to update and repair inaccuracies in the maps 902 database.

Aggregated data 1105 contains information that is gathered by the system that may be used to augment the current information that is known about the mapping environment. This may occur during normal operation of the system where multiple mobile devices 103 are constantly sending and receiving location data 702 from the server 703. Over time the aggregation of this data may be used to better approximate how light ID codes 701 correspond to the physical locations of the LED light sources 101. For instance, if multiple mobile devices 103 consistently receive a new ID code 701, in a repeatable pattern with respect to additional known ID codes 701 and other sources of location information, then this information may be recorded and stored in the aggregated data 1105 database. This information may additionally be used to recalibrate and in essence "self-heal" a light-based positioning system.

Figure 12:
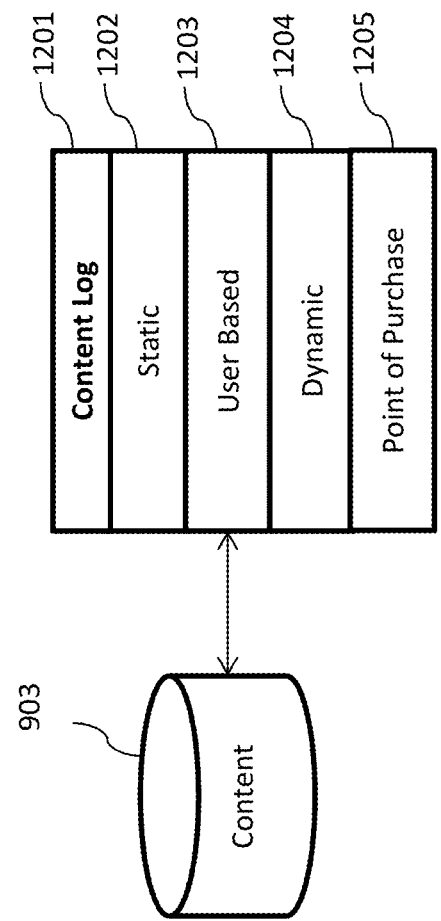
FIG. 12 illustrates the information contained in the Content database.

FIG. 12 is a description of the content database 903 and content log 1201 information containing static content 1202, user-based content 1203, and dynamic content 1204. Content log 1201 is a representation of the file structure that contains the information found inside the content database 903. Static content 1202 refers to unchanging information that is associated with the specific area 801. This may refer to the previous example in which a facility manger loads specific content into the content 903 database before a user enters the specific area 801. This type of information may take the form of but is not limited to audio recordings, streaming or stored video files, images, or links to local or remote websites.

User-based content 1203 refers to content that is dependent on user criteria. The content may depend on, but is not limited to, user age, sex, preference, habits, etc. For instance, a male user might receive different advertisements and promotions than a female would. Additionally, age and past purchase habits could also be used to distinguish which is the correct piece of content to be presented to the user.

Dynamic content 1204 refers to content which changes with varying frequency. The content may change dependent on a temporal bases, daily, weekly, monthly, etc. For instance, seasonal marketing and content could be automatically presented to the user dependent on the month of the year, or content in the form of morning, evening, or nightly specials could be presented numerous times throughout the individual day.

In addition to content, point of purchase 1205 information may be delivered as well. This could be implemented by using the received ID code 701 to a secure connection that establishes and completes a transaction linked to a user's selected payment method. Additionally, a standalone point of purchase feature could be implemented by simply linking ID codes 701 directly to merchandise or services.

Figure 13:
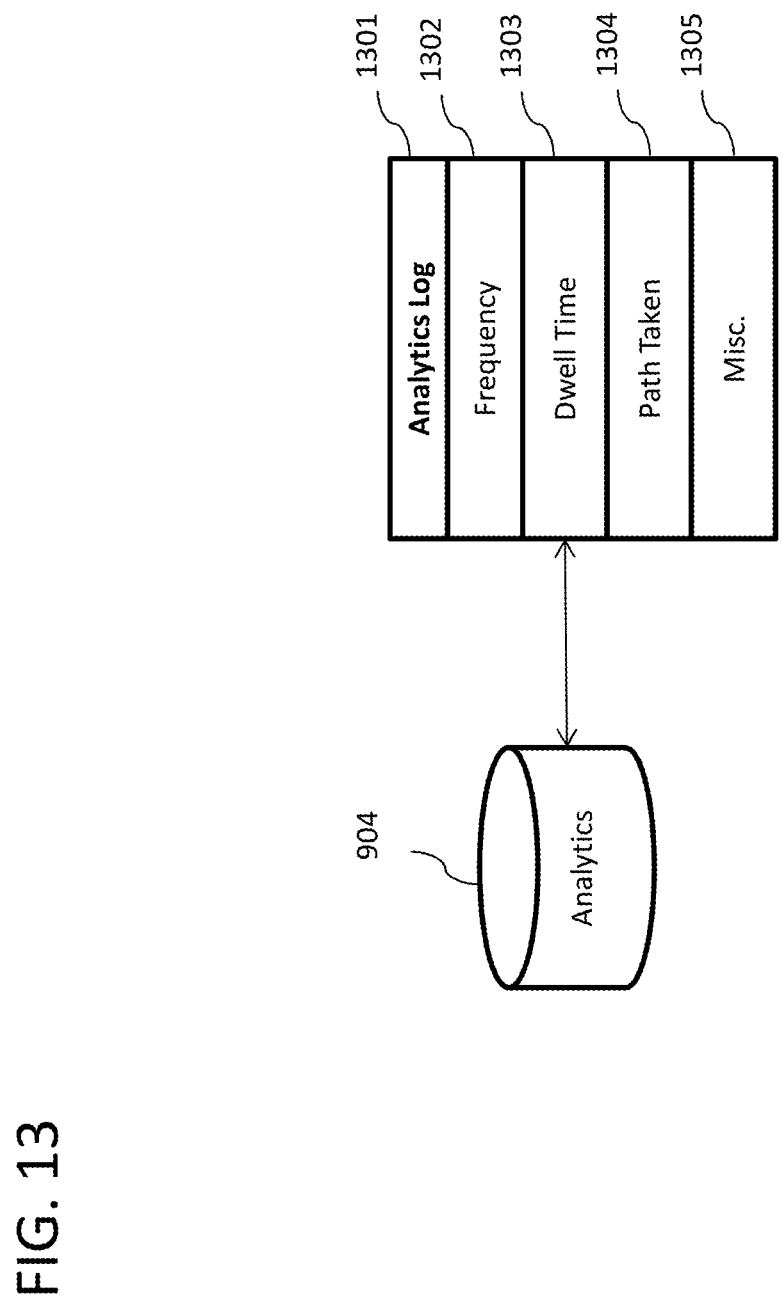
FIG. 13 illustrates the information contained in the Analytics database.

FIG. 13 is a description of the analytics database 904 and analytics log 1301 information containing frequency 1302, dwell time 1303, path taken 1304, and miscellaneous 1305. Analytics log 1101 is the file structure that contains the information found inside the analytics database 904. Frequency 1302 refers to the number of times each end user visits a particular location inside of a specific area 801. Separate records are maintained for individual users, and the frequency is aggregated and sorted in the frequency files database 904.

Dwell time 1303 refers to the time spent in each particular location inside a specific area 801. Separate records are maintained for individual users, and the dwell times are aggregated and sorted in the dwell time file. Path taken 1304 refers to the physical path taken by a user in each specific area 801.

Figure 15:
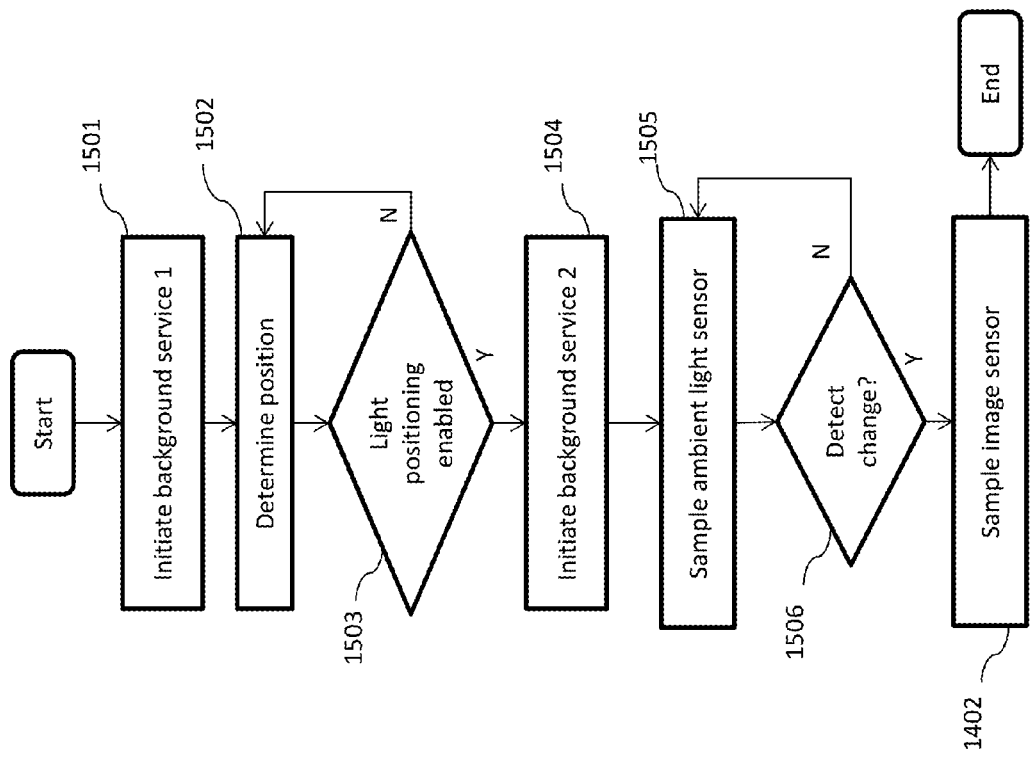
FIG. 15 is a process illustrating the background services and how they activate various sensors contained inside the mobile device.

Consider an example that combines many of the above descriptions, involving a store owner that installed a light-based indoor positioning system and a customer walking around the store using a mobile device 103 capable of receiving optically transmitted information. The customer drives to the parking lot of the store, parks, and walks in. Using the background sensors and location services available to her phone as modeled in FIG. 16, the customer's mobile device 103 already knows that she has approached, and most likely entered a store outfitted with a light-based positioning system. Once this information is known, the application running on the customer's mobile device 103 initiates several background services and begins to start looking for optical signals as depicted in FIG. 15.

Prior to the customer entering the store, the store owner has already calibrated and preloaded the database 802 with the unique LED light sources 101, map 902 information pertaining to the store floor plan 1102, user-provided 1104 product locations, and content 903 in the form of multimedia and local deals in the form of promotions that may only be activated by visiting that particular section of the store.

In the meantime, the customer is walking around the store looking to find particular items on her shopping list that she has already digitally loaded onto her mobile device 103. Next, the customer is prompted by her mobile device 103 that one of the items on her list has changed locations and an image of the store layout is displayed with a flashing icon indicating where her desired product has moved. The mobile phone may guide her to the new product. Then as soon as she gets close to the product, an informational video is prompted on her screen detailing the most popular recipe incorporating that product and how it is prepared. Finally, in addition to finding her desired product, the customer receives a discount promotion for taking the time to seek out the new location of the product.

In addition to the services offered by this system to the customer, the store owner now gains value from learning about the shopping experiences of the customer. This comes in the form of aggregated data that is captured and stored in the analytics 904 section of his store's database 802. This example is one of many applications that may be enabled with an accurate indoor light-based positioning system.

Figure 14:
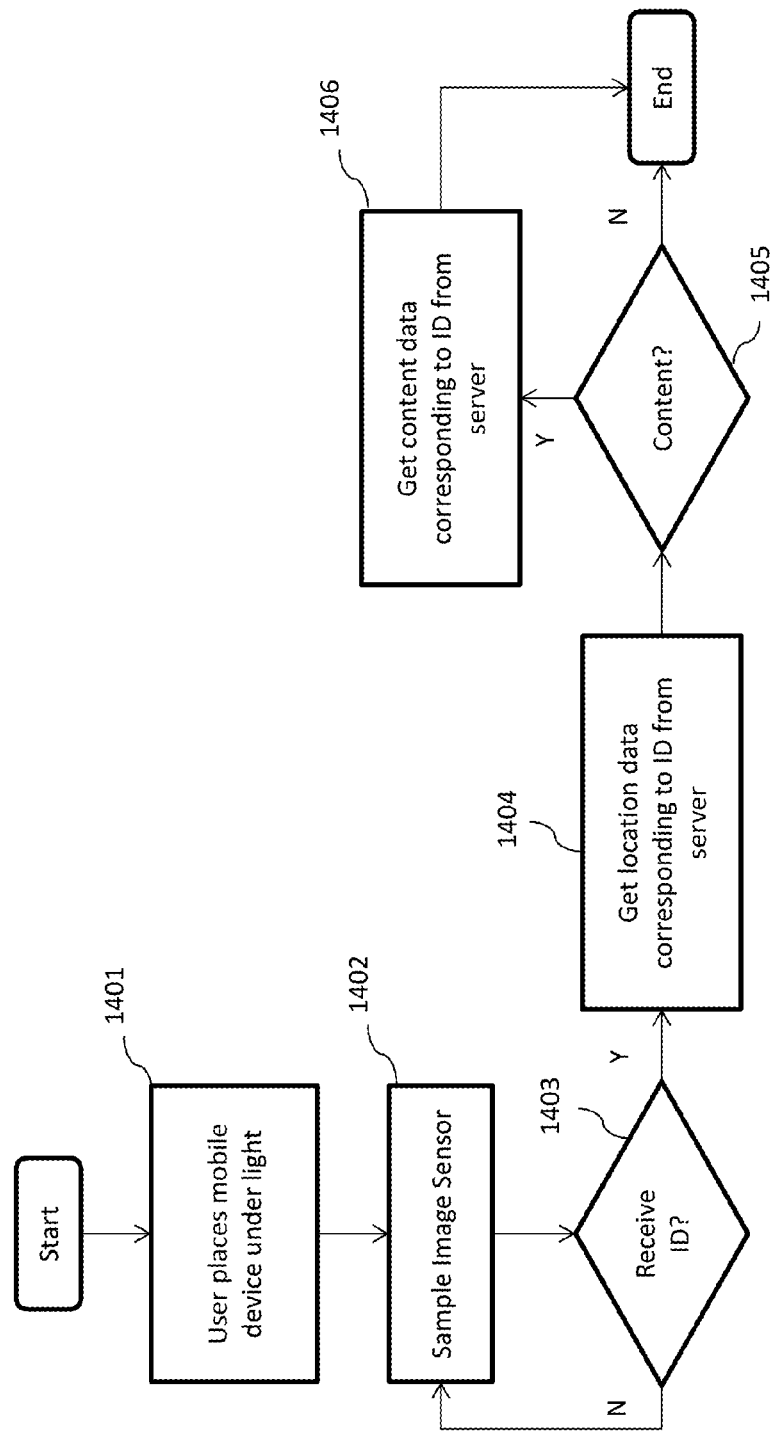
FIG. 14 illustrates the process of a mobile device receiving location and content information via a light-based positioning system.

FIG. 14 is a process describing the act of receiving location and content information through visible light. User places mobile device under light 1401 corresponds to the act of physically placing a camera equipped mobile device 103 underneath an enabled LED light source 101. The user stands approximately underneath or adjacent the LED light source 101, and the mobile device has the LED light source 101 in view of the camera lens.

The next block, sample image sensor 1402, refers to the act of turning on and reading data from the embedded image sensor in the mobile device 103. Receive ID? 1403 is a decision block which either moves forward if a location ID is received, or returns to sample the image sensor 1402. Get location data corresponding to ID from server 1404 occurs once a location ID has been received. The mobile device queries the server asking for location data 702 relevant to the ID code. This describes the process of a user obtaining an ID code 701 from a non-networked LED light source 101, and using the unique identifier to look up additional information from either the server 703 or a locally stored source.

Finally, Content? 1405 is another decision block which determines if there is location-based content associated with the received ID code. If content is available the process continues on to the last block 1406 where the content is queried; if not, the process ends. As described above, the get content data corresponding to ID from server 1405 refers to the act of retrieving content data associated with a known location from either a server 703 or local source.

FIG. 15 is a process describing the act of turning on the application background services and determining when to sample the image sensor. Initiate background service 1 1501 is the primary background running service on the mobile device. This service is tasked with initiating a function that can communicate wirelessly to determine if the mobile device is close to an enabled area. The wireless communication includes radio frequency communication techniques such as global position system (GPS), cellular communication (e.g., LTE, CDMA, UMTS, GSM), or WiFi communications. Determine position 1502 is the function that periodically samples the wireless communication signal and based on distance parameters decides whether or not the mobile device is close enough to an area to move forward to the next service.

Light positioning enabled? 1503 is a decision block that moves forward if the mobile device is close to an enabled location, or repeats the previous function if not. Initiate background service 2 1504 is activated once the mobile device enters an enabled area. The service is tasked with initiating the functions that receive location information via the modulated light.

Sample ambient light sensor 1505 is the first function of the previous service that samples the ambient light sensor data as soon as the sensor detects a change. The function of this task is to determine if the sensor has gone from dark to light, if the user takes the device out of a pocket or enclosure, or from light to dark, the user has placed the device inside of a pocket or enclosure. As an alternative to sampling the light sensor, the algorithm could also look for a change in the accelerometer reading. This may correspond to the user taking the phone out of their pocket. Detect change? 1506 is the decision block that moves forward if the ambient light sensor has gone from dark to light, meaning that the mobile device is potentially in view of surrounding modulated light.

Figure 16:
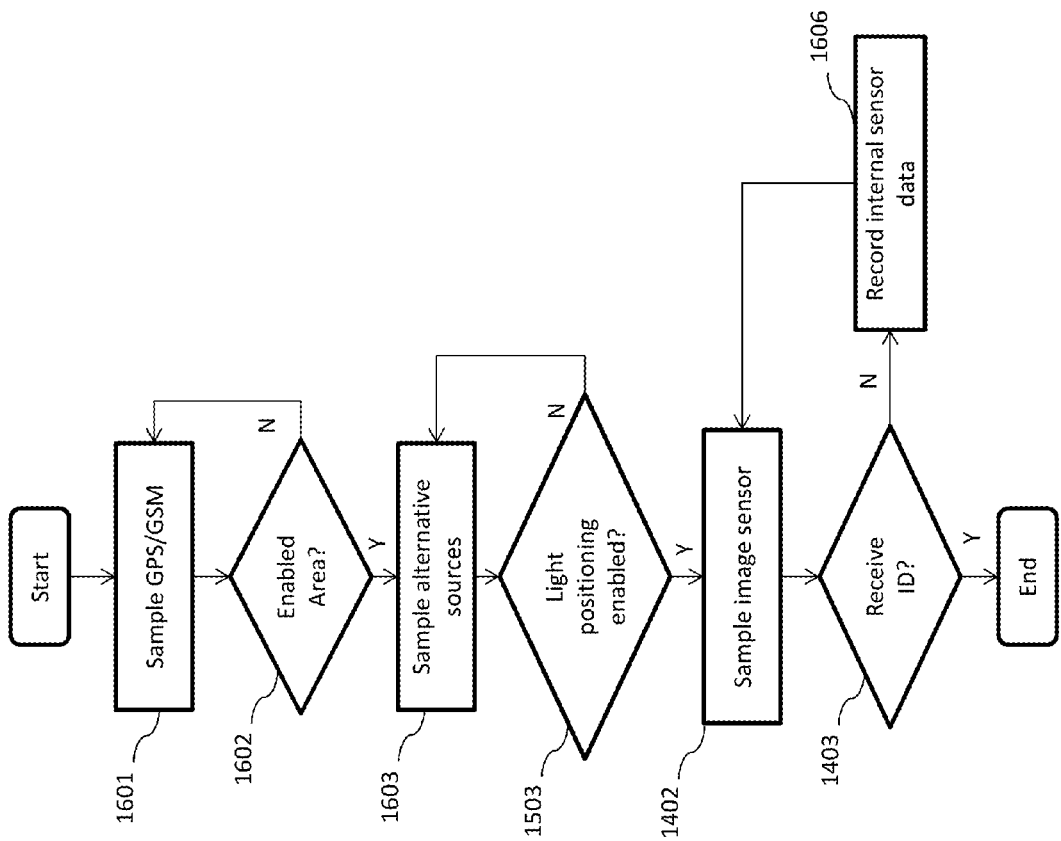
FIG. 16 illustrates the process of combining multiple information sources with a light-based positioning service.

FIG. 16 is a process describing the act of determining a mobile device's position using a variety of information sources. Sample GPS/GSM 1601 refers to the act of determining if the mobile device is close to an enabled area. Enabled area? 1602 is a decision block which moves forward if the mobile device is close to a enabled area, or returns to the previous block if not.

Sample alternative sources 1603 refers to the act of leveraging existing alternative positioning technologies such as WiFi, Bluetooth, ultrasound, inertial navigation, or employing an existing service using one or more of any available services. Record internal sensor data 1606 is a task which records the current accelerometer data for a period of time before returning to the Sample image sensor 1402 block. This task is performed so that location information is constantly being collected even when modulated light is not being detected. This allows the mobile device and/or server to keep track of the mobile device's position.

Figure 17:
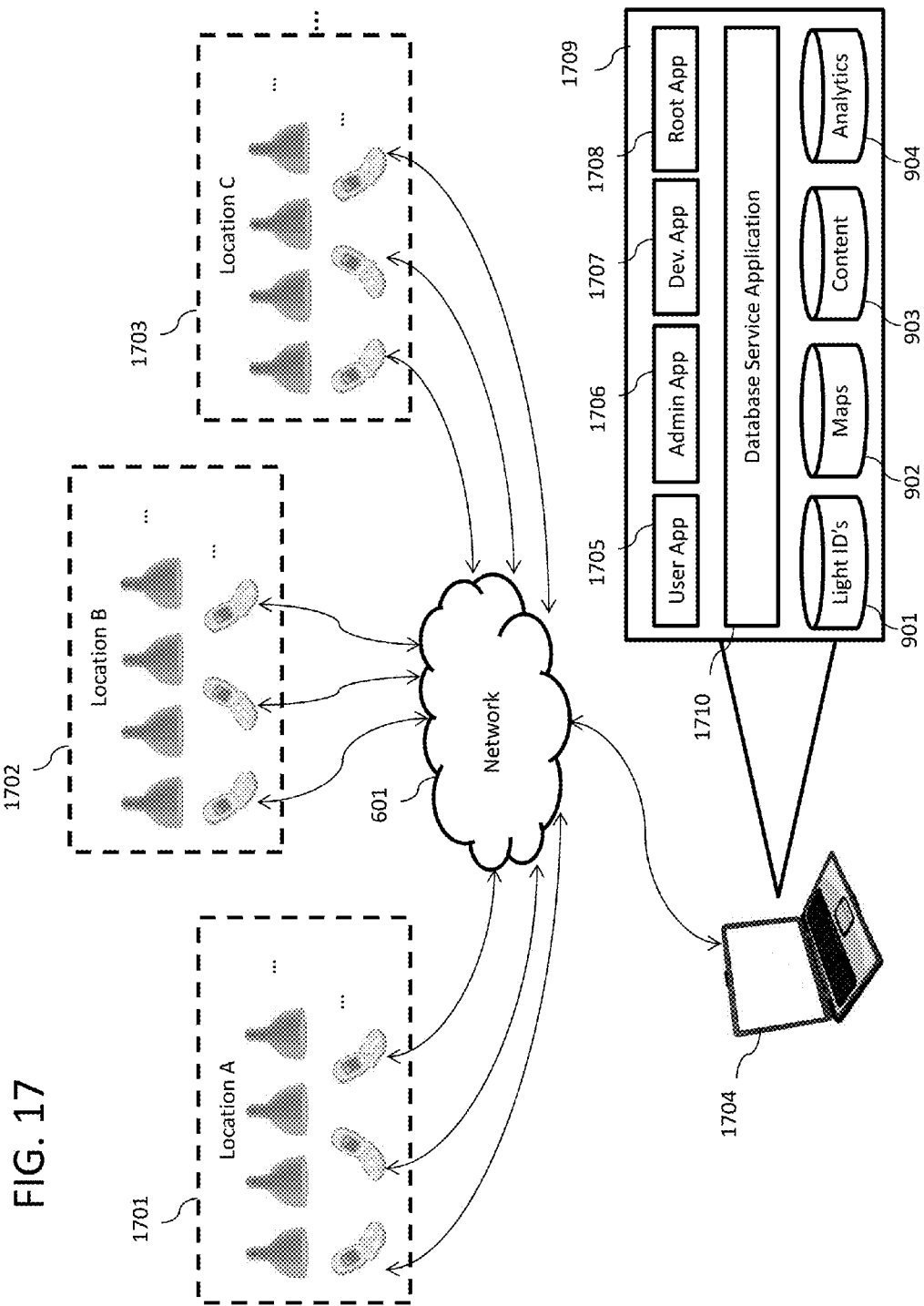
FIG. 17 illustrates how a client accesses multiple light positioning enabled locations with multiple mobile devices.

FIG. 17 is a system diagram describing how a client device 1704 interacts with a light-based positioning system 1709. Network 601 is a generic local or remote network used to connect mobile devices 103 contained in locations A 1701, B 1702, and C 1703 with the light-based positioning service 1709.

Each location contains multiple LED light sources 101, each of which broadcast unique identification codes 701. In order to interact with the system from an operator's perspective, a mobile device may use the database service application 1710 which contains multiple privilege levels for different levels of access. The client privilege level determines read/write permissions to each of these databases. These levels include users 1705 which refer to general front end system users, administrators 1706 which are usually IT or operations management level within an installation, developers 1707 which have access to the application programming interfaces of the system for use in custom application development, and root 1708 level which contains master control over the users and access to everything contained in the system and databases.

Mobile devices in each location 1701, 1702, and 1703 receive identification codes 701 from lights in their respective locations. They then send the received identification codes 701 through the network 601 which connects to database service application 1710, through user application 1705, and has read access to maps 902 and content, and write access to analytics 904. A generic client, 1704, connects to database service application 1710 through network connection 601.

The client uses a password authorized login screen to access the respective permission status. Clients with administrator permissions have read/write access to light IDs 901, read access to maps 902, read/write access to content 903, and read access to analytics 904. Clients with developer permissions 1707 have read access to light IDs, read access to maps 902, read/write access to content 903, and read access to analytics 904. A client with root permissions 1708 has read/write access to databases 901-904.

As an overview, FIG. 17 describes the top-down approach to an exemplary implementation of a light-based positioning system. At the highest level, known locations of installed non-network standalone LED light sources 101 are used to accurately identify the relative position of mobile devices 103. In order to obtain identification information from the lights, the background processes running on the mobile device 103 have been described in FIGS. 14, 15, and 16. Once the mobile device has acquired a unique or semi-unique ID code 701 from the light or combination of lights, it uses this information to query a database 802 for additional information. This information may come in many forms, and is used to create a more personalized experience for the user. As initially mentioned, this local experience is used for location-aware mobile computing, and augmented reality applications. In addition to local personalized information, location-based analytics applications may be enabled from the aggregated data and traffic running through the server 703.

The use of light-based positioning capabilities provide a number of benefits. For example, the positioning information obtained by using light sources is highly precise compared to alternative techniques for positioning information. The accuracy of a light-based positioning system may be down to a few centimeters in three dimensions in some embodiments. This positioning ability enables a number of useful services to be provided. In certain embodiments, additional mobile device information may be used in combination with the positioning information. For example, accelerometer position information may be used in conjunction with light source based position to offer augmented reality or location aware content that relevant to the device's position. The relevant content may be displayed to augment what is being displayed on the mobile device or the display can provide relevant information. Applications on the mobile device may also be launched when the mobile device enters certain areas or based on a combination of criteria and position information. The applications may be used to provide additional information to the user of the mobile device.

The light-based positioning systems and techniques may also be used to manage and run a business. For example, the light-based positioning may help keep track of inventory and to make changes to related databases of information. In a warehouse, for example, the light-positioning system may direct a person to where a particular item is located by giving directions and visual aids. The light positioning may even provide positioning information to direct the person to the correct shelf the item is currently residing on. If the person removes the item, the mobile device may update the inventory databases to reflect the change. The same function may be implemented in a store environment as merchandise locations are changed or updated. This information may then be used in providing content to a user. For example, if a shopper wants more information about an item, the updated location may be used to locate the item or direct the shopper to an online website to purchase an out-of-stock item. In some embodiments, the mobile device using the light-based positioning technique in conjunction with a wireless connection and other information may be used to provide non-intrusive data collection on customers. The data collection of how customers move through a store and where they spend time may be used to improve layout of stores and displays of merchandise.

The light-based positioning systems are also easy and low-cost to set up compared to other location-positioning systems. Since each light source operates autonomously, a building owner only needs to swap out existing light sources for those that provide light-based information to a camera-enabled device. The light sources are non-networked independent beacons that broadcast identification codes configured when manufactured. This allows the light sources to be manufactured at a lower cost compared to networked light sources. Further, the non-networked independent beacon light sources in the light-based positioning system may be easier for building owners to install.

The light-based positioning system may also include optimizations in some embodiments. For example, location information obtained from either the identification code or from alternative techniques can be used to reduce latency in determining position information. This optimization may work through geo-fencing by constraining the search area to find information regarding the captured light sources more quickly. This can reduce the overall delay experienced by a user from the time the mobile device captures the light sources to when relevant position information is provide to the mobile device and/or relevant content is provided to the mobile device.

Efficient Light Bulbs for DPR Schemes

One of the biggest challenges facing beacon-based light-positioning systems is managing the additional power consumption of communication-enabled lighting devices in comparison to that of non-communicating devices. Lighting sources 101 in general, regardless of form factor or technology, are differentiated in part by their power consumption; generally, the less the better. Accordingly, higher energy efficiency is one of the core economic forces driving adoption of Light-Emitting-Diodes (LEDs). However, when using light sources 101 as a means for communication devices, the power requirements tend to increase depending on the modulation scheme since energy must be divided between the carrier wave and the modulation wave. There are many different techniques for transmitting data through light, for example, as discussed in U.S. Ser. No. 12/412,515 and U.S. Ser. No. 11/998,286, and U.S. Ser. No. 11/591,677, the entire disclosure of each of which is incorporated by reference herein. However, these techniques have primarily been pursued without considering their impact on light source 101 parameters, including efficacy, lifetime, and brightness. Since light sources 101 are first and foremost illumination devices, and not communication devices, the communication function takes a secondary role. The present disclosure utilizes Digital Pulse Recognition (DPR) modulation as a technique for transmitting data while minimizing the impact on illumination devices.

Figure 18A:
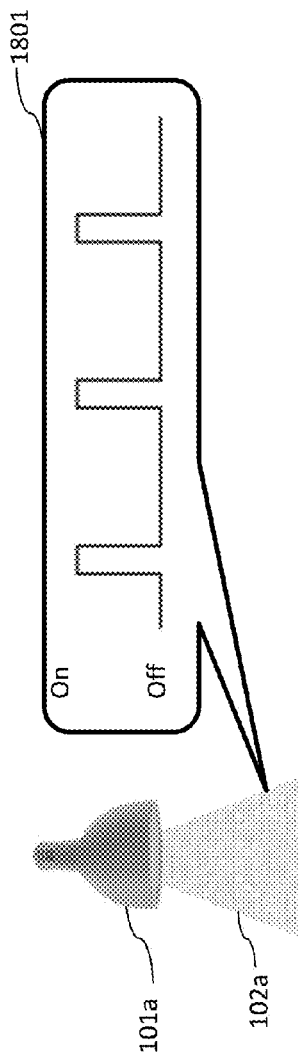
FIGS. 18A-C are representations of a light source undergoing pulse-width-modulation at varying duty cycles, according to some embodiments of the present disclosure.
Figure 18B:
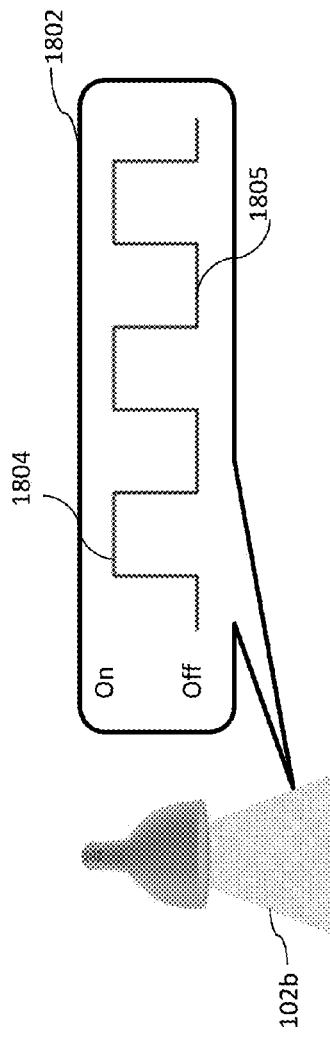
Figure 18C:
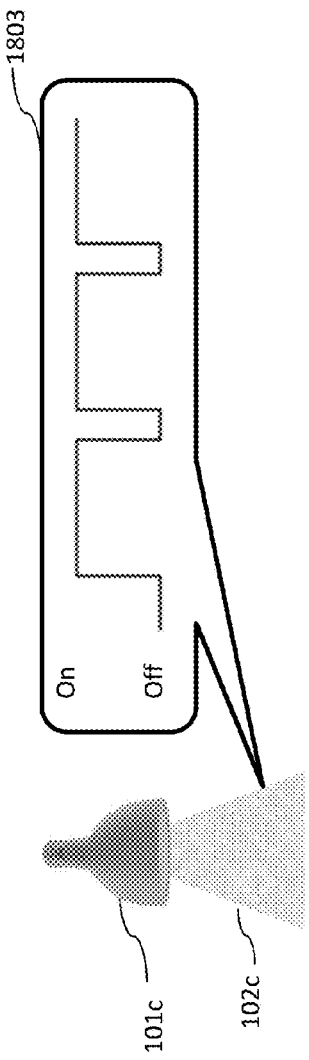

FIGS. 18A-C represent several digitally modulated light sources 101a-c with varying duty cycles; a low duty cycle 1801, a medium duty cycle 1802, and a high duty cycle 1803. A duty cycle is a property of a digital signal that represents the proportion of time the signal spends in an active, or "on," state as opposed to an inactive, or "off,"

state. A light source with a low duty cycle 1801 is inactive for a high proportion of time. A light source with a medium duty cycle 1802 is inactive for about the same proportion of time that it is active. A light source with a high duty cycle 1803 is active for a high proportion of time. The duty cycle of a light source affects the luminosity of the light source. A light source having a higher duty cycle generally provides more luminosity than that same light source with a lower duty cycle because it is on for a higher proportion of time. Duty cycle is one aspect of a modulation scheme. Other aspects include pulse shape, frequency of pulses, and an offset level (e.g., a DC bias).

Because DPR modulated light sources 101 rely on frequency modulation, they are able to circumvent the limitations of traditional AM based approaches. Note that frequency modulation in this context does not refer to modifying the frequency of the carrier (which is the light signal), but instead to modifying the frequency of a periodic waveform driving the light source. One popular technique for dimming LED light sources 101 is pulse-width modulation (PWM), which controls the average power delivered to the light source by varying the duty cycle of a pulse. In a DPR modulation system utilizing PWM, a DPR modulator would control the frequency of the pulses, with the duty cycle determined by the dimming requirements on the light source 101. As used herein, a DPR-modulated light source, having a DPR modulation frequency, refers to a light source having an output modulated in such a manner that a receiver using DPR demodulation techniques may demodulate the signal to extract data from the signal. In some embodiments, the data may include information in the form of an identifier that distinguishes a light source from other nearby DPR-modulated light sources. In some embodiments, this identifier is a periodic tone that the light source randomly selects to identify itself. A periodic tone may be a signal that repeats with a given frequency. In other embodiments, a light source may receive such an identifier from an external source.

To determine the maximum duty cycle (D) supported by DPR demodulation, the modulation frequency (f) of the transmitter and the sampling time for the image sensor ($T_s$) of the receiver are first defined. Next the duty cycle parameters ($T_{off}$) and ($T_{on}$) that correspond to the on and off times of the light source are defined. $T_s$ is an important parameter because the image sensor sampling time defines a minimum amount of modulation time required to produce the banding effects which allow for the frequency detection required for DPR demodulation. The required modulation time may refer to either the $T_{on}$ portion 1804 or the $T_{off}$ portion 1805 of the signal; however, to maximize the brightness of the light source, $T_{off}$ is used as the limiting variable (if solving for the minimum duty cycle, $T_{on}$ may be used). If $T_s$ of the receiving device is less than twice $T_{off}$ of the light source, residual banding on the image sensor will typically not take place; therefore, the signal cannot be extracted. In order for banding to occur, $T_s$ should be greater than twice the value of $T_{off}$ ($T_s > 2 \times T_{off}$).

It is important to note that when designing for the maximum duty cycle, the modulation frequency may be defined from the transmitter side and may be completely independent of the sampling time $T_s$. This is because the sampling frequency $T_s$ is a property of the receiver, which is defined by the image sensor manufacturer and is likely not designed for optimal DPR demodulation properties. $T_s$ varies depending on the specific image sensor, and may be expected to change as more advanced image sensors are developed. Therefore, it is important to optimize such that a broad range of both modulation and sampling frequencies may be used.

In the next sections the equations and variables for the calculation of the maximum duty cycle are described for a variety of test cases.

In order to solve for $T_{off}$ in terms of duty cycle and modulation frequency, one may first start with the fundamental definition of what the duty cycle is: 1 minus the ratio of signal on time divided by the combination of signal on and off time. In the case of a modulated light source, $D=1-T_{off}/(T_{on}+T_{off})$. Next, the modulation frequency (f) may be defined as the inverse of the sum of signal on and off times: $f=1/(T_{on}+T_{off})$. Substituting f into the previous equation for D yields $D=1-f \times T_{off}$. The variable $T_{off}$, which was previously defined as a value less than twice $T_s$, may then be used to define the maximum duty cycle for any given modulation used in DPR demodulation. After rearranging and substituting $T_s$ for $T_{off}$ ($T_{off} < 0.5 \times T_s$), $D=1-f \times (\frac{1}{2}) \times (T_s)$. With this equation, one may now solve for the maximum duty cycle achievable given the modulation frequency of the transmitter, and the sampling time of the receiver.

Since the maximum duty cycle is dependent on both the modulation frequency of the transmitter and the sampling frequency ($F_s=1/T_s$) of the receiver, its exact percentage value may change depending on the present conditions. For testing purposes, the modulation frequency range was chosen to start at 300 Hz, which is above the range which the human eye can see. The modulation frequency range may range from 60 Hz to 5000 Hz. Typical image sensor sampling frequencies ($F_s=1/T_s$) range between 20 kHz and 36 kHz for high-quality image settings (640 by 480 pixel resolution), and 4 kHz to 7 kHz for low-quality image settings (192 by 144 pixel resolution). In some embodiments, the image sensor sampling frequencies may range from as low as 1 KHz to as high as 1 MHz.

When analyzing specific use cases, the duty cycles corresponding to a modulation frequency of 300 Hz and sampling frequencies for high-quality image settings in some embodiments result in $D=1-(300\ Hz) \times (\frac{1}{2}) \times (\frac{1}{20}Khz) =99.25\%$ and $D=1-(300\ Hz) \times (\frac{1}{2})(\frac{1}{36}\ kHz)=99.58\%$. The duty cycles corresponding to a modulation frequency of 300 Hz and typical sampling frequencies low-quality sampling frequencies in other embodiments result in $D=1-(300\ Hz) \times (\frac{1}{2}) \times (\frac{1}{4}\ kHz)=96.25\%$ and $D=1-(300\ Hz) \times (\frac{1}{2}) \times (\frac{1}{7}\ kHz) =97.86\%$. In yet other embodiments, a 2000 Hz modulation frequency and high-quality sampling frequencies of 20 kHz and 36 kHz results in $D=95.00\%$ and $97.22\%$ respectively, and for low-quality sampling frequencies of 4 kHz and 7 kHz results in $D=75\%$ and $85.71\%$ respectively.

After the maximum duty cycle has been calculated, to compensate for the additional power requirements needed for data communication due to the off portion 1804 of the modulation signal, the input power may be increased such that the resulting average power of the communicating light source 101 is identical to the non-communicating light source 101. In effect, the average power of the two light sources will be the same, yielding a perceivably identical luminous output. Take for instance LED source "A" that is powered by 6 watts and modulated where 50% of the time it is "on", and the remaining 50% "off", effectively resulting in a 3-watt average power. In order for this light source 101 to match the luminous output of the 6-watt LED source "B" that is not modulating and is on 100% of the time, one may double the input power from 6 watts to 12 watts. While the input power of "A" was increased, the average power is halved to equal 6 watts; therefore, sources "A" and "B" appear to be identical to the human eye in terms of brightness.

However, there exists a point where increasing the input power may decrease the efficiency of a given light source 101. For LED lighting devices it is important to stay within the manufacturer-specified voltage and, more importantly, current, otherwise efficiency drastically falls with increased supply current. This unwanted effect is known as LED "droop," and generally refers to decreased luminous output for any given individual LED (assuming one or more LEDs per lighting source 101) due to the additional thermal heating resulting from the increased current. In the previous example, the input power to LED source "A" was doubled while the input power to "B" was left unchanged. Assuming that each source was supplied by a constant 12 volts, this means that the input current to source "A" had to have doubled in order to achieve the required 12 watts of power consumption. This equates to a 50% increase in current, when moving from 0.5 amperes to 1 ampere, and may only be performed if within the manufacturers' tolerable input current range for the LEDs.

Given inputs of drive current (Id) and operating voltage (V), one may define the power (P) of a non-modulated light source 101 as P=Id×V, and compare it with the additional required power ($P_{mod}$) of a modulated light source 101. To define the additional power needed due to modulation, one may then define the relationship as $P_{mod}$=P2−(D×Id×V). While the input variables used in this example vary from source to source, this method may be used to accommodate for power loss due to modulation.

One may now solve for the power required to support the maximum duty cycles that were previously solved for. In this example, the power consumed by the non-modulated light source equals P=Id×V=700 mA×12 V=8.4 W. $P_{mod}$ may then be calculated to describe how much extra power is required to support a modulated light source 101 with regard to the duty cycle. Recall that for a modulation frequency of 2000 Hz and sampling frequencies of 20 kHz and 4 kHz, the maximum duty cycle equaled 99.25% and 96.25%. Therefore, the additional power needed to detect a 2000 Hz signal at a sampling frequency of 20 kHz is defined as Pmod=8.4 W−(0.9925×70 mA×12 V)=63 mW, a 0.75% increase in required power on top of the baseline 8.4 W. For 2000 Hz at a sampling rate of 4 kHz, $P_{mod}$=8.4 W−(0.9625×700 mA×12 V)=315 mW, a 3.75% increase in required power.

While finding the maximum duty cycle supported by DPR demodulation is important for maintaining the brightest luminous output levels, it is also important to support the lowest duty cycle possible in order to support the dimmest luminous output levels. This is because the minimum duty cycle corresponds to the dimmest level at which a modulated light source 101 may operate at while still supporting DPR demodulation from a receiving device. In order to account for this, one may consider the $T_{on}$ portion of the signal rather than $T_{off}$. The limiting sampling factor now changes to require that $T_s$ is greater than twice $T_{on}$ ($T_s$>2$T_{on}$). Substituting this condition into the previous max duty cycle equation (replacing {1−D} with D), the resulting equation yields D=(½)×f×$T_s$.

Repeating the above examples for a modulation frequency of 300 Hz and high-quality sampling frequencies (1/$T_s$) of 20 kHz and 36 kHz, D=0.75% and 0.42%, respectively. For a modulation frequency of 2000 Hz with high-quality sampling frequencies, D=5.00% and 2.78%. Considering lower-quality sampling frequencies at 300 Hz and 2000 Hz, D=3.75% and 2.14% for a 300 Hz modulation frequency, and D=25.00% and 14.29% for a 2000 Hz modulation frequency.

In addition to modifying the overall duty cycle, there also exists the opportunity to tune the modulation scheme such that during the "off" portion 1805 of operation the light source 101 does not turn completely off. As described in FIGS. 19A-C, modulation schemes 1901, 1902, and 1903 depict varying duty cycles where a DC bias 1904 has been added which correspond to the modulated light sources 101*a*-101*c*. Modulation schemes where the light source 101 does not turn all the way "off" are important when considering light source 101 brightness, efficiency, lifetime, and the signal to noise ratio (SNR) of the communications channel. The DC bias 1904 during modulation reduces the peak power required to drive the light source for a given brightness. A reduction in peak power will reduce the negative impact of overdriving the lighting source, which is known to cause efficiency losses known as "droop" for LEDs, in addition to decreasing light source 101 lifetimes.

As an example, consider that the average power delivered to the light source is defined as: $P_{av}$=D×$P_{on}$+(1−D)×$P_{off}$, where D is the duty cycle and $P_{on}$, $P_{off}$ are the respective on/off powers. The impact on light source 101 brightness is that increasing the "off" power will increase the total power. This reduces the required peak power delivered to the lighting source, because the power transferred during the "off" period can make up the difference. In a system operating at a duty cycle of 50%, for a fixed brightness B, a 10% increase in the "off" period power translates to a 10% decrease in the "on" period power.

When approaching the above power equation from a constant voltage (V), average current ($I_{av}$), and on/off current ($I_{on}$/$I_{off}$) standpoint (P=IV), $I_{av}$×V=D×$I_{on}$×V+(1−D)×$I_{off}$×V. After removing the constant V, $I_{av}$=D×$I_{on}$+(1−D)×$I_{off}$. For example, in the case of a light source 101 requiring an average drive current ($I_{ave}$) of 700 mA and off current of ($I_{off}$) of 0 A undergoing modulation with a duty cycle (D) of 96.25%, the peak current ($I_{on}$) requirement is $I_{on}$=700 mA/0.9625=727 mA. If instead the current delivered during the "off" time is 100 mA the average current reduces to $I_{av}$=0.9625×700 mA+(1−0.9625)×100 mA=678 mA, a 6.7% decrease in overall required power given constant voltage. In other embodiments, a constant current may be applied with differing voltages to achieve a similar effect.

The impact of non-zero $I_{off}$ values for the previous example is two-fold. First, a reduction in required power is achieved, and second increasing the "off" time power lowers the required duty cycle to achieve a fixed brightness level. For the previous example when solving for D, D=($I_{av}$−$I_{off}$)/($I_{on}$−$I_{off}$). The difference in duty cycle may now be determined for the reduction in peak current from 727 mA to 678 mA, as D=(700 mA−100 mA)/(727 mA−100 mA)=95.69%, which is a 0.56% difference from 96.25%. This essentially allows for a brighter light source 101 with a decreased duty cycle, and lower power requirements.

Another major requirement for DPR modulation is to interface with existing light dimmers. There are a variety of light source 101 dimmers employed on the commercial market. One popular dimming technique is triac dimming. In a triac dimmer, a variable resistor switch is used to control the amount of power delivered to the light source 101 over the AC line. For traditional incandescent and fluorescent sources this is a cost-effective and efficient way to control the power, and thus the brightness, delivered to the light source 101. For LED light sources 101, it is necessary to put a special driver between the triac dimming circuit and the LED source. This is because LEDs are current-driven devices, and thus require an AC/DC converter to transform AC from the power lines to a DC current for driving the LEDs.

Figure 20:
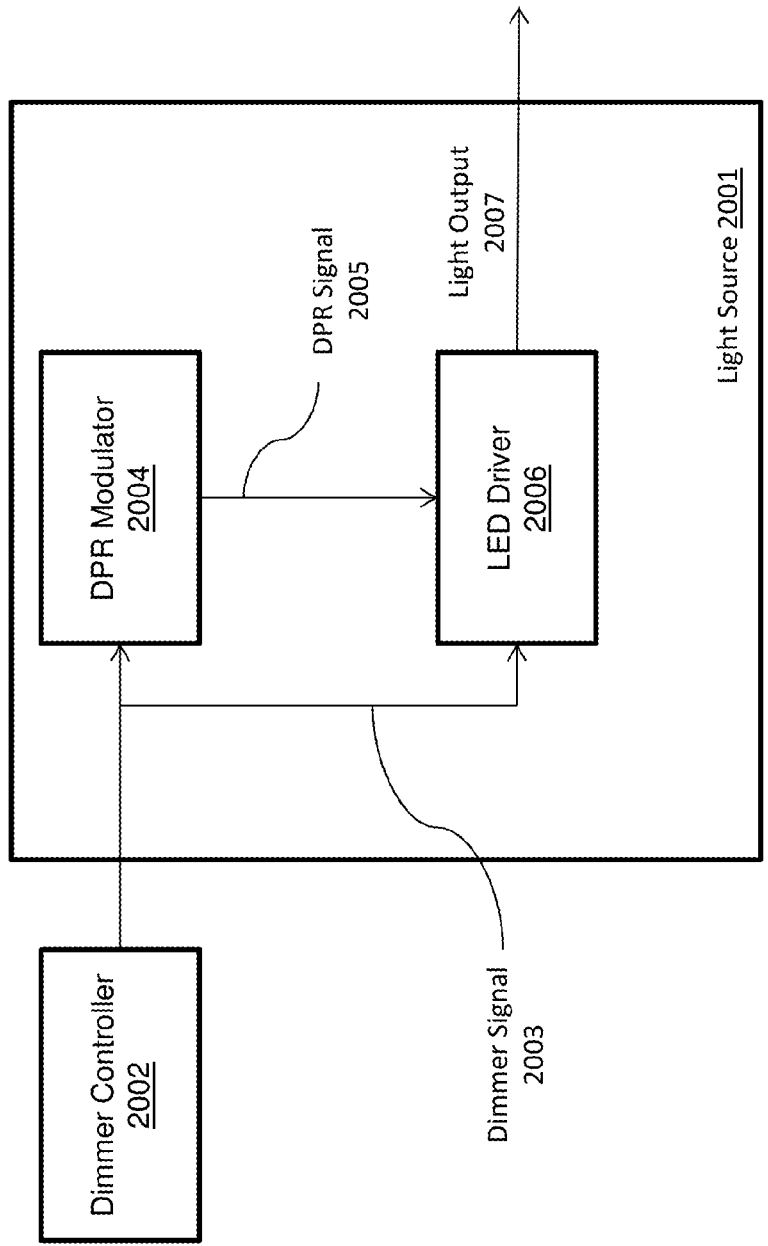
FIG. 20 is a block diagram of a "Digital Pulse Recognition" (DPR) modulator with a dimming control system for a light source, according to some embodiments of the present disclosure.

FIG. 20 demonstrates a system by which a DPR modulator may interface with existing lighting control circuits. A dimmer controller 2002 sends a dimmer signal 2003 to a dimmable LED driver 2006. In the case of an LED light source controlled by a triac dimmer, the dimmer signal would be transmitted across the AC power line. The dimmable LED driver 2006 then converts the dimmer signal to a pulse width modulated signal used for driving the light output 2007 of the source 2001. The configuration of the system diagram shows the dimmer signal 2003 going to both the DPR modulator 2004 and the LED driver 2006; however, this does not always need to happen. In some instances the LED driver 2006 may contain a "master override" input that is designed to supersede any dimmer signal 2003 input. In this case, the dimmer signal 2003 still goes to the LED driver 2006, but is ignored. In other cases where there is not an override input, the dimming signal only goes to the DPR modulator.

DPR modulator 2004 is responsible for sending DPR signals 2005 to the LED driver 2006 that controls the light output 2007. In the case of the light source 2001 being driven by pulse-width modulation as the dimmer signal 2003 from the dimmer controller 2002, DPR modulator 2004 controls the frequency of the PWM signal and selects the desired value. The width of pulses in signals 1801-1803 are determined based on dimmer signal 2003, which indicates the desired light source 2001 brightness level. Note that the dimmer controller 2002 is not contained within the light source 2001, and may output a variety of dimmer signals 2003 (triac, or a proprietary method). Because of this, the DPR modulator 2004 is responsible for interpreting these different signals and appropriately outputting a DPR signal 2005 that corresponds to the desired brightness level of the inputted dimmer signal 2003. In cases where dimming is not required and the dimmer signal 2003 is not present, the DPR modulator 2004 interfaces directly with the LED driver. In some implementations, the DPR modulator 2004 may also be contained inside the LED driver 2006 as part of an integrated solution instead of as a separate component.

Figure 21:
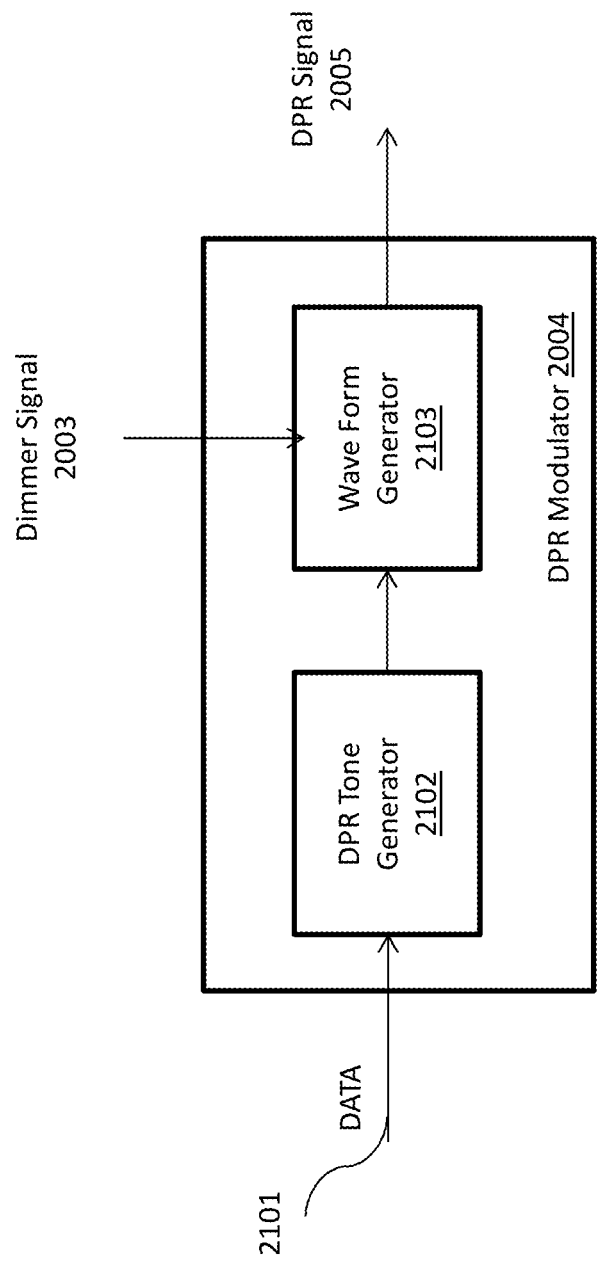
FIG. 21 is a representation of a block diagram of a DPR modulator, according to some embodiments of the present disclosure.

FIG. 21 contains a high level overview of a DPR modulator 2004. Data 2101 is first sent to DPR tone generator 2102. Data 2101 may contain information from any source. In the context of a beacon-based light-positioning system, data may include the identifier for the light. DPR tone generator 2102 converts the data 2101 into a sequence of DPR tones. A DPR tone is a periodic digital signal that oscillates between active and inactive states with a particular frequency. This process is described further in FIG. 22. Depending on the requirements of the data transmission channel, this could either be a single tone (suitable for a beacon based positioning system using light identifiers), or a sequence of tones (if higher data rates are desired by the end user). The DPR Tone(s) 2203 are then sent to the waveform generator 2103, which is responsible for generating the DPR signal 2005 for driving the LEDs. Waveform generator 2103 receives a dimmer signal 2003 input from a dimmer controller 2002, which controls the brightness of the light source. In the case of a DPR tone as a pulse-width-modulated signal, dimmer controller 2002 would control the duty cycle of square wave 1802, while DPR Tone(s) 2203 would control the frequency of the square wave. The result is an output DPR signal 2005, which is then sent to the LED driver 2006.

Figure 22:
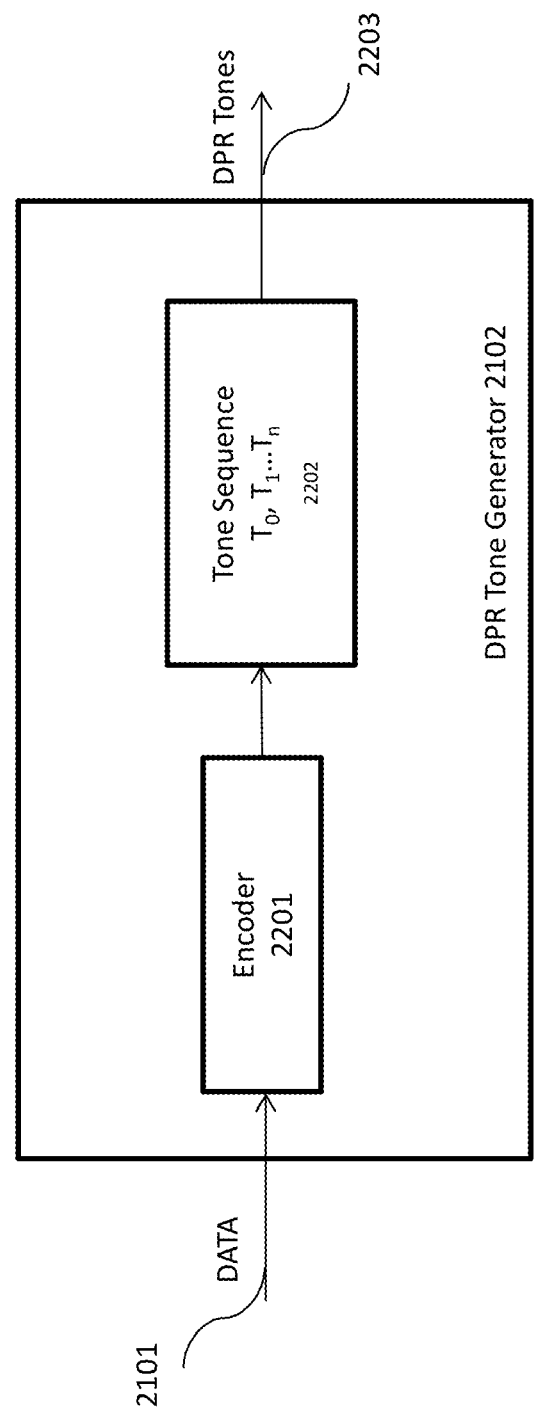
FIG. 22 is a block diagram of an encoder for DPR modulation, according to some embodiments of the present disclosure.

FIG. 22 contains a breakdown of DPR Tone Generator 2102. This module is responsible for taking a piece of data and converting it to a sequence of DPR tones. A DPR tone determines the frequency at which a waveform, such as the square waves from FIG. 18, is sent. The range of possible tones, defined here in as $T_o$ through $T_n$, is determined by both the sampling time, $T_s$, of the image sensor (as discussed in paragraph 0006), and the frequency response of the light source 101. Encoder 2201 is a standard base converter—it takes a piece of data in binary and converts it into a corresponding DPR tone. A typical range for tones created by DPR Tone Generator 2102 is 300 Hz-2000 Hz, in steps of 10 Hz, allowing for 170 distinct DPR tones. The step size between tones is selected to reduce noise, and depending on the requirements could be much higher or lower than 10 Hz. As an example, that data 2101 may contain an identifier of value 10 for light source 101. This identifier is passed to Tone(s) Generator 2102, which generates (or selects from memory) a sequence of tones. Note that the length of a DPR tone sequence could be as low as 1 (in the case of a single tone used in a beacon-based positioning system). In this example, an identifier of 10 would map to a DPR tone of 400 Hz. DPR Tone Generator 2102 could either store the identifier in memory beforehand, using pre-computed mappings of data to tone sequences, or alternatively it could compute this on the fly. The exact method of generating the sequence of tones may be driven by the resources available on the light source 101. Once one of the possible tones sequences 2202 is created, it is sent to Waveform Generator 2103.

Figure 23:
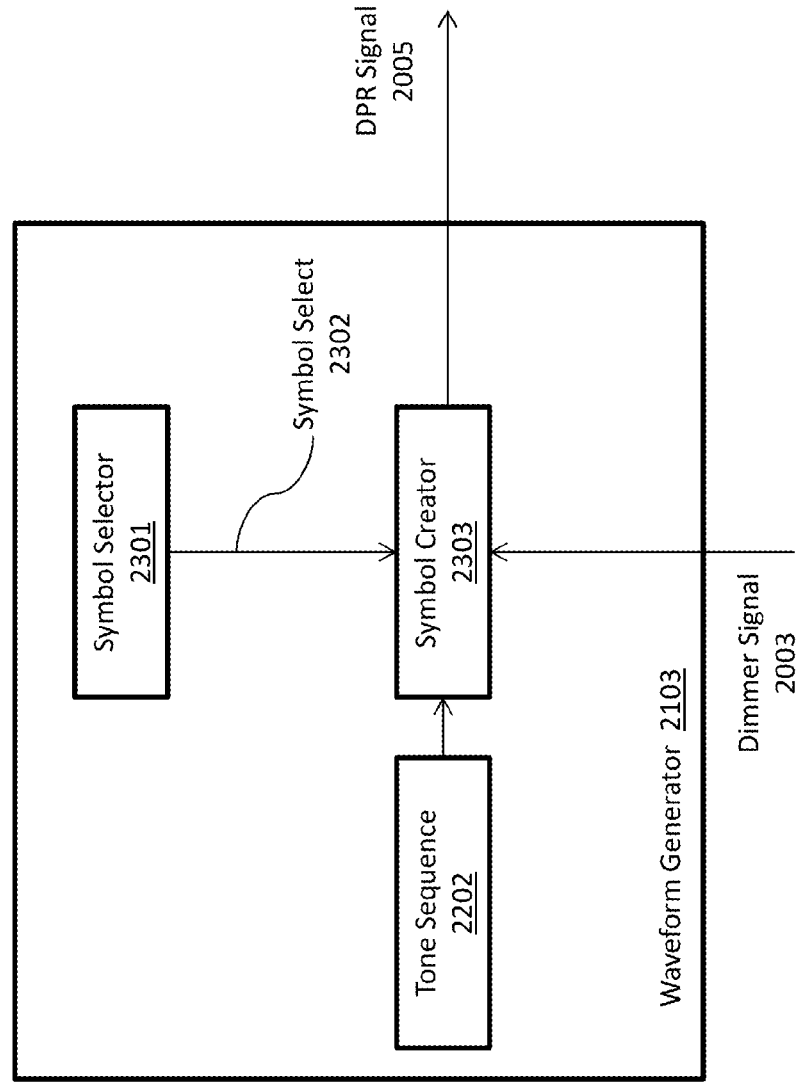
FIG. 23 is a block diagram for a waveform generator for DPR modulation, according to some embodiments of the present disclosure.

FIG. 23 contains the breakdown of Waveform Generator system 2103, which combines a tone sequence 2202 with a waveform from symbol creator 2303 and dimmer signal 2003 to create a DPR signal 2005 for driving light source 101. The resulting waveform will be periodic, with a frequency defined by the sequence of tones, a symbol created based on the list of possible symbols in symbol creator 2303, and an average output (brightness) determined by the dimmer signal 2003. This desired brightness could either be hard-coded on the module, or provided as an external input through a dimming control module. The choice of a symbol is determined within Symbol Selector 2301, which generates a control line 2302 for selecting a symbol from symbol mux 2402.

Figure 24:
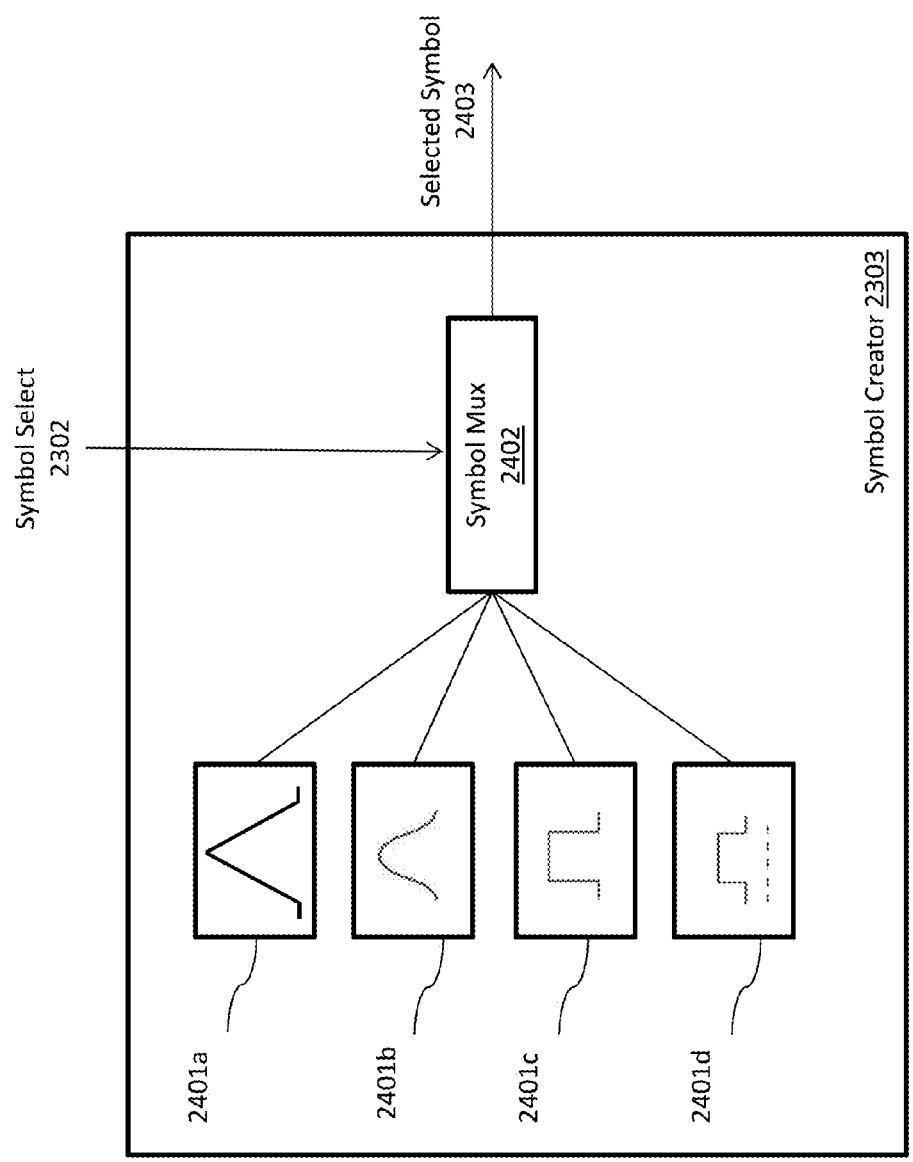
FIG. 24 is a block diagram of a symbol selector system module, which is used to select an appropriate symbol for use in DPR modulation, according to some embodiments of the present disclosure.

FIG. 24 contains the breakdown of Symbol Creator 2303, which holds possible symbols 2401a-2401d. These could include a saw tooth wave 2401a, sine wave 2401b, square wave 2401c, and square wave with a DC offset 2401d, or any other periodic symbol. Symbol creator then takes in a selected symbol 2402, and modifies it such that a desired brightness 2106 is achieved. In the case of a square wave symbol 2401c, dimmer signal 2003 would modify the duty cycle of the square wave. The resulting waveform is then sent to output signal 2005 for driving the light source.

The goal of the output waveform 2105, which drives light source 101, is to illuminate a scene in such a way that the DPR modulated signal may be picked up on any standard mobile device 103. Reducing flicker on video which is under illumination from fluorescent lamps is a well-known problem. The flicker is caused by periodic voltage fluctuations on the AC line powering the lamp. For a lamp powered by a 50 Hz AC line, the luminance level changes at 100 Hz. This causes alternating white/dark bands to appear in video recorded with CMOS imagers. The bands are a result of the rolling shutter mechanism on CMOS imagers, which partially expose different areas of the image at different points in time. The lines on the image may occur on both, one, or on multiple frames, and may appear to move in time. See, for example, U.S. Pat. No. 6,710,818, the entire contents of which is hereby incorporated in its entirety, which describes methods for detecting and removing this unwanted effect. Possible algorithms for mitigating flicker include automatic exposure control, automatic gain control, and anti-banding. These techniques are common in many mobile devices as a means to remove flicker caused by fluorescent lamps.

Advanced DPR Demodulation Techniques

DPR demodulation, instead of removing flicker, exploits the rolling shutter effects of CMOS cameras as a means of transmitting data. A CMOS device with a rolling shutter captures an image frame by sequentially capturing portions of the frame on a rolling, or time-separated, basis. These portions may be vertical or horizontal lines or "stripes" of the image that are captured at successive time intervals. Because not every stripe is captured in the same time interval, the light sources illuminating the image may be in different states at each of these time intervals. Accordingly, a light source may produce stripes in a captured frame if it is illuminated in some time intervals and not illuminated in other time intervals. Light sources that broadcast digital pulse recognition signals may produce patterns of stripes. Since the pattern of stripes is dependent on the frequency of the digital pulse recognition signal, and the speed of the rolling shutter can be determined a-priori, image processing techniques may be used to deduce the illumination frequency based on the width of the stripes. For example, consider a room containing five light sources 101, each broadcasting at 500 Hz, 600 Hz, 700 Hz, 800 Hz, and 900 Hz, respectively. Each distinct frequency, otherwise known as a DPR tone, may be used to identify the light source 101. In a beacon-based light-positioning system, a mobile device receiver within view of the transmitting lights can detect the DPR tones, correlate an identifier associated with the tone, and then use a lookup table to determine the location of the device based on the location associated with the identifier(s).

Figure 25:
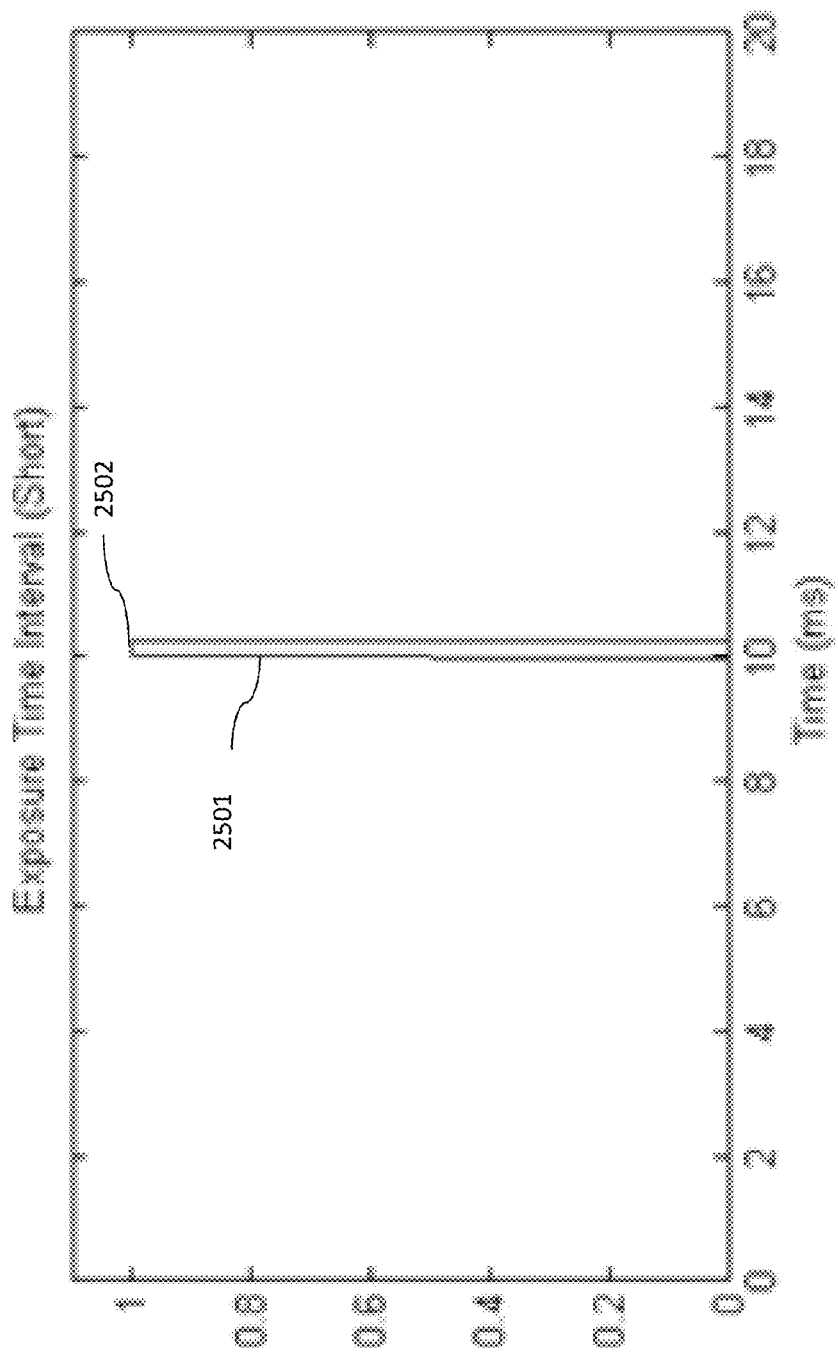
FIG. 25 is a plot of a camera sampling function, according to some embodiments of the present disclosure.

Modeling the camera sampling function is advantageous in understanding how DPR demodulation works on modern image sensors, and how the impacts of various hardware-dependent parameters affect the DPR signal 2105. To represent this, FIG. 25 is a continuous time representation 2501 of how an individual row on a rolling shutter image sensor is sampled. The exposure time interval 2502 represents the period over which light accumulates on the photo sensor. If the exposure time is much lower than the period of the DPR modulated signal, the light and dark bands will be clearly defined. If the exposure time is longer, the light and dark bands will lose their definition.

Figure 26:
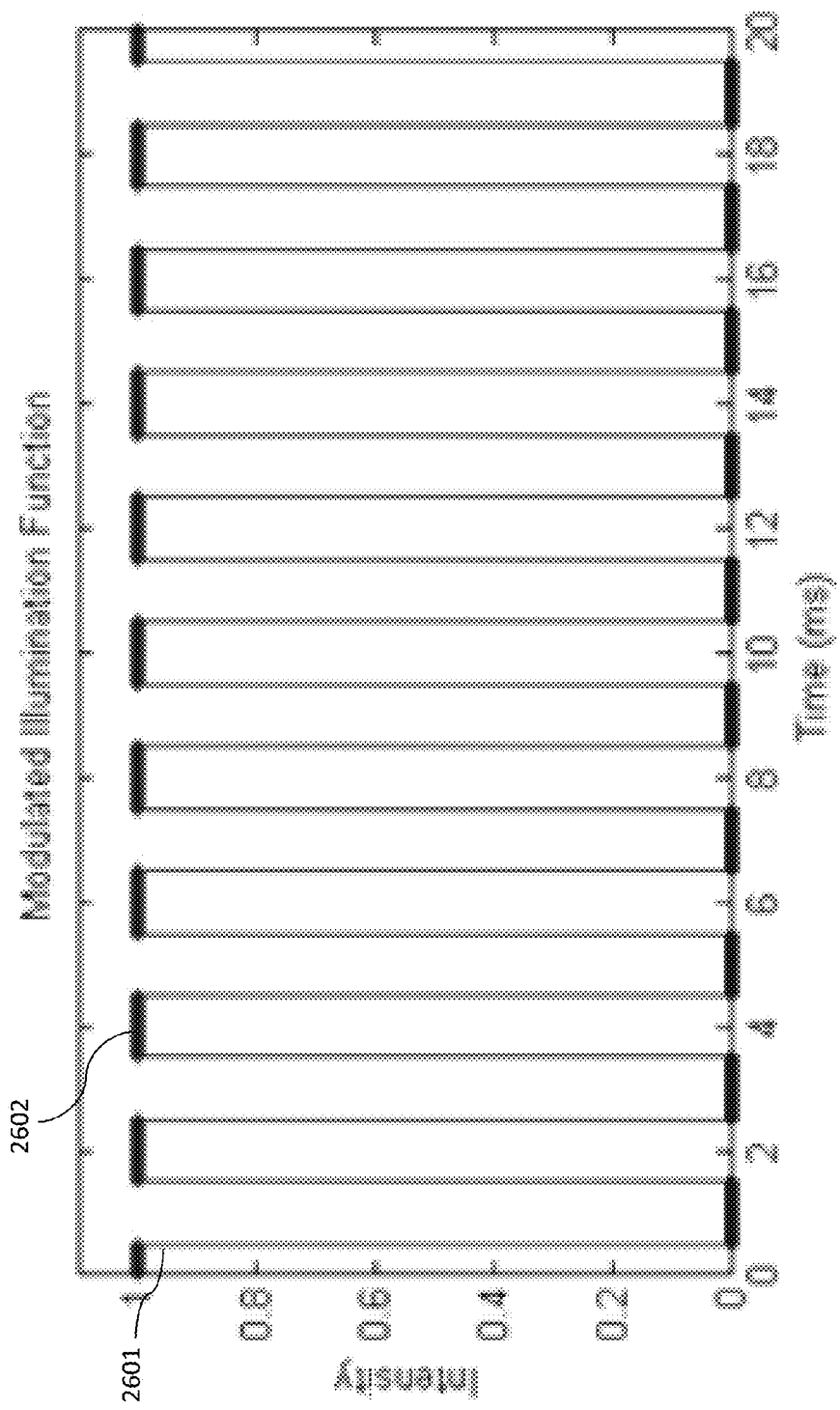
FIG. 26 is a plot of a modulated illumination function undergoing DPR modulation at a frequency of 300 Hz, according to some embodiments of the present disclosure.

FIG. 26 contains a continuous time example 2601 of a DPR modulated light signal. In this example, the signal is a square wave with a 50% duty cycle being driven at a DPR tone of 300 Hz. The relationship between the DPR illumination period 2602 and the exposure time 2502 determines how well defined the bands are on the received image.

Figure 27:
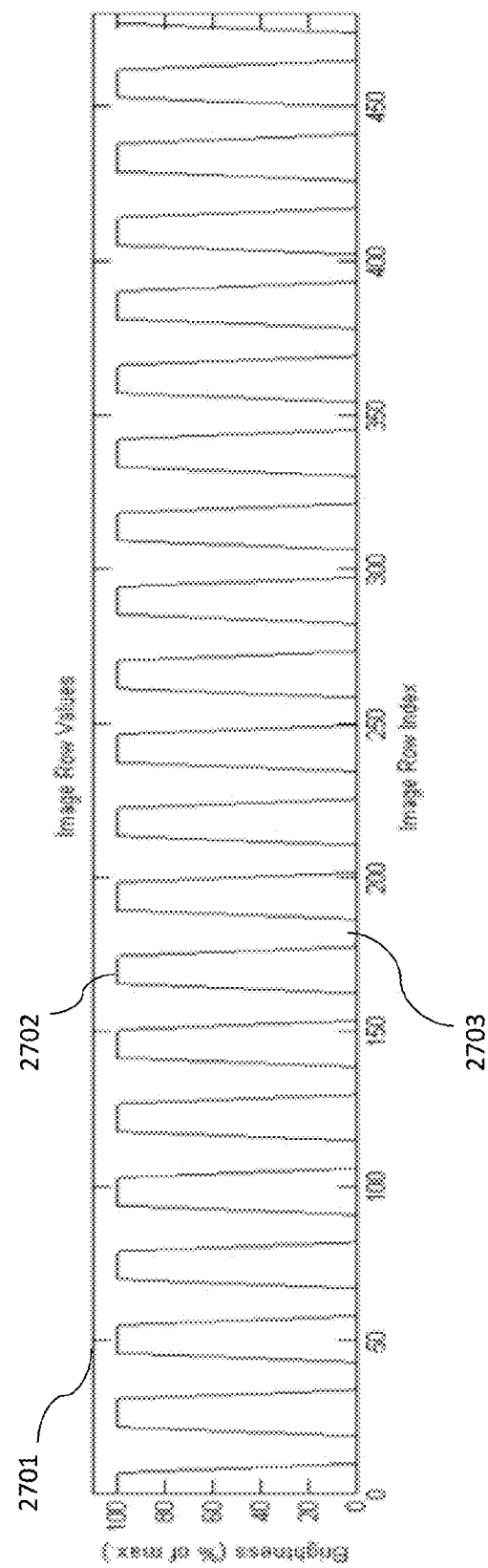
FIG. 27 is a plot of a convolution of a camera sampling function and a DPR modulated light signal, according to some embodiments of the present disclosure.

FIG. 27 is the continuous time sampled image 2701, created by convolving an individual row sampling function 2501 with a DPR modulated signal 2601. The alternating periods of high brightness 2702 and low brightness 2803 are caused by the DPR modulation frequency, and appear as alternating white/dark bands on the received image.

Figure 28:
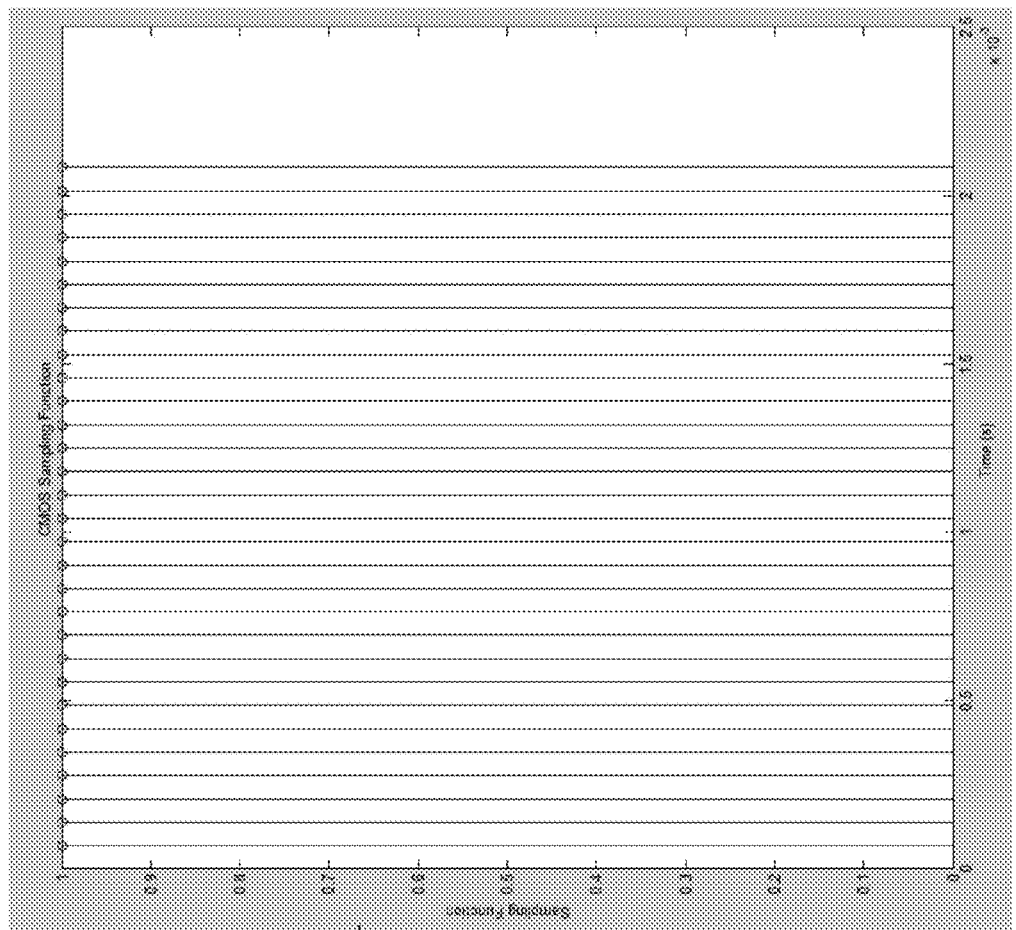
FIG. 28 is a model of the CMOS sampling function for a rolling shutter, according to some embodiments of the present disclosure.
Figure 29:
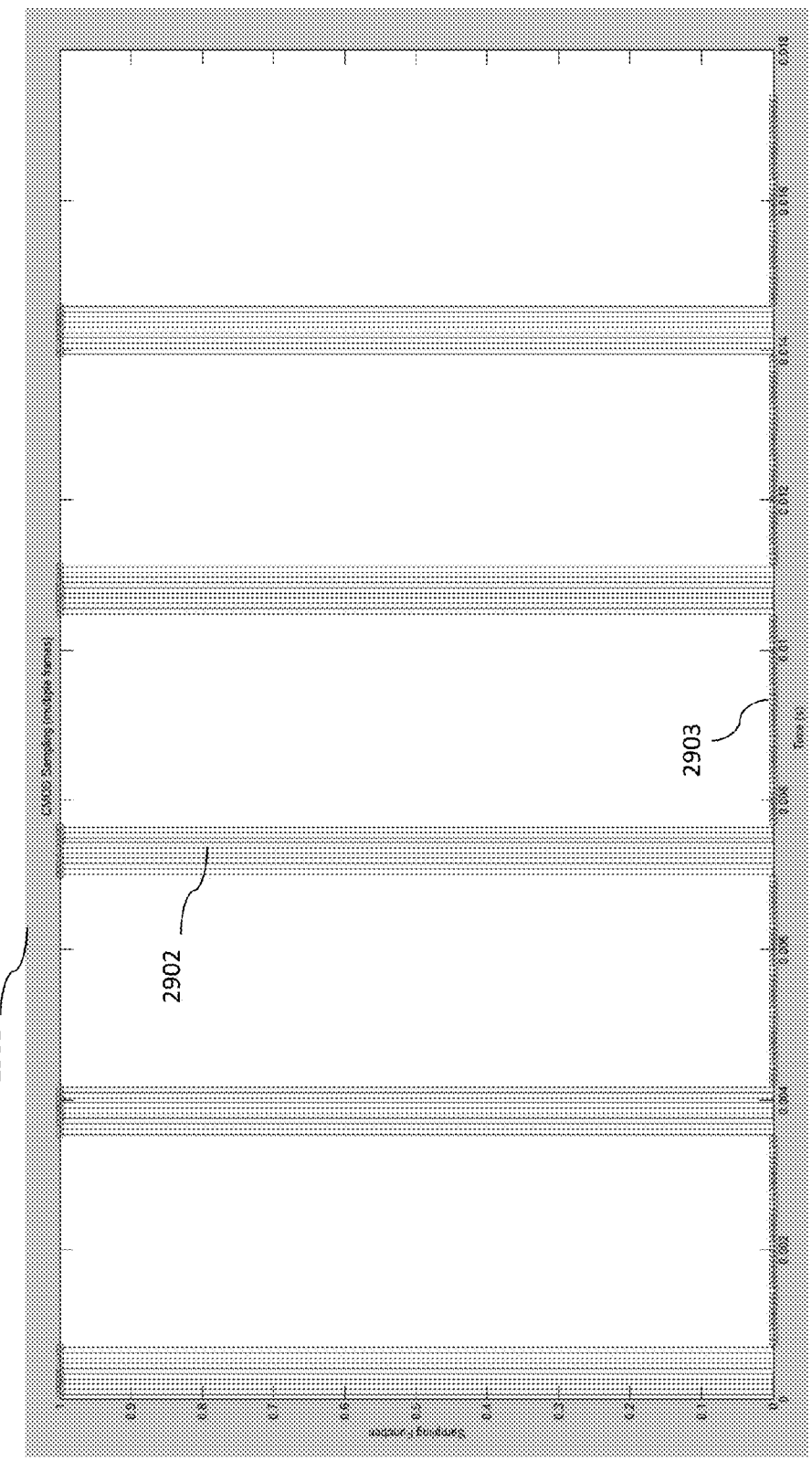
FIG. 29 is a plot of a sampling function for a CMOS rolling shutter over multiple frames, according to some embodiments of the present disclosure.

FIG. 28 is a representation of a discrete time-domain signal model 2801 for representing how a rolling shutter on an image sensor samples the incoming light pulses 2601. The rolling shutter is modeled as an impulse train, containing a sequence of the Dirac Delta functions (otherwise known as a Dirac comb). Each impulse is separated by an interval, T, which corresponds to the speed of the rolling shutter commonly found in most CMOS image sensors. The interval T varies from device to device which causes the bands on scenes illuminated by DPR modulated signals to vary in size. The mobile device 103 preferably accounts for hardware-dependent factors (e.g., rolling shutter speed) to properly determine the DPR tone. FIG. 29 contains a discrete time representation 2901 of the rolling shutter sampling functionality over multiple frames.

Because rolling shutter speeds are typically faster than frame rates, DPR demodulation on current imaging technology is capable of much higher data rates than modulation schemes that sample on a per-frame basis. In a DPR modulated system using a 640×480 pixel image sensor, the sensor would capture 480 samples per frame (represented as 480 consecutive delta functions in sensor model 2801). A demodulation scheme using a global shutter would only be capable of taking one sample per frame. This is a key advantage for indoor positioning using beacon-based broadcasting schemes because the time-to-first-fix is orders of magnitude faster than competing technology, which may take several seconds to receive a signal. For example, consider a typical mobile device 103 camera which samples at 30 frames per second (FPS). Using DPR demodulation, time-to-first-fix may be achieved with as little as a single frame, or 1/30 of a second, versus 1 second for a demodulation scheme that samples on a per-frame basis. This compares to a time-to-first-fix of up to 65 seconds for GPS, 30 seconds for assisted GPS, and 5-10 seconds for WiFi positioning.

This order of magnitude improvement opens the door for applications in which latency for time-to-first-fix must be minimized. Furthermore, computation for DPR demodulation may be performed on the mobile device itself, versus the server-side processing required for WiFi fingerprinting algorithms. In a mobile environment, where connection to a network is not guaranteed, client-side processing provides a major advantage. In the future, it is expected that image sensors will have much higher frame rates. In this scenario, DPR demodulation may be adjusted to sample on a per-frame basis, instead of a rolling shutter basis. The key principle is that the demodulator may be adjusted in software, allowing future mobile devices to tune their receiving characteristics to receive DPR signals. The software adjustments that need to be applied are the subject of the following sections.

Configuring a Device for DPR Demodulation

Figure 30:
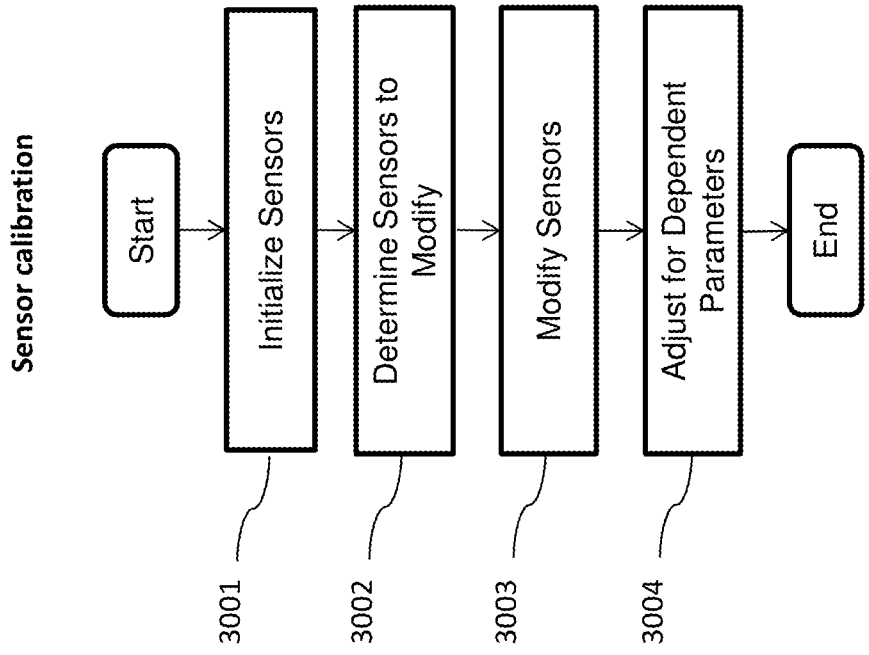
FIG. 30 is a high level flow chart of an algorithm for configuring a mobile device to receive DPR modulated signals, according to some embodiments of the present disclosure.

In order to prepare a mobile device 103 to receive the modulated DPR signals 2105, the device is first configured. This is to counteract the flicker-mitigation algorithms typically applied in mobile device image sensors. FIG. 30 describes the method by which mobile device 103 is configured to receive DPR modulated signals. First, the initialize sensors 3001 function initializes and activates the available sensors capable of receiving data. For typical modern mobile devices these would include both the front- and rear-facing cameras. Here, a "front-facing" camera or other sensor of a mobile device is one that is mounted on the same side of the device as its display and is therefore likely to face toward a user. In one preferred embodiment, the rear-facing camera or another rear-facing is used because it is more likely to have a view of the user's surroundings that is relatively unoccluded by the user's own body and thus to record light cast directly by local light sources. Determine sensors to modify 3002 then decides which sensors need to be modified. A number of possible factors determine whether or not a particular sensor should be initialized then modified, including power consumption, accuracy, time since last reading, environmental conditions, required location accuracy, and battery state.

Modify sensors 3003 then passes a list of the appropriate sensors which need to be modified to a function which has additional information about the mobile device 103 and adjusts the demodulation scheme for device specific limitations 3004. In the case of using an embedded mobile device 103 camera to demodulate DPR signals, possible sensor parameters to modify include exposure, focus, saturation, white balance, zoom, contrast, brightness, gain, sharpness, ISO, resolution, image quality, scene selection, and metering mode. As part of the modification step 3003, sensor parameters such as exposure, white-balance, and focus are locked to prevent further adjustments.

After the sensors are modified 3003, specific hardware limitations are adjusted for in the demodulation scheme by using a device profile. The most important of these is the rolling shutter speed. Because different models of mobile device 103 will, in general, have different camera sensors, the line width of the DPR tone measure on an image sensor will vary across hardware platforms for a fixed frequency. For this reason, it is necessary to adjust the stripe width one is looking for depending on the specific characteristics of the device. In the Fourier Techniques discussed later on in the application, modifying the stripe width corresponds to modifying the sampling frequency of Dirac Comb 2801.

There are a number of challenges associated with controlling the camera parameters to optimize for DPR demodulation. One challenge is overriding the automatic parameter adjustments that mobile operating systems typically provide as part of their camera application programming interfaces (APIs). In the case of an embedded image sensor, the sensor settings are adjusted automatically depending on factors such as but not limited to ambient light conditions, areas of focus, distance from objects, and predetermined scene selection modes. For instance, when taking a picture with an image sensor, if the scene is dark then the exposure time is automatically increased. When taking picture of a scene mode with fast moving objects, the exposure time is usually decreased.

When using an image sensor for DPR demodulation, these automatic adjustments may introduce noise into the signal, causing higher error rates. Specifically in the case of exposure, longer exposure times correspond to lower data rates, which correspond to a decreased amount of available light IDs 901. At the edge case, if the exposure time is sufficiently long, then the sampling rate will drop so low that DPR demodulation becomes extremely challenging as the signal is severely under-sampled. Furthermore, if the camera is constantly adjusting, then the performance of background subtraction (discussed later), which isolates the moving stripes from the rest of the picture, will be significantly impaired. This is because the automatic adjustments are constantly changing the pixel values. In order to successfully transmit DPR signals, these automatic adjustments need to be accounted for.

Practically speaking, many mobile device 103 APIs do not allow for the modification of sensor parameters in the top-level software. The proposed method in FIG. 31 describes a method for working around the provided APIs to control the exposure. Current APIs do not allow for manual exposure control, so instead of manually setting the exposure, an algorithm is presented that exploits the metering functionality to minimize the exposure time.

Figure 31:
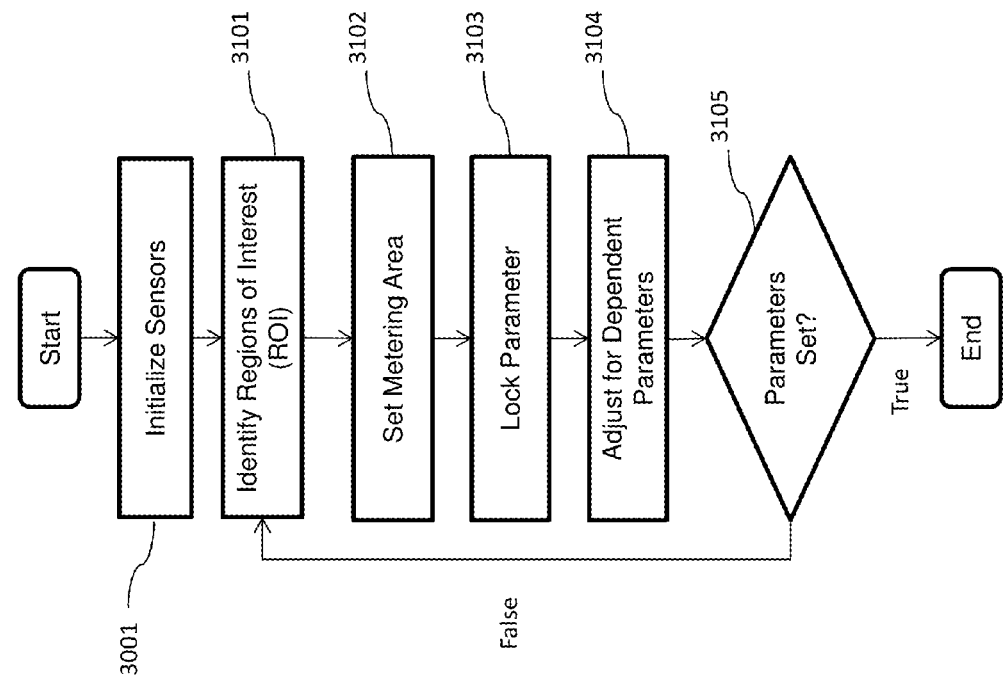
FIG. 31 is a high level flow chart of an algorithm for minimizing and locking camera settings using existing mobile device application programming interfaces (APIs), according to some embodiments of the present disclosure.

FIG. 31 contains a process for modifying the various sensor parameters contained in a mobile device 103 in a way that overcomes the limitations imposed by current camera APIs. In the algorithm, the first step is to initialize the required sensors 3001. For the case of an image sensor, this involves setting the frame rate, data format, encoding scheme, and color space for the required sensors. After the image sensors have been initialized 3001, the algorithm searches for regions of interest 3101. In the case of setting the exposure using metering, these regions of interest 3101 would be the brightest regions of the image. Set metering area 3102 then sets the metering area to the brightest portion, effectively "tricking" the mobile device 103 into lowering the exposure time. Lock parameter 3103 then locks this exposure time to prevent the auto-adjustment feature of the camera from overriding the manual setting. Next, adjust for hardware dependent parameters 3104 accesses a lookup table and adjusts the demodulation algorithm based on hardware and software differences. For the case of an image sensor, one example of this is changing the sampling time based on the rolling shutter speed of the device. This rolling shutter speed may either be loaded from a lookup table beforehand (using predetermined values) or measured on the fly. Each device only needs to measure its rolling shutter speed once per image sensor. Once parameters set? 3105 is satisfied the algorithm ends; otherwise, it returns to identify regions of interest 3101.

The method of exploiting the metering area on a mobile device 103 may be used to optimize many of the required parameters in addition to the exposure, including white balance, contrast, saturation, ISO, gain, zoom, contrast, brightness, sharpness, resolution, image quality, and scene selection. Furthermore, these parameters could already be known beforehand, as each mobile device 103 will have its own "device profile" containing the optimal camera settings. This profile could be loaded client side on the device, or sent over a server. Note that although the method of using the metering area to control the exposure may improve the performance of DPR demodulation, it is not strictly necessary. Simply locking the exposure 3103 is often sufficient to prevent the automatic camera adjustments from filtering out the DPR signals.

Advanced Techniques for Decoding Information in DPR Modulated Signals

Figure 32:
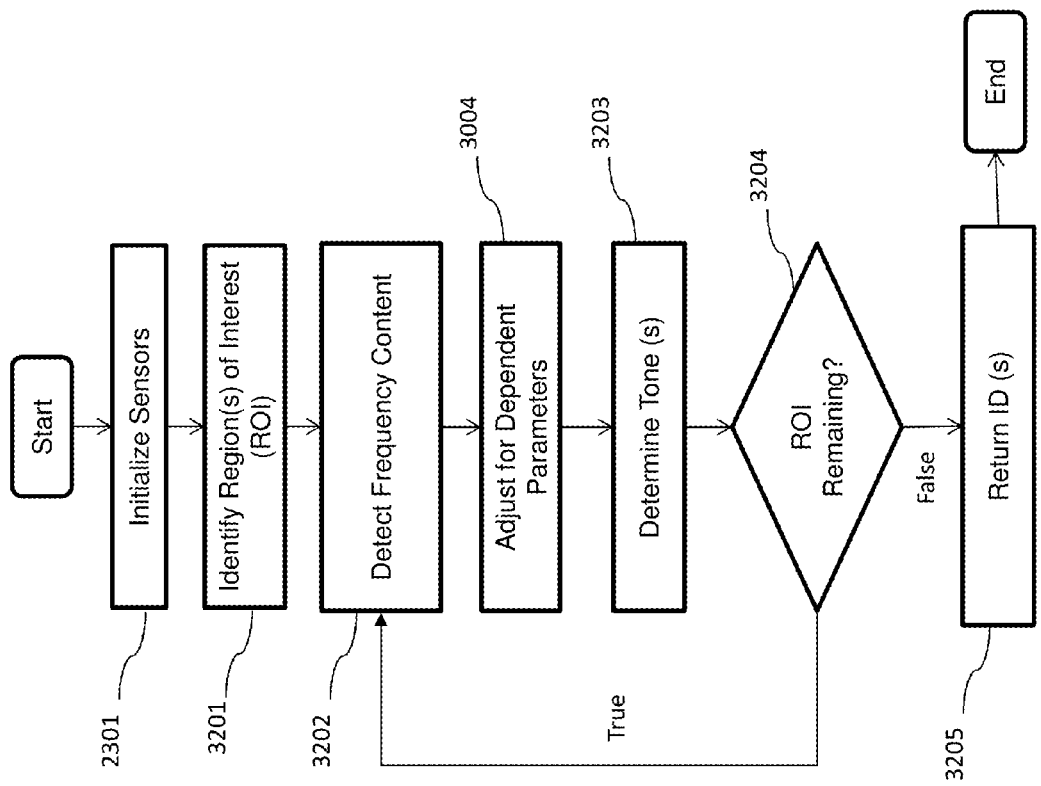
FIG. 32 is a high level flow chart of an algorithm for receiving DPR signals on an image sensor, according to some embodiments of the present disclosure.

Once the sensors have been initialized 3001 and parameters have been set 3104, FIG. 32 describes a process for decoding the information contained inside a DPR modulated signal. Identify regions 3201 is used to separate different regions on the image illuminated by DPR signals. At the base level, the region of interest is the entire image. However, when one or more light sources 101 are present, there exists an opportunity to receive multiple DPR signals simultaneously. In this scenario, the sensor effectively acts as a multiple antenna receiver. Such multiple antenna systems, more generally referred to as multiple-input multiple-output (MIMO), are widely used in the wireless networking space. This is an example of spatial multiplexing, where wireless channels are allocated in space as opposed to time or frequency. The implications of MIMO for DPR demodulation in a beacon-based light-positioning system is that frequencies may be re-used in a space without worry of interference. When a mobile phone user receives DPR modulated signals on a photodiode array (such as an image sensor, or any imaging technology that contains multiple spatially separated sensors), the DPR signals will each appear at different locations on the sensor. Each region 3201 of the image may then be processed independently, in the same way that each mobile phone user in a cell network only connects to the cell they are closest to.

This works in a way analogous to cellular phone networks. With cellular networks, mobile phone users only communicate with cellular towers that are close to them. This allows multiple mobile phone users to share the same frequency, provided they are all on different cells. In DPR modulation, each light acts as its own cell transmitting unique frequencies. However, different lights may also use the same frequency provided that they are far enough apart. Re-using the same frequencies in different space allows for greater system scalability, since lighting sources 101 may be installed at random without requiring the installer to worry about frequency allocation.

After sensors have been initialized 3001, and regions of interest 3201 have been identified, detect frequency content 3202 identifies the presence of DPR tones from the sensor data. Described here are multiple methods for extracting the frequency content from a DPR signal. One possibility is to use line-detection algorithms to identify the pixel width of the stripes, which directly corresponds to the transmitted frequency. This stripe width is then used to access a lookup table that associates width and transmitted frequency and determines the transmitted tones. Possible methods for detecting lines include Canny edge detection, Hough Transforms, Sobel operators, differentials, Prewitt operators, and Roberts Cross detectors, all of which are well developed algorithms, known to those of skill in the art. Adjust for dependent parameters 3004 then modifies the appropriate camera sensors for optimal DPR demodulation. In the case of line detection, this corresponds to a linear adjustment for the line width lookup table. Determine tones 3203 uses the adjusted line width to determine the DPR tone sent. This process is performed for each region on the image, until there are no more regions 3204 remaining. A data structure containing all the regions, with their associated identifiers, is then returned 3205.

Figure 33:
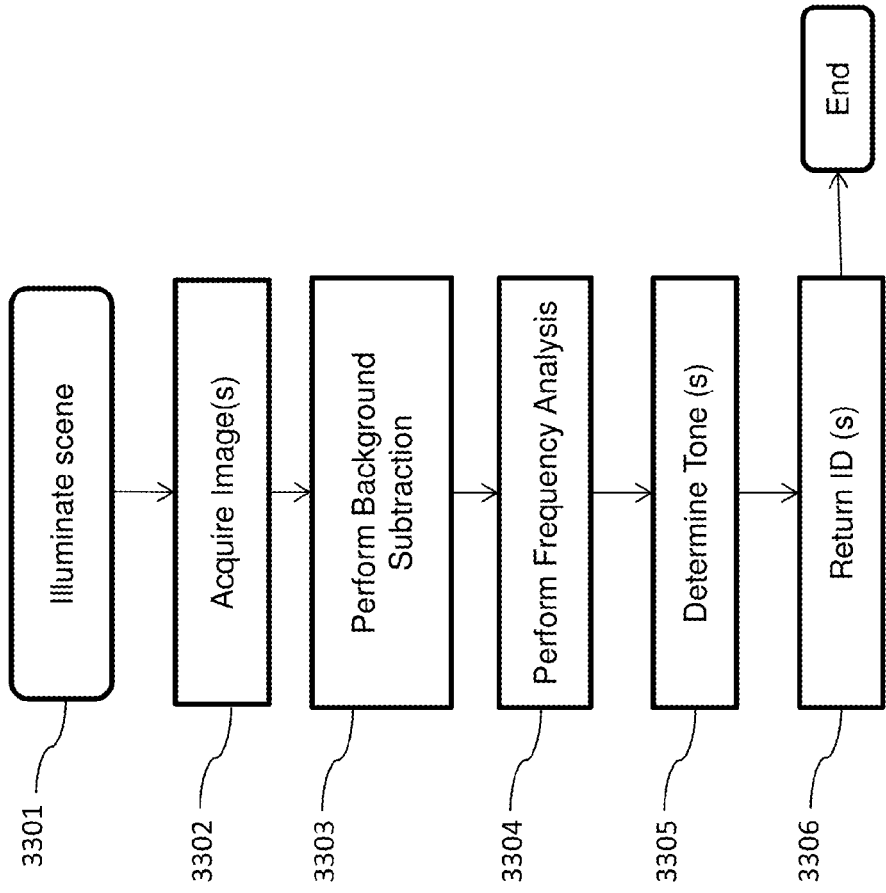
FIG. 33 is a high level flow chart of an algorithm for determining tones embedded within a DPR illuminated area, according to some embodiments of the present disclosure.

An additional method for performing DPR demodulation is described in FIG. 33. One or more light sources 101 illuminates a scene 3301. When the image sensor on mobile device 103 acquires a sequence of images 3302, the brightness of any given pixel depends on both the details of the scene as well as the illumination. In this context, "scene" refers to the area within view of the camera. The scene dependence means that pixels in the same row of the image will not all have the same brightness, and the relative brightness of different image rows is not solely dependent on the modulated illumination 3301. If one were to take the Fourier transform of such an image, both the frequency content of the illumination, as well as the frequency content of the underlying scene, will be present.

In order to recover the frequency content of the modulated illumination independently of the scene, the contribution of the scene may be removed using a background subtraction algorithm 3303. The "background" is the image that would result from un-modulated illumination as opposed to the effects of modulated illumination 3301. Subtracting the background from an image leaves only the effects of illumination modulation. One possible implementation of a background subtraction method uses a video sequence. If a video of a scene illuminated with modulated light is recorded, the light and dark bands may appear at different locations in each frame. For any modulation frequency that is not an exact multiple of the video frame rate, there will be a resulting beat frequency between the video frame frequency and the illumination modulation frequency. The illumination signal will be in a different part of its period at the beginning of each frame, and the light and dark bands will appear to be shifted between video frames (i.e. the bands will appear to move up or down across the scene while the video is played). Although this algorithm is described with the use of a video sequence, other embodiments may perform background subtraction using still images.

Because the bands move between video frames, the average effect of the bands on any individual pixel value will be the same (assuming that in a long enough video each pixel is equally likely to be in a light or dark band in any given frame). If all the video frames are averaged, the effects of the bands (due to the illumination modulation) will be reduced to a constant value applied to each pixel location. If the video is of a motionless scene, this means that averaging the video frames will remove the effect of the bands and reveal only the underlying scene (plus a constant value due to the averaged bands). This underlying scene (the background) may be subtracted from each frame of the video to remove the effects of the scene and leave only the effects of illumination modulation 3301.

Figure 34:
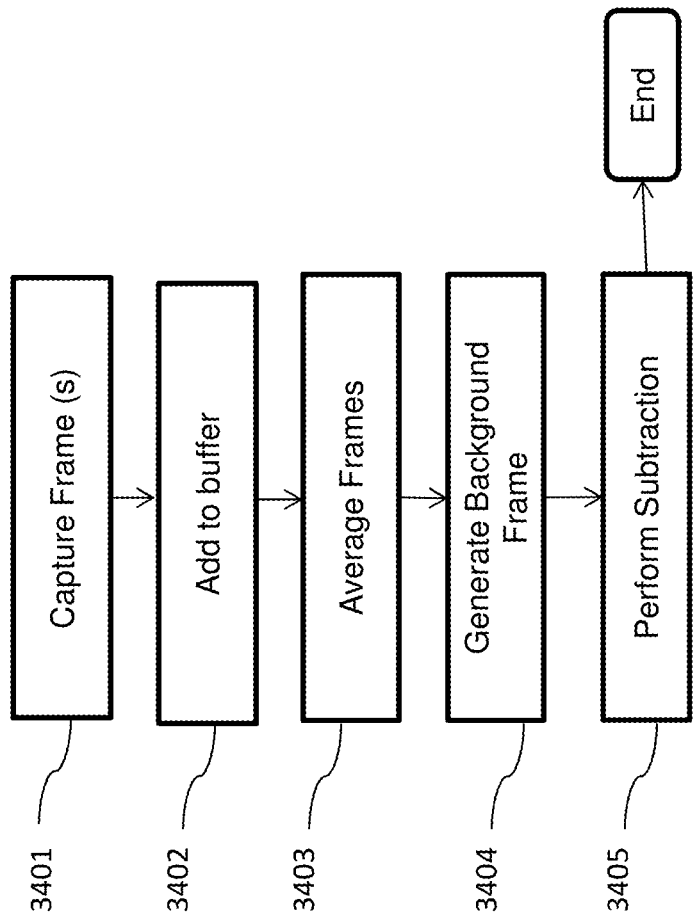
FIG. 34 is a high level flow chart of an algorithm for performing background subtraction on images gathered from a DPR illuminated scene, according to some embodiments of the present disclosure.

FIG. 34 contains an implementation of a possible background subtraction algorithm 3304. A frame buffer 3402 accumulates video frames 3401. The size of this buffer can vary, depending on the memory capacity of mobile device 103 and the required time to first fix. Frame averaging 3403 computes the average based on the frames in the buffer 3402. The average of these frames is used to generate background frame 2704. The background frame may be acquired using a number of different averaging techniques 3403, including a simple numerical average, a normalized average (where each frame is divided by the sum of all the frames), Gaussian averaging, or by doing a frame difference between subsequent frames. A frame difference simply subtracts subsequent frames from one another on a pixel-by-pixel basis.

Figure 35:
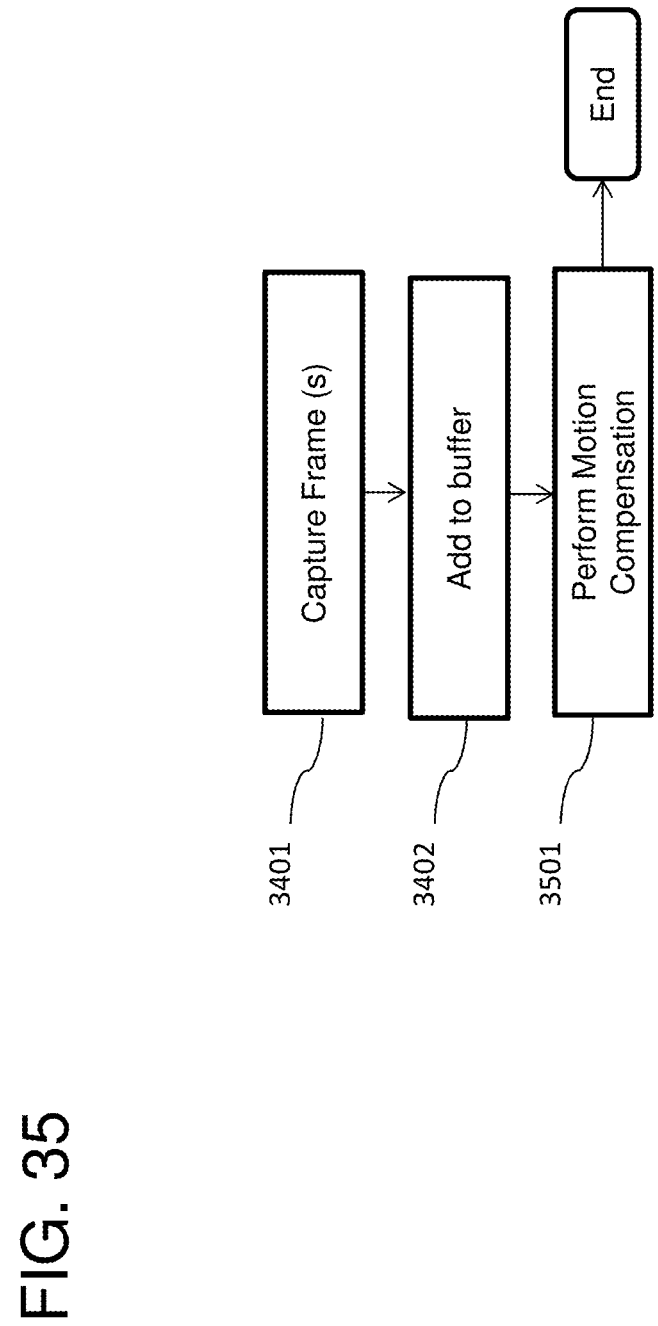
FIG. 35 is a high level flow chart of an algorithm for performing motion compensation on video frames when performing DPR demodulation, according to some embodiments of the present disclosure.

For video of a scene with motion, simple averaging of video frames will not yield the underlying scene background. FIG. 35 describes a technique for dealing with motion between frames, which is a likely scenario when demodulating DPR signals on mobile device 103. Motion compensation 3501 is necessary to best determine the underlying scene. By determining the motion between video frames (for example, shifting or rotation of the whole scene due to camera movement), each video frame may be shifted or transformed such that it overlies the previous frame as much as possible. After performing these compensatory transforms on each frame in motion compensation 3501, the video frames are averaged 3403 to get the scene background 3404. Phase correlation is one possible method of estimating global (i.e., the whole scene moves in the same way, as in the case of camera motion while recording video) translational motion between frames. The 2D Fourier transform of a shifted image will be the same as that of the original image, except that a phase shift will be introduced at each point. Normalizing the magnitude of the 2D Fourier transform and taking the inverse transform yields a 2D image with a peak offset from the center of the image. The offset of this peak is the same as the shift of the shifted image. Those skilled in the art will recognize that additional methods for motion compensation 3501 include Kernel Density Estimators, Mean-shift based estimation, and Eigenbackgrounds.

Figure 36:
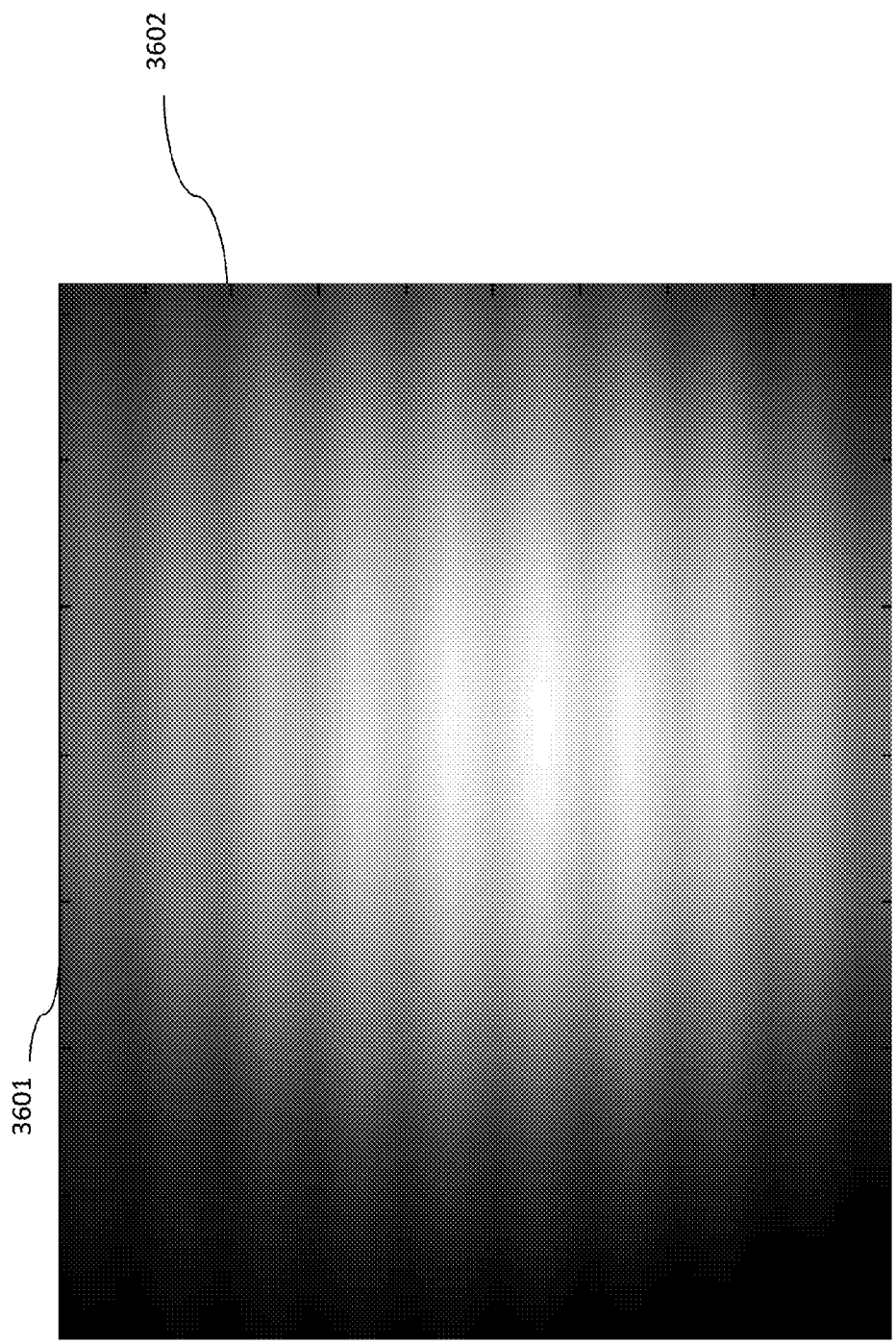
FIG. 36 is a photograph of a surface under illumination from DPR modulated signals, according to some embodiments of the present disclosure.

After removing the background scene, Fourier Analysis may be used to recover the DPR tone based on signals received from modulated light source 103. Specifics of this method are further described in FIG. 36-43. FIG. 36 contains a sample image 3601 of a surface illuminated by a light source undergoing DPR modulation. The image is being recorded from a mobile device using a rolling shutter CMOS camera. The stripes 3602 on the image are caused by the rolling shutter sampling function, which is modeled in by the sequence of Dirac Combs 2801 in FIG. 28.

Figure 37:
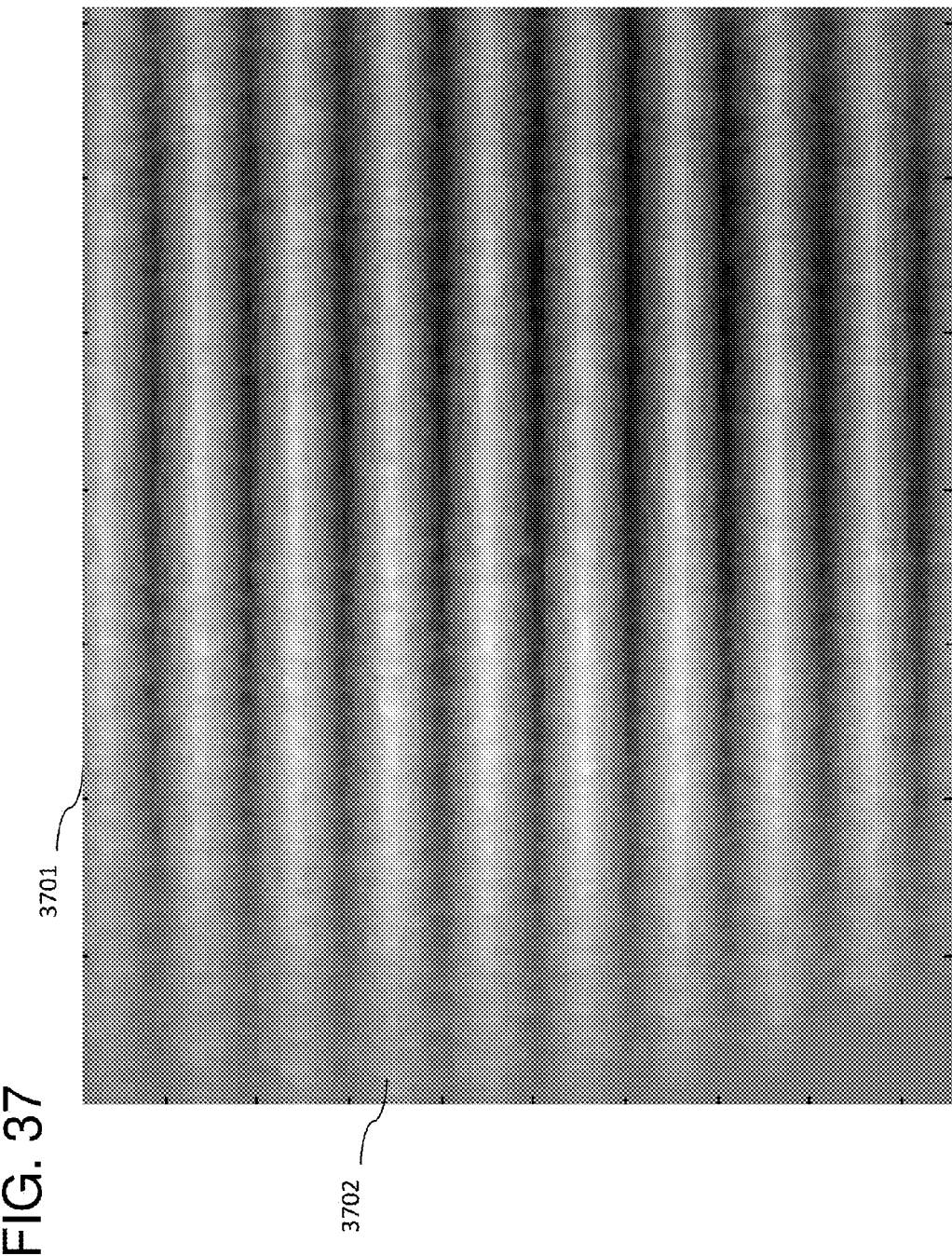
FIG. 37 is a post-processed image of a DPR modulated scene after performing background subtraction, according to some embodiments of the present disclosure.

FIG. 37 shows the result 3701 of performing background subtraction on the raw image data from FIG. 36. Background subtraction is used to extract the stripes from the raw image data. The result is an image of alternating black/white stripes that represents the discrete time-domain representation of the transmitted DPR signal. The stripes 3702 are much more pronounced than in the raw image data from FIG. 36 due to the improvement from background subtraction.

Figure 38:
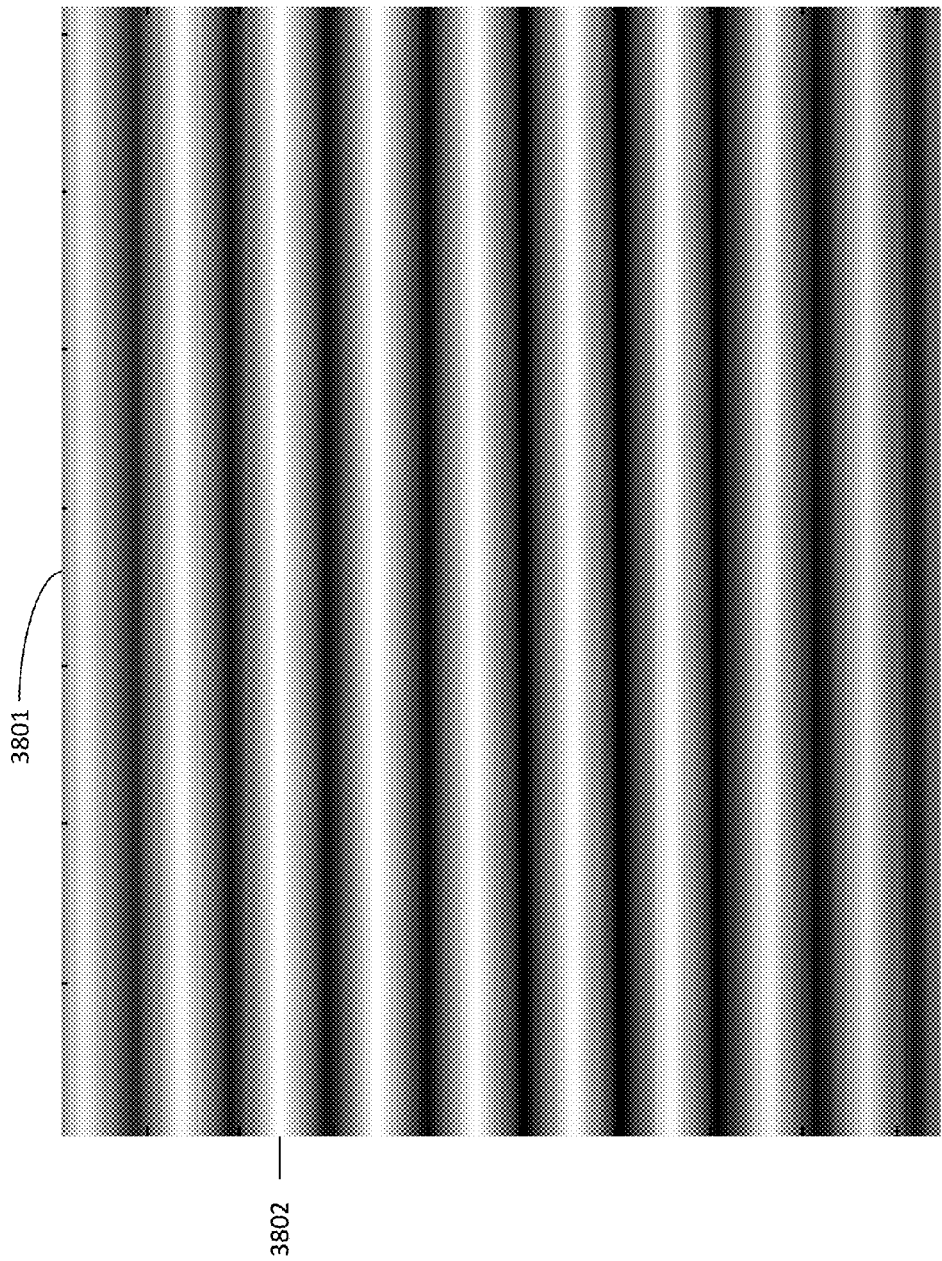
FIG. 38 is a post-processed image of a DPR modulated scene after row averaging, according to some embodiments of the present disclosure.

Illumination modulation affects each row of a video frame identically, but imperfect background subtraction may lead to non-identical pixel values across image rows. Taking the Fourier transform of row values along different image columns, then, may produce different illumination signal frequency content results. Because the true illumination signal frequency content is the same for the entire image, a technique to reconcile these different results may be employed. One possible method is to assign the average pixel value for any given row to each pixel in that row. This method takes into account the information from each pixel in the row, but by yielding uniform row values gives a single illumination signal frequency content result when taking the Fourier transform of row values along an image column. FIG. 38 displays the results of applying row averaging 3801 to the background subtracted image 3701. The stripes 3802 are much more visible as a result of the row averaging, and they are also more consistent across rows.

Figure 39:
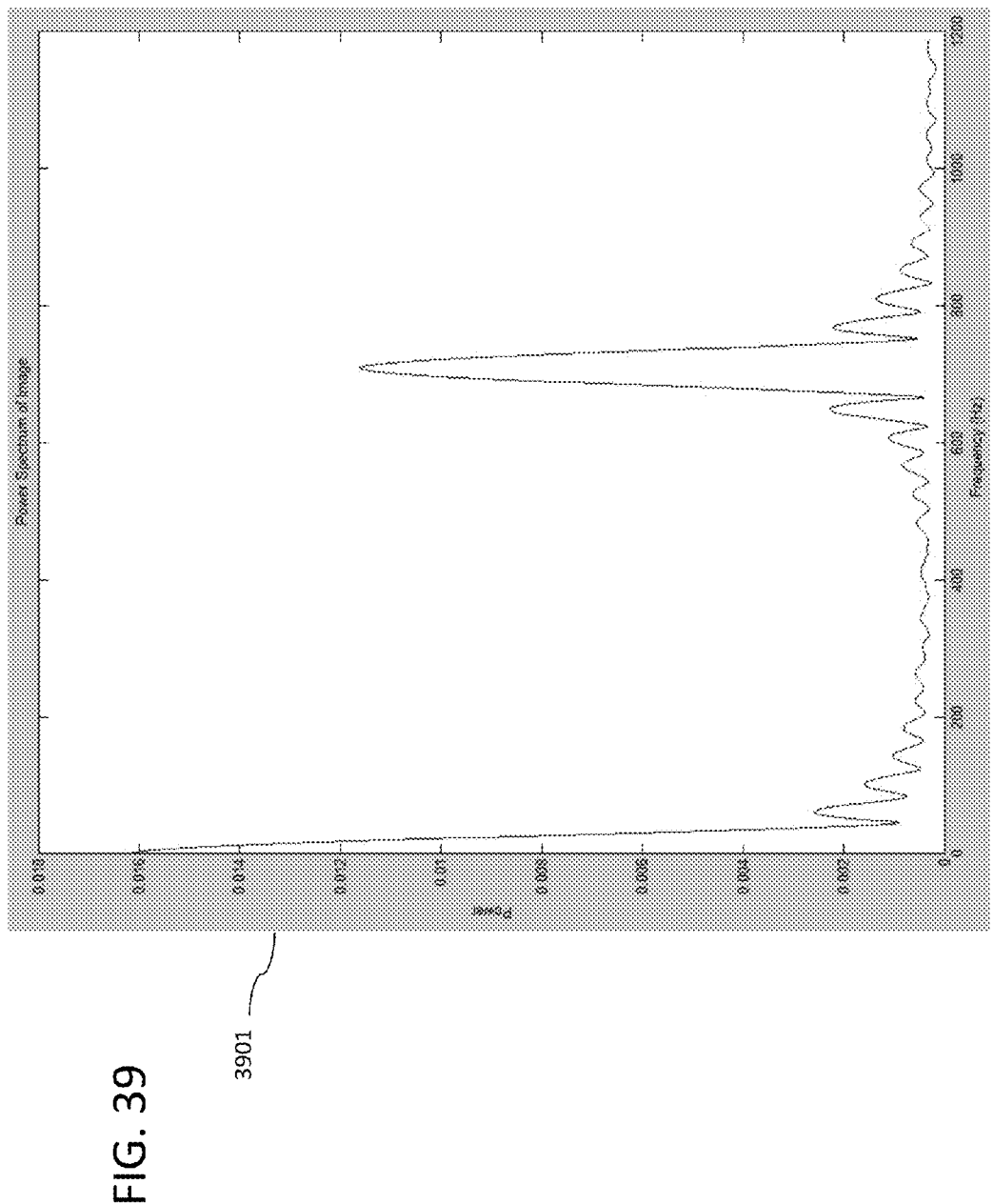
FIG. 39 is a plot of the 1-D spectral content of a DPR modulated surface, according to some embodiments of the present disclosure.

FIG. 39 shows the Fourier transform 3901 of the row averaged image 3801 from FIG. 38. There is a peak frequency at the DPR tone of 700 Hz, as well as a DC component at 0 Hz. The peak frequency is used to identify the sequence of tones, and thus the transmitted identifier.

Figure 40:
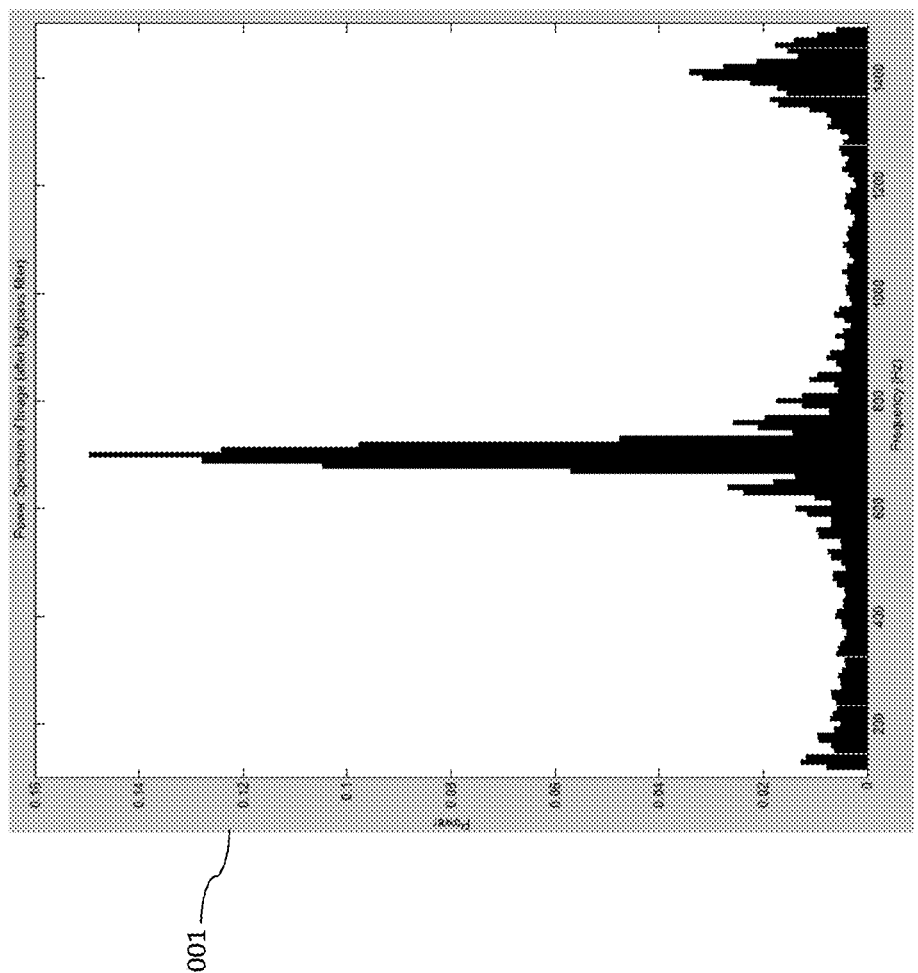
FIG. 40 is a plot of the 1-D spectral content of a DPR modulated surface after removing DC bias, according to some embodiments of the present disclosure.

FIG. 40 shows the Fourier transform 4001 from FIG. 39 after applying a high-pass filter. The DC component of the signal is removed, which allows a peak frequency detector to move to detection of the DPR tone frequency.

Figure 41:
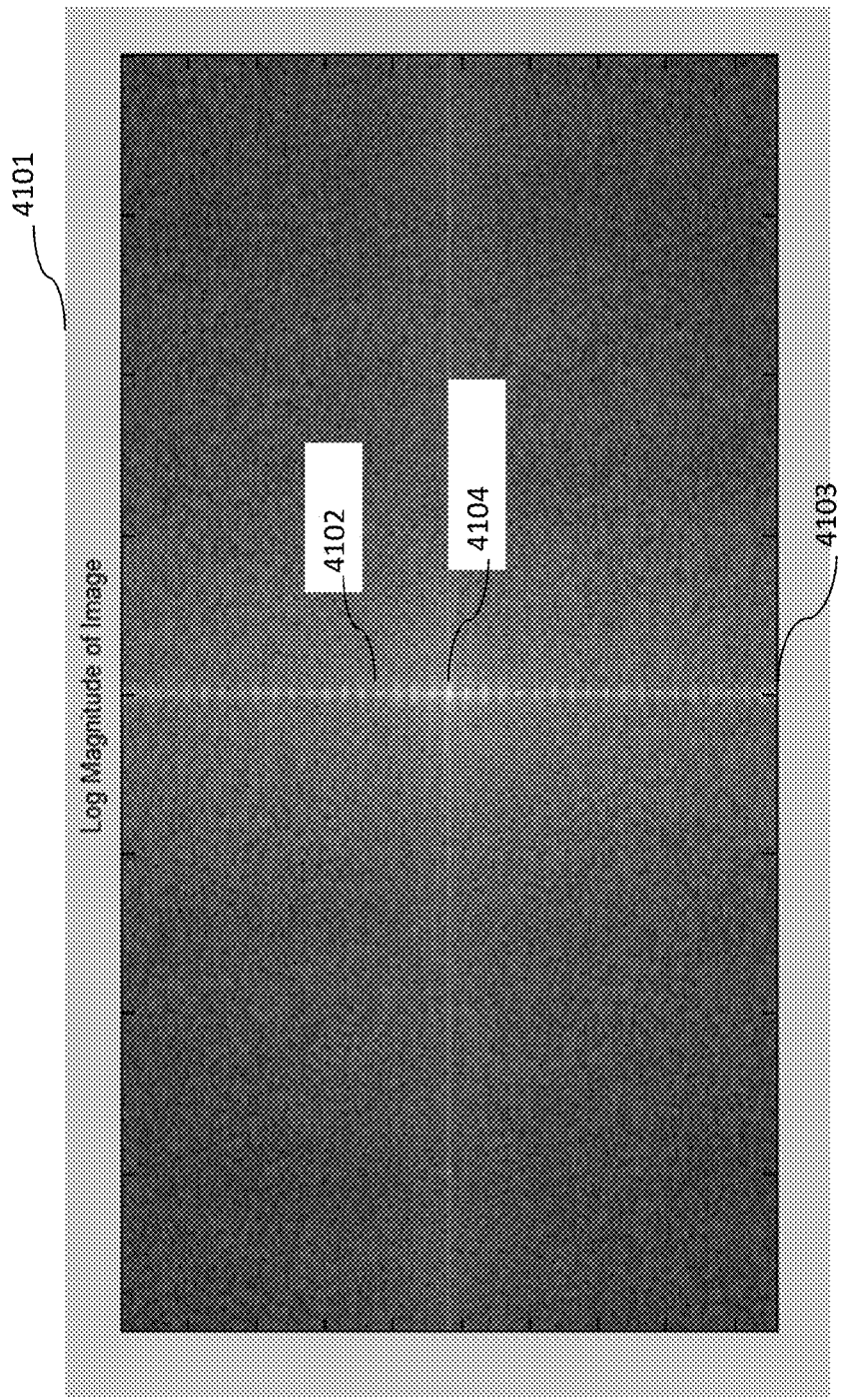
FIG. 41 is a 2-D FFT of a DPR modulated surface, according to some embodiments of the present disclosure.

FIG. 41 shows a 2-D Fast Fourier Transform 4101 of the post-processed DPR modulated signal data 3701. In comparison to the 1-D Fourier analysis performed in FIGS. 38-40, 2-D Fourier analysis of the DPR modulated signal 3601 may also be performed. 2-D Fourier Analysis is a popular and widely used technique for image analysis. Because there are a number of software libraries that are highly optimized for performing multidimensional FFTs, including OpenCV, multidimensional Fourier analysis is a viable alternative to the 1-D analysis. The DPR tones 4102 may be easily seen across the vertical axis 4103 of the 2-D FFT. Brighter areas on the FFT image 4101 correspond to areas on the image with higher spectral content. A peak may be seen at the origin 4104, which corresponds to the DC component of the DPR signal.

Figure 42:
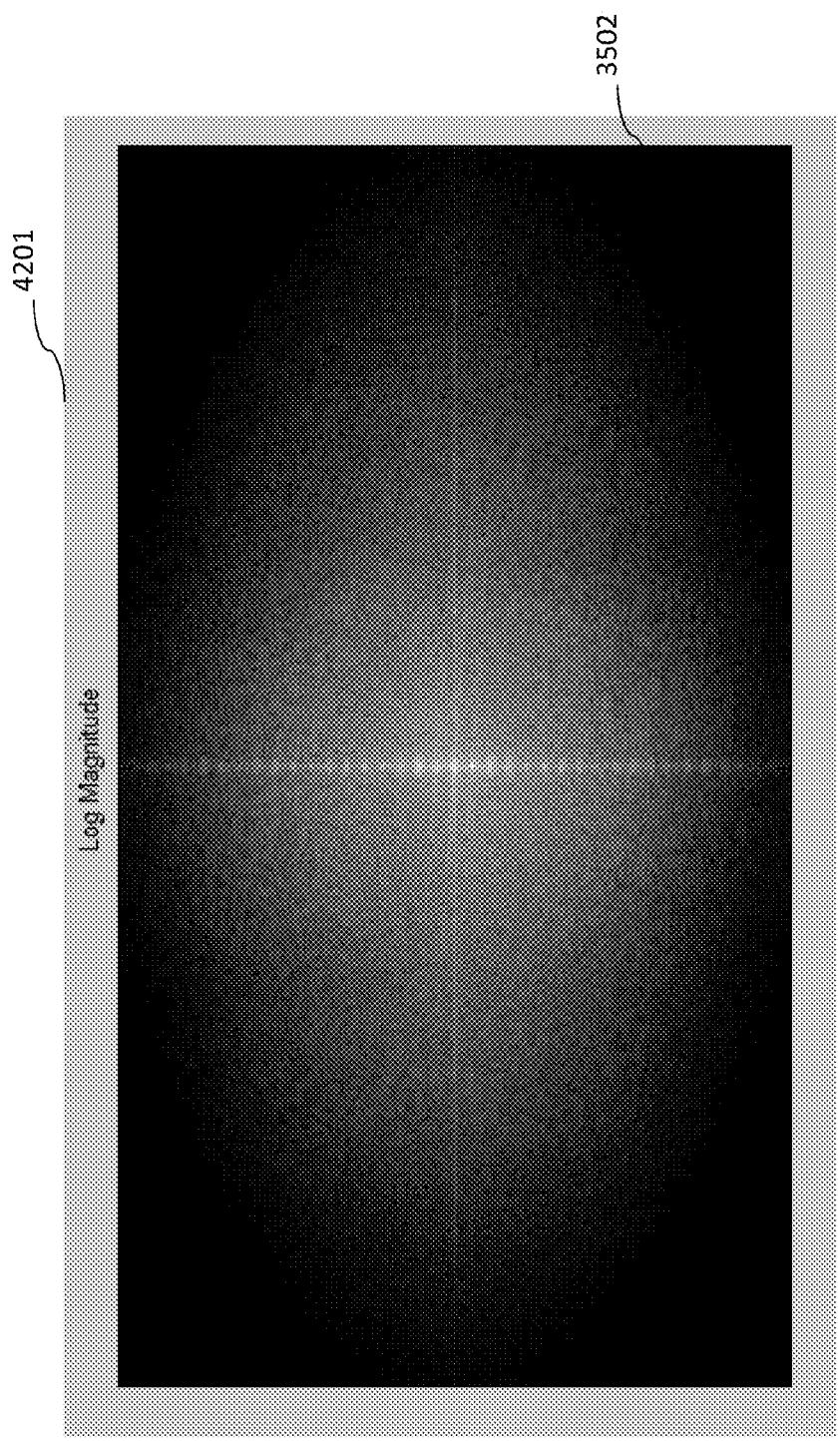
FIG. 42 is a 2-D FFT of a DPR modulated surface after applying a low pass filter, according to some embodiments of the present disclosure.

FIG. 42 shows a low-pass filtered version 4201 of the 2-D FFT 4101. The filtered image 4201 contains dark areas 3502 at the higher frequencies on the image. The low pass filter rejects the higher frequencies. This is a key component of successful DPR demodulation. As discussed previously, DPR modulation relies on transmitting digital signals at different frequencies. When using Fourier analysis on these signals, higher frequency harmonics appear, in particular at higher duty cycles. These higher frequency components act as noise in the signal, so removing them with filtered image 4201 is one technique for recovering the transmitted tones.

Figure 43:
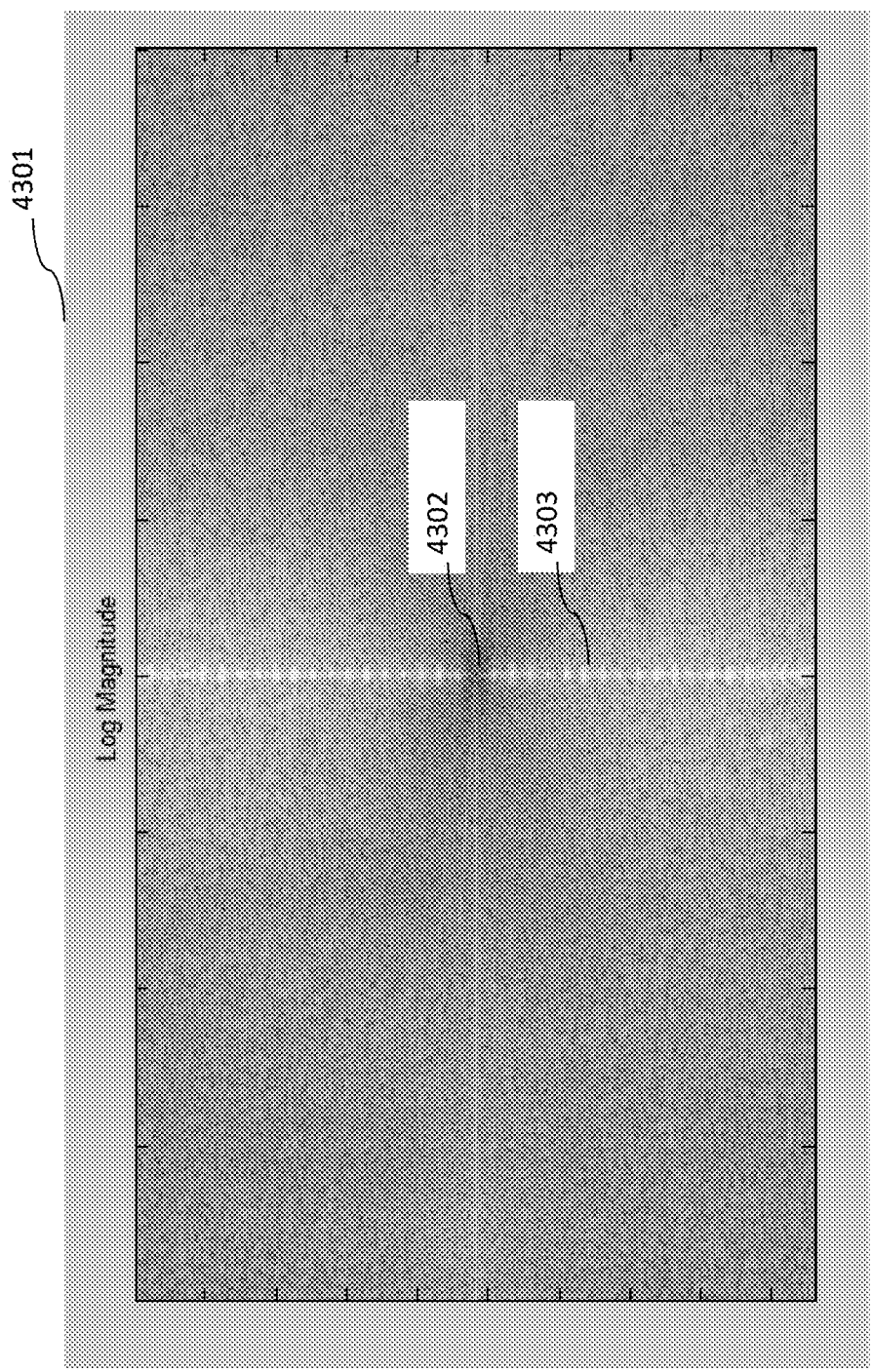
FIG. 43 is a 2-D FFT of a DPR modulated surface after applying a high pass filter, according to some embodiments of the present disclosure.

When performing spectral analysis in the case of a 1-D FFT 3901 in FIG. 39, it was necessary to remove the DC component of the DPR signal. PWM signals 1901-1903 will contain a significant DC component, which needs to be filtered before moving on to extract the transmitted DPR tone. FIG. 43 shows a high-pass filtered version 4301 of the 2-D FFT 4101. The dark area 4302 at DC demonstrates the result of the high-pass filter, which rejects the DC noise component. The higher frequency bands 4303 are still contained in the signal, allowing the demodulator to determine the peak frequency.

A source of spectral noise in many digital images is the occurrence of regular brightness patterns. Such patterns are commonly produced by clothing designs, structural surfaces (e.g., brick walls, tile floors, ceiling tiles), carpeting designs, and other objects. Regular patterns tend to produce peaks in image FFTs and may thus confound the detection and identification of peaks corresponding to DPR signals in images as described in an illustrative fashion hereinabove. False positives (i.e., erroneous detections of DPR tones that are not present) and false negatives (i.e., failures to detect DPR tones that are present) may both be caused by spectral noise from visual patterns.

The following techniques are contemplated for mitigating the effect of spatial patterns in various embodiments of the present invention. Mobile devices typically focus their cameras automatically, but in some mobile devices it is possible to defocus the camera under software control (e.g., under the control of a mobile app). Such defocusing may be achieved simply by commanding focus at the nearest possible distance, on the presumption that the mobile device is unlikely to at closest-focus range from a wall, floor, or other patterned surface. A user may be instructed by software on their mobile device to point the device's camera at a surface at least 3-4 feet distant (e.g., to hold the unit approximately level at waist height so that the camera is pointing at the floor), increasing the likelihood that a closest-focus image will be defocused. In another embodiment, defocusing employs an adaptive algorithm that seeks maximum defocus, e.g., by seeking a lens position that minimizes image contrast. This technique inverts the maximum-contrast autofocus method deployed in many digital imaging systems (which seeks a lens position that maximizes, rather than minimizes, image contrast).

As is well known, defocusing has the effect of low-pass filtering an image. That is, brightness changes that vary slowly across an image tend to be preserved with defocusing while brightness changes that vary rapidly tend to be attenuated. The precise equivalent filter characteristics of defocusing depend on distance of the camera from various surfaces in view, degree of defocusing, lens characteristics, and other factors, and so cannot be precisely defined or controlled for purposes of DPR-modulated light signal detection. However, a significant degree of low-pass filtering is usually obtainable by defocusing and is likely to aid FFT peak detection of DPR tones.

Defocusing does not affect the DPR modulated light signal component of the defocused image (e.g., the stripes in FIG. 36), because the stripes produced on the image by the DPR signal are never part of the scene imaged by the camera lens; they are a purely digital artifact produced by the phase relationship of the rolling shutter exposure mechanism to the DPR modulated light signal. Defocusing therefore has no tendency to filter the DPR signal regardless of the DPR signal's frequency characteristics.

Alternatively or additionally to optical defocusing prior to image digitization, digital filtering after image digitization may be performed by software (e.g., by an app running on the mobile device), according to various embodiments, to mitigate the effects of spectral noise from visual patterns.

Digital low-pass filtering, as will be clear to persons familiar with the art of digital signal processing, consists essentially of the performance of mathematical operations on numbers (e.g., pixel brightness values) which may represent samples of a signal (e.g., an optical image). However, digital filtering cannot substitute directly for the low-pass filtering effect of defocusing because digital filtering operates on the digital image itself, including any artifacts the digital image may contain (e.g., DPR striping). Digital filtering—especially simple filtering—therefore tends to affect the DPR component of an image along with any patterns arising from the optical image. Nevertheless, in various embodiments, digital filtering and other forms of digital signal processing (e.g., background subtraction) are contemplated, alternatively or additionally to defocusing, to enhance DPR signal detection in the presence of irrelevant image patterns.

In various embodiments, after an image has been low-pass filtered by optical defocusing prior to digitization, and/or by digital low-pass filtering after digitization, and/or possibly to other forms of signal processing, the filtered digital image is subjected to FFT calculation and attempted peak frequency detection of any DPR tone frequency or frequencies present in the image as described hereinabove.

Figure 44:
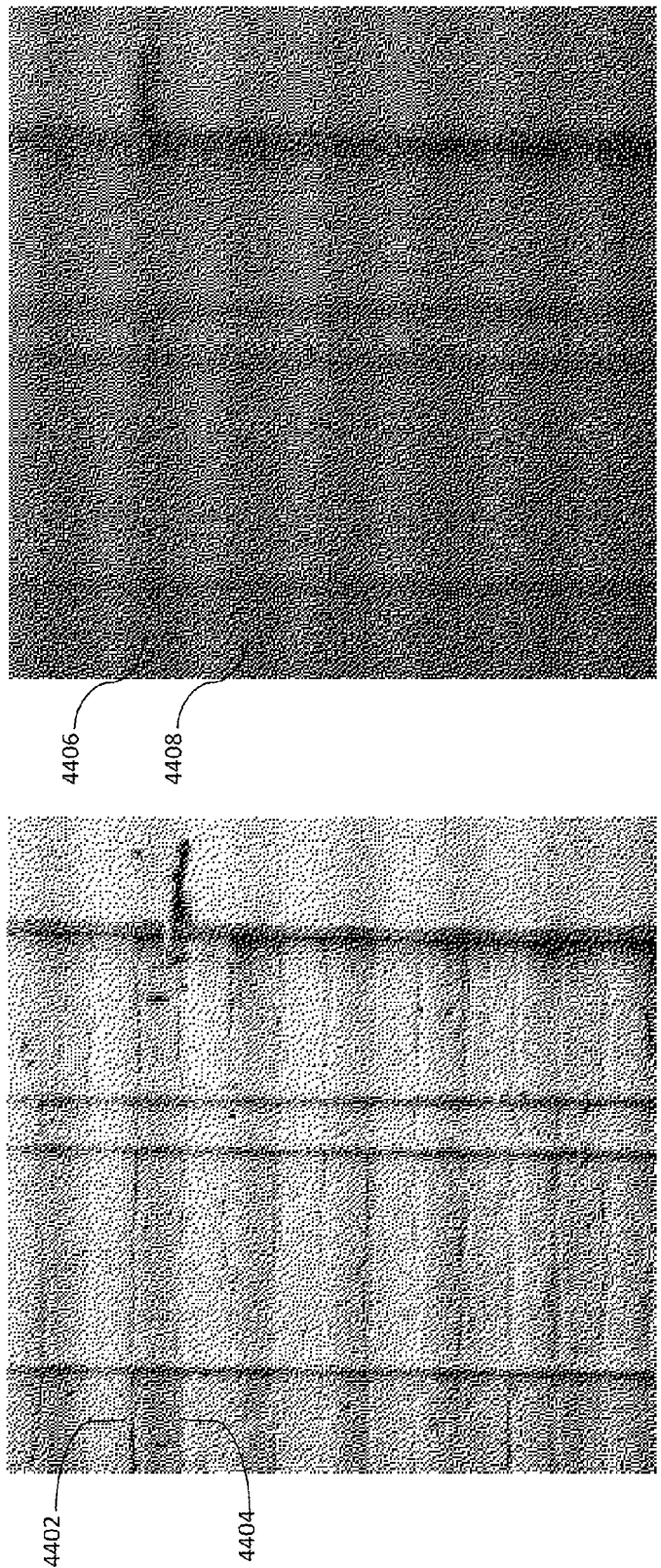
FIG. 44A is an in-focus image of a portion of a typical visual background containing periodic noise.
FIG. 44B is an out-of-focus image of the scene of FIG. 44A.

FIG. 44A shows a portion of an illustrative image of a masonry wall in focus. Fine horizontal line structures 4402, 4404 are apparent in the image and recur periodically throughout the image. FIG. 44 B shows the same portion of the illustrative image after deliberate optical focusing at the shortest possible range (i.e., "manual" defocusing). Broad, partially low-frequency bands of brightness and darkness 4406, 4408 are apparent but no fine image structures are visible such as the structures 4402, 4404 in FIG. 44A. The broad, horizontal brightness bands 4406, 4408 are a DPR tone frequency artifact and the object of DPR tone detection in processing this scene. The broad brightness bands 4406, 4408 may be seen in FIG. 44A as well, aligned by chance with alternate masonry rows.

Figure 45:
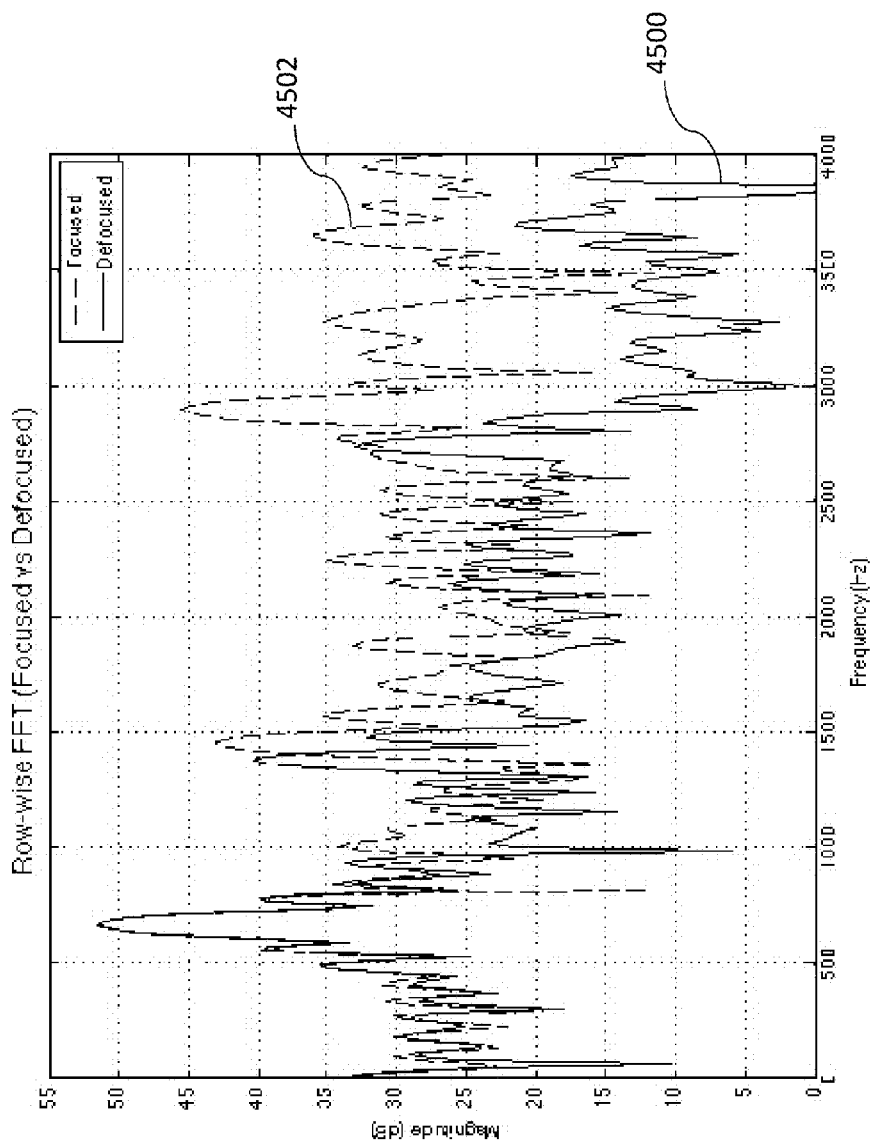
FIG. 45 is a plot comparing the FFT of the image of FIG. 44A to the FFT of the image of FIG. 44B.

FIG. 45 shows FFTs of the full images from which the partial images of FIG. 44A and FIG. 44B are taken. The FFT 4502 (dashed line) of the focused image features prominent peaks at around 650 Hz, 1450 Hz, and 2900 Hz. The peak at ~650 Hz corresponds to the DPR tone frequency pattern seen in FIG. 44B. The peaks at ~1450 Hz and ~2900 Hz arise from the fine line structures seen in FIG. 44A and may cause a DPR-seeking algorithm to produce false positives. The FFT 4500 (solid line) of the defocused image preserves the true DPR peak at ~650 Hz but reduces the spurious peak at ~1450 Hz and displays no spurious peak at ~2900 Hz. A DPR-seeking algorithm is therefore more likely to produce accurate results using the FFT 4500 of the defocused image than using the FFT 4502 of the focused image. Note that for low frequencies, the amplitudes of the focused FFT 4502 and the defocused FFT 4500 are indistinguishable on the scale of FIG. 45; only above ~1000 Hz is the filtering effect of defocusing apparent. In FIG. 45, the unit Hertz (Hz, one cycle per second) is used even though the signals in question are spatial, not temporal; Hz is here used as a proxy unit for spatial frequency.

Novel Techniques for Updating Location Estimates for a Mobile Device

A mobile device employing DPR modulated light signals to estimate its location may, in some states of operation, present the mobile device's user with a graphic interface that includes or consists essentially of a map. The map may be oriented on the display of the mobile device on the presumption that the user typically orients the device perpendicularly to the plane of the user's body. The map may also feature a "you are here" cursor that visually identifies the user's location (i.e., the location of the mobile device, presumed to be co-located with the user). The user interface may thus present the user with spatial map information about the layout of the user's surroundings (e.g., aisles, walls, doors, displays, kiosks), "you are here" locational information, and directional (heading) information.

In the operation of such a user interface, it is in general desirable that all information presented, including information about device position and orientation, be as accurate as possible and be presented to the user in a manner that is as clear, useful, and pleasant to view as possible. In partial fulfillment of these goals, various embodiments employ a variety of methods to calculate and display an estimate of the user's position that is updated in real time as the mobile device opportunistically identifies DPR modulated signals from lights in various positions.

As described hereinabove, in various embodiments software on the mobile device and/or on a back end or server, employing data from a light-sensing device of the mobile device, cyclically seeks to identify light identification codes in ambient light. If no such codes are found, then the location of the mobile device cannot be estimated from information about the location of coded LED light sources. If the ID code of at least one LED light source is found, then the mobile device's position may be estimated.

A first illustrative method of estimating the position of a mobile device by an app running on the device in a space containing DPR-modulated LED light sources is as follows. When the app detects the presence of one or more light ID codes by analyzing data from a light-sensing device of the mobile device, the location of the detected one or more LEDs may be obtained from a server as shown in FIG. 7, FIG. 9, and FIG. 10. An initial estimate of device position may be determined from one or more light ID code detections according to various methods; most simply, an initial estimate may be given by the location of the first LED whose ID code is detected. Once an initial position estimate is available, a portion of a map, which may also be obtained from a database on a server as shown in FIG. 7, FIG. 9, and FIG. 11, may be displayed on the device with the device's location indicated on the map by a cursor. A raw value for the orientation of the device may be obtained from a magnetic compass built into the device and, as shall be made clear in figures and accompanying description hereinbelow, may be rectified or corrected using field-map information contained in the Maps database in the server (FIG. 9 and FIG. 11). The map may be oriented on the display screen of the mobile device using raw or corrected orientation information, incorporating the assumption that the user typically holds the device perpendicularly to the plane of their body. The user thus is presented with an initial estimate of their position and orientation in the context of a spatial area map or portion thereof. The extent of the map portion displayed may be settable by the user: e.g., a larger or smaller portion of the area map surrounding the user's location may be displayed in response to user commands such as touchscreen pinch gestures.

As time goes on, detections of one, two, or more light IDs may occur. Also, multiple detections of the IDs of one or more particular lights may occur. Even if the user is stationary, IDs of multiple lights may be detected, and if the user moves about sufficiently it is likely that they will move from detection range of one or more lights to within detection range of one or more other lights, and that ongoing ID detections by the mobile device will reflect such changes.

A first method of calculating a time-varying estimate of device position using a time series of ID detections, herein termed the Static Method, is designed to produce highly confident location estimates according to various embodiments of the invention. The Static Method considers whether p percent or more of IDs from a single light have been detected in the last n ID detections. The percent threshold parameter p and lookback time parameter n may be specified by the designers of the system that implements the Static Method, or may be settable by the device user or by software running on a different computer (e.g., the server). Parameter setting may also be performed by software in an adaptive (time-varying) manner.

In the Static Method, if p percent of the last n IDs detected belong to a single light (Light A), then the current location estimate is set to the location of Light A. As the user moves from the vicinity of Light A to the vicinity of another DPR modulated light, Light B, ID detections will shift, suddenly or gradually, from detections solely or primarily (i.e., more than p percent) of Light A to detections solely or primarily of Light B. When the criteria for light-source identification (i.e., p percent or more of the last n detections) are met for light B, the location estimate will be updated to the location of Light B.

The Static Method only supplies position estimates that correspond to the positions of individual light sources. For example, a Static Method position estimate cannot be intermediate between the locations of a Light A and a Light B, or at the center of a triangle whose vertices are Light A, Light B, and a Light C.

An advantage of the Static Method is that it is likely to discard false positives. That is, the Static Method is very unlikely to estimate the location of the mobile device as being the location of any light source that is not the light source nearest to the device. However, the Static Method has at least four notable disadvantages, herein termed Lag, Snap, Bounce, and Failure to Estimate:

1) Lag. As a user moves with their mobile device from the vicinity of one light source to another, there is a generally noticeable lag, on the order of n times the duration of a single detection cycle, in the updating of the position estimate displayed on the mobile device. That is, even after a user has approached a Light B, the location estimate displayed on their device may still show the user as located at a Light A for a noticeable length of time.

2) Snap. Because position estimates can coincide only with light-source locations, they change suddenly (snap) from one light-source location to another. The depiction on a mobile device map of this snapping from one light source to another can be jarring or disconcerting to users. Users may even have the perception that the app is "not working," since their own movements through the space are continuous but the depiction of their changing position is not. Measures to perceptually mitigate snap, such as animating smooth movement of the "you are here" cursor to each new position estimate, delay the portrayal of position updates and therefore tend to worsen lag.

3) Bounce. When the mobile device is between two discrete detection points, e.g. approximately halfway between a Light A and a Light B, there is a tendency for the location estimate to oscillate or bounce between Light A and Light B. This is disconcerting for users. Measures to prevent bounce, such as requiring position estimates to remain stable for some period of time before updating the device display, tend to worsen lag.

4) Failure to Estimate. Fixed location-estimation criteria may never be met by a device that is not receiving signals of sufficient quality: no location estimate is then offered, or an existing estimate is never updated. Or, even if the device is successfully identifying light IDs based on high-quality signals, the criteria for position estimation may never be fulfilled: for example, if a device is equally illuminated by four LEDs with p set at 30%, the percent of ID detections attributed to each of the four LEDs over a moving window of n detections may hover near 25% and never exceed the p threshold. Yet it should be possible to estimate a device's position from so many valid ID detections.

A second method in various embodiments of calculating a time-varying estimate of device position using a time series of ID detections, herein termed the Statistical or Continuous Method, is designed to produce location estimates that are not susceptible to the drawbacks of the Static Method. Given that an initial position estimate has been produced by some means (e.g., as the location of the first light source to be identified), the Statistical Method updates the position estimate every time a light source ID is detected. There are no threshold criteria as in the Static Method, and estimated positions are not restricted to the locations of LED light sources. Rather, the Statistical Method moves the position estimate fractionally or incrementally in the direction of each light source that is detected (or does not change the position estimate if the latest light source detected is co-located with the current position estimate). The size of each incremental movement may be weighted according to various criteria, e.g., by how long it has been since the previous successful ID detection (e.g., if it has been longer since the previous successful ID detection, then the position estimate is moved farther). A position estimate from the Statistical Method may stabilize (or approximately stabilize) near positions that are co-located with LED light sources, or that are between two LED light sources, or that are in the midst of three or more LED light sources.

A basic, settable parameter of the Statistical Method is herein termed the "max lag time." Max lag time is essentially the time that the Statistical Method will take to update completely from the position of a Light A to the position of a light B if the device is moved instantaneously from one to the other, where the distance between Light A and Light B is sufficient to prevent ID detections of each light at the location of the other. In the event of such a hypothetical jump, detections of Light A would suddenly cease and detections of Light B would suddenly begin. If the mobile device is capable of performing K detections per second and the max lag time is M seconds, then the initial position estimate (i.e., the position of Light A) will shift M/K of the way toward the position of Light B upon each of the first K detections after the jump and thereafter will coincide with the position of Light B. In other words, immediately after the hypothetical jump the position estimate would make K shifts, moving M/K of the way from Light A to Light B on each shift and being coincident with the position of Light B after the Kth shift, which occurs at the end of the max lag time of M seconds. For example, for a max lag time of 1 second, a device capable of 5 detections per second, after hypothetically jumping from Light A to Light B, would make 5 position adjustments in 1 second, each shifting the position estimate ⅕ of the way from Light A to Light B. Since the maximum number of ID detection cycles per second tends to be fixed for a given device, specification of the max lag time has the effect of controlling how quickly the Statistical Method tracks changes in device position.

The Statistical Method is so called because the position estimate it produces is in effect a moving average of weighted position vectors. The window may be finite in length, i.e., light ID detections older than some threshold specified in seconds or number of ID detections may be disregarded by the method. The Statistical Method has the drawback that false positives (incorrect ID detections) will be incorporated into the position estimate as they occur, potentially causing the position estimate to jitter or wander. However, the Statistical Method overcomes the four drawbacks of the Static Method described hereinabove:

1) Lag. Lag is greatly diminished by the Statistical Method. The "you are here" cursor viewed by a user begins to move immediately after detection of any light ID that is not co-located with the current position estimate.
2) Snap. Direct display on a user map of incremental changes to the position estimate may be perceived as a series of small jumps or positional snaps; however, depiction of incremental updates to cursor position may be smoothed by animation while increasing lag only slightly. With or without smoothing animation, the behavior of the Statistical Method position estimate more closely approximates typical user expectations (i.e., continuous movements in space are reflected in approximately continuous movements of a "you are here" cursor).
3) Bounce. Locations intermediate between light-source locations may be estimated by the Statistical Method: i.e., a position somewhere between two light sources (if both sources are strong enough at the device's position to be detected at least intermittently). In intermediate locations (e.g., halfway between a Light A and a Light B), a slight oscillation of the position cursor may be observed by a user as ID detections occur first for one light and then for the other, but disconcerting bouncing or snapping of the cursor between the locations of Light A and light B will not be observed.
4) Failure to estimate. The Statistical Method can only fail to estimate if no light ID detections occur at all.

Figure 46:
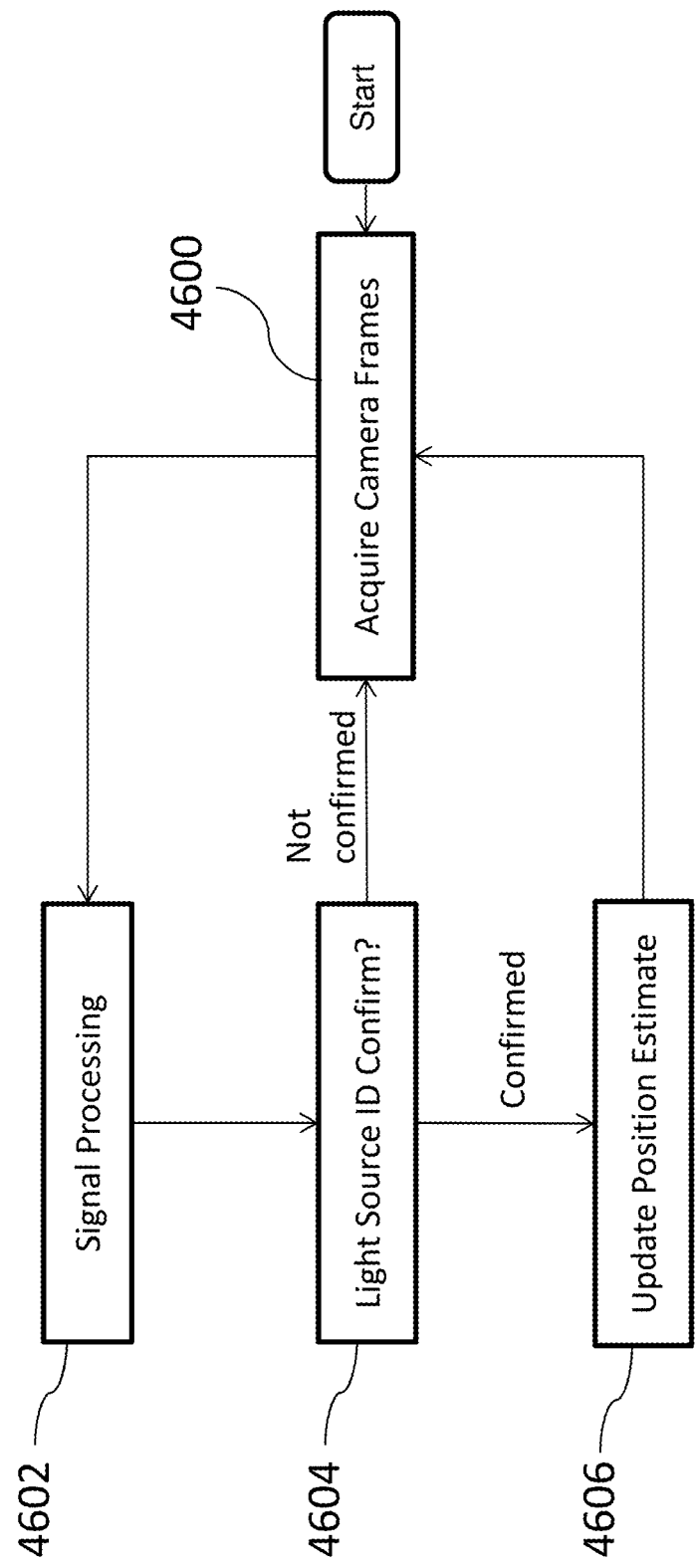
FIG. 46 is a high level flow chart of a method for updating a mobile device position estimate according to an embodiment of the invention.

FIG. 46 is a high-level flow chart of an illustrative version of the Static Method for mobile device position estimation according to various embodiments of the invention. The method, which is cyclic, may be entered at Acquire Camera Frames 4600 and exited from any part of the cycle by software interrupt (quitting the program). At Acquire Camera Frames 4600, the mobile device acquires a digital photograph. (In various other embodiments, a series of light-intensity readings may be obtained from a non-imaging light sensor of the mobile device.) The photograph, stored in the storage system of the device (storage 504 in FIG. 5), is subjected to signal processing (Signal Processing 4602) for ID detection in the CPU of the mobile device (CPU 502 of FIG. 5). Signal processing in block 4602 may, for example, comprise background subtraction processing such as is shown and described in U.S. Pat. No. 8,520,065, the entire contents of which are incorporated herein by reference. The app software of the mobile device waits for yes/no confirmation or stabilization of light-source ID identification (Light Source ID Confirm? 4604) according to the criteria described hereinabove (p percent of detections the last n detections). If no light ID is confirmed, the device returns to Acquire Camera Frames 4600. If fewer than n detections have occurred, additional detections will be sought at least until n detections have occurred, and thereafter until p percent of the latest n detections are of a single light source. If a light source ID is confirmed, the app updates its position estimate (Update Position Estimate 4606) to the position of the confirmed light source.

Figure 47:
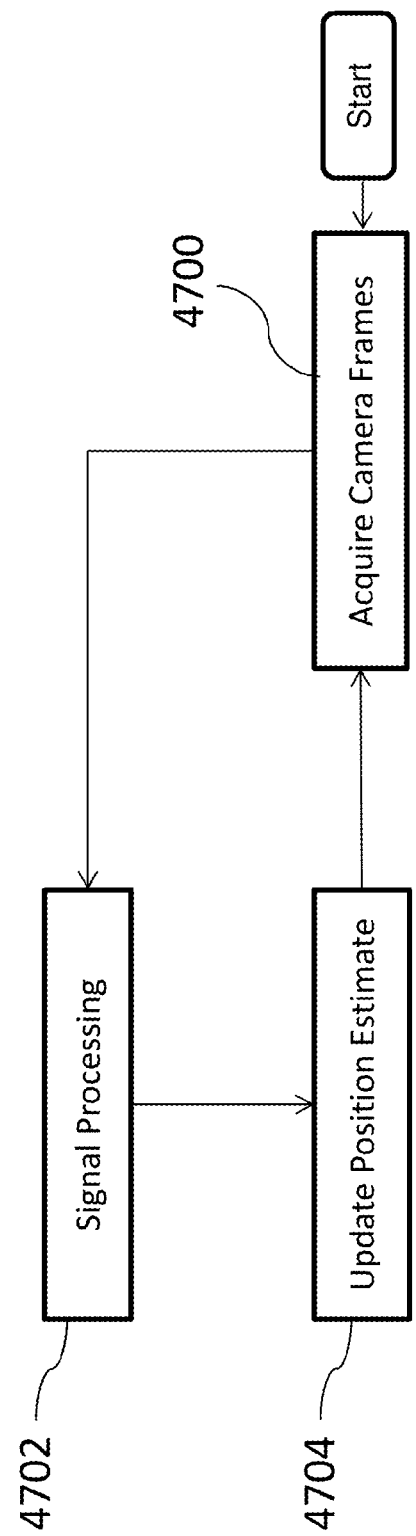
FIG. 47 is a high level flow chart of another method for updating a mobile device position estimate according to an embodiment of the invention.

FIG. 47 is a high-level flow chart of an illustrative version of the Statistical Method for mobile device position estimation according to various embodiments of the invention. The method, which is cyclic, may be entered at Acquire Camera Frames 4700 and exited from any part of the cycle by software interrupt (quitting the program). At Acquire Camera Frames 4700, the mobile device acquires a digital photograph or series of readings may be obtained from a non-imaging light sensor. These data, stored in the storage system of the device (storage 504 in FIG. 5), are subjected to signal processing (Signal Processing 4702) for ID detection in the CPU of the mobile device (CPU 502 of FIG. 5). Remarks regarding Signal Processing 4602 in FIG. 46 apply equally to Signal Processing 4702. If a light source ID is identified, the app incrementally shifts its position estimate (Update Position Estimate 4704) in the direction of the detected light source as described hereinabove.

The Statistical Method cycle of FIG. 47 in general entails a lower computational burden than does the Static Method cycle of FIG. 46, as there is no step devoted to the examination of location confirmation criteria. That is, the Statistical Method tends to be more computationally efficient than the Static Method.

FIG. 48 is an illustration of aspects of (a) an illustrative physical space (represented by a rectangle) in which a mobile device moves and which contains two ID-broadcasting light sources (column 1, Actual Position 4800) and (b) illustrative device displays (column 2, Output Display Static Method 4802; also column 3, Output Display Statistical Method 4804) that indicate the estimated position of the device according to either the Static Method or the Continuous Method. Actual position, Static Method output display of position estimate, and Statistical Method output display of position estimate are shown in top-down view for four consecutive times T1, T2, T3, and T4. The four times may not be evenly spaced.

In column 1, Actual Position 4800 at time T1, a mobile device physical position 4806 (indicated by an X) within a space 4808 is directly under a first light source 4810 (indicated by a dashed circle) broadcasting a distinct ID. A second light source 4812 is also present in the space 4408. For clarity, device physical position 4806 and other repeated elements of FIG. 48 are explicitly labeled in FIG. 48 only for time T1. In column 1, Actual Position 4800 at time T2, the physical device position 4806 is directly under LED light 4812. From T1 to T2, the user of the device has moved normally from a point under the first light source 4810 to a point under the second light source 4812. For times T2, T3, and T4, as depicted in the rest of column 1, Actual Position 4800, the device remains under the second light source 4812.

In column 2, Output Display Static Method 4802, the physical space 4808 is schematically depicted as it might be on a user's device display. That is, a representation 4820 of the physical space 4808, a representation 4814 of the device position estimate (indicated by a caret), and representations 4816, 4818 of the two light sources 4810, 4812 are all shown in the display. At time T1, the position estimate 4814 is coincident with the symbol 4814 for the first LED light source 4810. By time T2 the user is physically under the second light source 4812, but the position indicator 4814 is still shown in Output Display Static Method 4802 as coincident with the first light symbol 4816. Even at time T3 the display has not changed from its state at T1. By time T4, the Static Method criteria for location confirmation have been met and the position indicator 4814 has moved suddenly to be coincident with the second light symbol 4818. The incorrect, unchanged position display of Output Display Static Method 4802 for times T2 and T3 constitutes the undesirable "lag" described hereinabove.

In column 3, Output Display Statistical Method 4804, the same display symbols and conventions are used as in column 2, Output Display Static Method 4802. At time T1, the position estimate 4814 is coincident with the symbol 4814 for the first LED light source 4810. By time T2, the user is physically under the second light source 4812. At some time between time T1 and time T2, the device 4806 began to detect the ID of the second light 4812; consequently, by time T3 the position indicator 4814 has been incrementally adjusted, perhaps repeatedly, in the direction of the second light symbol 4818. Similarly, by time T3 the position indicator 4814 has been further incrementally adjusted in the direction of the second light symbol 4818. By time T4, the position indicator 4814 is coincident with the first second symbol 4818.

The reduction of lag for the Statistical Method as compared to the Static Method is evident in the movement of the position indicator 4814 for times T2 and T3. The incremental movement of the Statistical Method position indicator for times T2, T3, and T4 indicates the typical, approximately smooth movement of position indicator for the Statistical Method, as opposed to the sudden jump of the position indicator from times T3 to T4 for the Static Method. Finally, the ability of the Statistical Method to estimate locations intermediate between light sources is apparent in the display of the position indicator 4814 for times T2 and T3.

It will be apparent to persons of ordinary skill in the science of communications and signal processing that both the Statistical and Static Methods employ the relative frequency of detections of signals from given sources as a proxy for signal strength: that is, stronger signals are likely to be more frequently detected than relatively weak signals. Therefore, in various embodiments, other methods of employing relative signal strength or received signal strength indication (RSSI) of light sources as a basis for updating update the position estimates of the Statistical and Static Methods, or to produce such estimates by other methods, are contemplated and within the scope of the invention. For example, when peak detection is applied to FFTs of light-intensity data derived from optical sensors, the relative heights of detected peaks may be used to directly estimate relative RSSI and thus the relative distances of distinct light sources. Such direct RSSI estimation may be used alternatively or additionally to frequency of ID detection (indirect RSSI estimation) to update device position estimates.

Techniques for Presenting Accurate Orientation and Location Information on a Device Display FIG. 49 is a schematic, top-down, illustrative representation of the effect of local magnetic field anomalies on heading measurements made by a mobile device operating in the context of an indoor position location system (as in, e.g., FIG. 7). In FIG. 49, a mobile device 4900 (e.g., smartphone) is being carried by a user (not shown) along an approximately straight path 4902 between barriers 4904, 4906 (e.g., shelving rows) that define an aisle in the space between them. Two ID-broadcasting LED light fixtures 4908, 4910 (dashed circles) are located above the aisle. The horizontal component of the magnetic field 4912 of the Earth, which is approximately uniform on the scale depicted and is here idealized as pointing to true North (indicated by a compass rose 4914), is represented as a set of parallel dashed arrows diagonally traversing the figure. Due to the presence of metallic masses, electrical machines, or other causes, the magnetic field at various points in the space depicted deviates from the Earth field 4912. For example, at the location of the first light 4908, the actual field 4916 (bold arrow) deviates by angle A1 from the Earth field, and at the location of the second light 4910, the actual field 4918 (bold arrow) deviates by angle A2 from the Earth field. Angles A1 and A2 are denoted by curved arrows bracketing each angle. (The local field may vary in strength, as well as in direction, from the unperturbed Earth field, but variations in field strength will typically not affect heading measurements unless the field strength is reduced to a level not reliably detectable.)

In an illustrative operating scenario, the device 4900 is carried to the location of light 4908 and detects the broadcast ID of the light 4908. The device, which is presumptively held in a significantly non-vertical position and perpendicular to the plane of the user's body, wirelessly queries a server for the location of light 4908; the server consults its database and tells the device what location estimate to use. The server also transfers map information to the device, which the device displays as a map for the benefit of its user, with "you are here" position indicator. Moreover, the device takes a heading measurement using its internal compass and orients the map accordingly.

However, at the position of first light 4908, the mobile device 4900 measures a field that deviates from the Earth field by angle A1. Therefore, if the map display is oriented using the raw compass reading measurement, it will be misaligned with the physical environment by angle A1, which will tend to degrade the performance of the indoor positioning system.

Figure 50A:
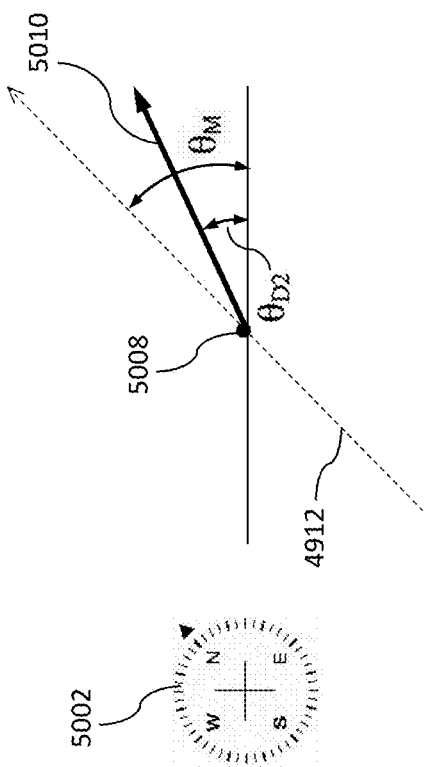
FIG. 50A depicts the relationship of the Earth magnetic field to a perturbation of that field.
Figure 50B:
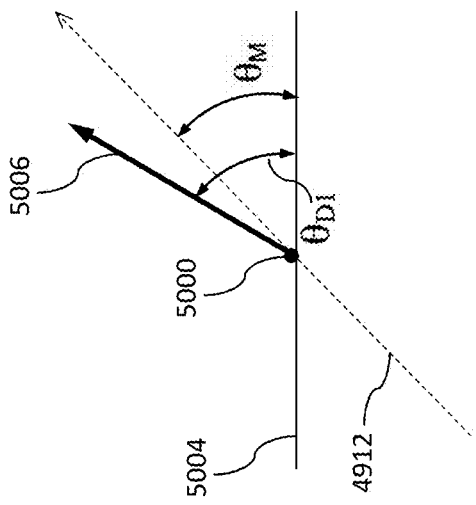
FIG. 50B depicts the relationship of the Earth magnetic field to a different perturbation of that field.

In various embodiments, the problem of local misalignment is addressed by the following technique. A commissioning process, to be made clear in subsequent figures and accompanying explanatory text, stocks the server Maps database with a layer of local field readings, herein termed the Deviation Table. The Deviation Table records the deviation of the local field from the unperturbed Earth field at some set of points covering part or all of the space served by the indoor positioning system (e.g., the locations of all ID-broadcasting LED lights in the space). FIG. 50A and FIG. 50B schematically depict the information thus recorded for two illustrative locations. At a first point 5000 (e.g., a location similar to that of light 4908 in FIG. 49), the unperturbed Earth field 4912 (here idealized as pointing due North as indicated by compass rose 5002) is at angle $\theta_M$ with respect to an arbitrary reference axis 5004 and the deviant, actual field 5006 is at angle $\theta_{D1}$. As shown in FIG. 50B, at a second point 5008 (e.g., a location similar to that of light 4910 in FIG. 49), the unperturbed Earth field 4912 is also at angle $\theta_M$ and the deviant, actual field 5010 is at angle $\theta_{D2}$. When a device is estimated to be at point 5000, the local deviation angle $\theta_{D1}$ is added to the angle $\theta_M$ of the unperturbed Earth field to produce a corrected heading; when a device is estimated to be at point 5008, the local deviation angle $\theta_{D2}$ is added to the angle $\theta_M$ of the unperturbed Earth field to produce a corrected heading. Such addition may be performed either by the server, which transmits the corrected heading to the mobile device, or by software running on the mobile device itself.

FIG. 51A and FIG. 51B depict aspects of the illustrative mobile device 4900 in two possible states of operation when at the position of first light 4908 in FIG. 49. In FIG. 51A, the screen 5100 of the device 4900 is displaying a map oriented according to a raw compass measurement. The device 5100 is aligned with the direction of motion 4902 in FIG. 49 (along the aisle), but the map (which includes depictions 5012 of aisle barriers and a "you are here" cursor 5014) is rotated erroneously by an angle of A1. In FIG. 51B, the map displayed on the screen 5100 of the device 4900 is oriented accurately using a corrected heading.

As will be clear from foregoing figures and descriptions, the estimated position of a mobile device in an indoor positioning system will not always coincide exactly with its physical position. Thus, some degree of residual misalignment—smaller when the device is physically closer to its estimated position, larger when the device is physically farther from its estimated position—may occur even after the application of a correction from the Deviation Table.

In the heading correction method described above, heading corrections or deviations are recorded at a set of points corresponding to light-source locations. In embodiments which allow for the estimation of position at points intermediate between light-source locations (e.g., in those employing the Statistical Method of position estimation), heading corrections for points not directly under light sources may be calculated by any of several well-known interpolation methods either prior to system operation or in real time, as intermediate location estimates occur. For example, at a given intermediate location, the measured deviation values for nearby light-source locations may be weighted by the inverse of their distances from the intermediate location (closer points, heavier weighting) and averaged to produce an estimate of the deviation at the intermediate location. Alternatively, a version of the Statistical Method for position estimation may be used to update orientation correction estimates. Interpolative estimations of deviation corrections may have two benefits. First, it may minimize the deviation error for mobile devices not physically located directly beneath light sources. Second, it may prevent sudden jumps or snaps of map orientation: as the "you are here" cursor moves more or less smoothly through the map space, the orientation of the map adjusts more or less smoothly as well. Orientation lag and snap may thus both be avoided or mitigated.

Figure 52:
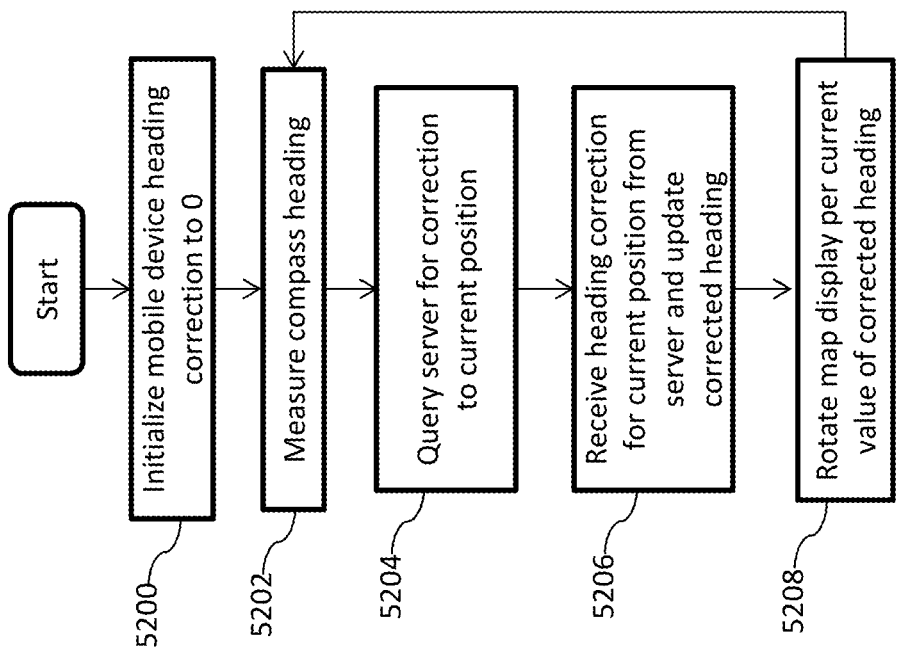
FIG. 52 is a high level schematic of a method for correcting the heading calculated by a mobile device in the presence of a perturbed Earth magnetic field.

FIG. 52 is a high-level flow chart of an illustrative method for applying deviation corrections to headings measured by a mobile device in an indoor positioning system according to various embodiments of the invention. After starting, the algorithm is cyclic and may be exited at any point by software interrupt (quitting the program). It is presumed in FIG. 52 that the device is already, by the time of Start, successfully detecting light-source IDs and that a position has been estimated for the device. First, the heading correction of the mobile device is initialized to zero (block 5200). Next, a raw heading measurement is obtained from the device's internal compass (block 5202). The device queries the server for the correction value for the current location (block 5204). In various embodiments, compass heading measurement (block 5202) and correction value querying of the server (block 5204) may occur concurrently, rather than sequentially as depicted in FIG. 52. After the device has received the heading correction for the current position estimate from the server and updated the heading estimate (block 5206), the map displayed to the user is rotated using the updated heading estimate to be consistent with the user's physical orientation.

Figure 53:
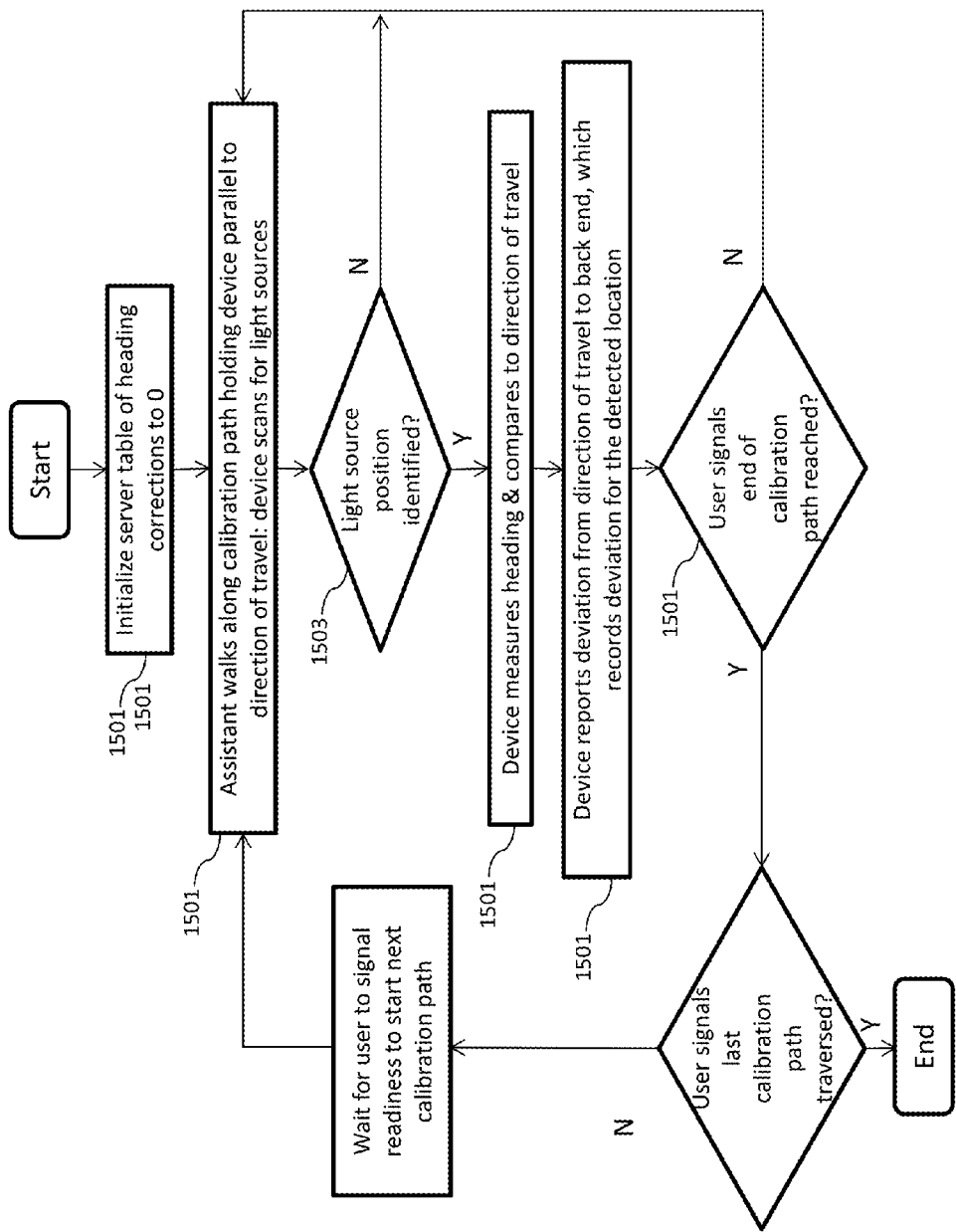
FIG. 53 is a high level schematic of a method for calibrating a system for correcting the compass headings measured by a mobile device.

As noted above, it is preferable for the Deviations Table in the server Maps database to be calibrated or commissioned with deviation measurements for a set of locations in the space to be served by the indoor positioning system (e.g., the locations of the LED light sources in the system). FIG. 53 is a high-level flow chart of an illustrative method for populating a Deviations Table. After starting, the algorithm is cyclic and may be exited at any point by software interrupt (quitting the program). It is presumed for the illustrative method of FIG. 53 that the space of interest may be mostly or wholly covered by a set of straight-line traverses (e.g., along aisles), but in various other embodiments curving paths may be accommodated. It is also presumed that a correctly oriented map of the space in question has already been created and stored in the server Maps database and that the true orientation of the map is known (e.g., by surveying techniques).

First, the server's heading correction table (Deviation Table) for the space to be calibrated is initialized to zero (block 5300). Next, an assistant carrying an appropriately equipped mobile device walks along a calibration path (e.g., from one side of a retail space to the other) holding the mobile device in a significantly non-vertical orientation and parallel to their direction of travel, and the device scans for light source IDs in the ambient light (block 5302). If a light source is not identified (branch point 5304), the assistant continues to walk and the mobile device continues to scan for light source IDs (return to block 5302). If a Light A is identified with sufficient consistency to allow an estimate of the device's position (as, e.g., collocated with Light A) the device takes a heading measurement and compares it to the true heading of the device (block 1506). The true orientation (direction of travel) of the device may be inferred from the layout of the spatial map, whose true orientation is, as noted, already known: for example, if the assistant is walking down an Aisle Z, orienting the mobile device along their direction of travel, then the true orientation of the mobile device may be inferred as being the pre-measured orientation of Aisle Z. Once the device has calculated the deviation between the measured heading and the true heading at its current location, the device reports that deviation to the back end or server, which associates that deviation with that location in a stored table (the Deviation Table) (block 1508). If the assistant does not signal that they have reached the end of the calibration path (branch point 1510), then the assistant continues walking and the device continues to scan for light sources (return to block 5302). If the assistant does signal that they have reached the end of the calibration path (branch point 5310), then the server checks to see if its Deviation Table for the space in question is full (i.e., if the last calibration path has been traversed) (branch point 5312). If the last calibration path has not been walked, the algorithm waits for the assistant to signal that they are ready to begin traversing the next calibration path (block 5314). When the assistant does signal their readiness to begin traversing the next calibration path, the algorithm returns to block 5302 (assistant begins to walk the next calibration path). Details of the illustrative procedure here specified may be varied in various embodiments without significantly altering the nature of the calibration procedure, and all such variations are contemplated and within the scope of the invention.

It is possible that the entries in the Deviation Table as measured during a calibration procedure such as that described with reference to FIG. 53 may gradually lose accuracy as perturbers of the Earth magnetic field are removed from, added to, or reoriented or repositioned within the mapped space. One method of compensating for such changes is to periodically repeat a calibration procedure such as that described with reference to FIG. 53. Another is the method herein termed the Continuous Calibration Method, which may be employed when the indoor location system in question is in some degree of use. The Continuous Calibration Method detects motion and probable device orientation for users of the system (e.g., shoppers in a retail space) and uses that information to update its Deviation Table in a continuous or ongoing manner.

Figure 54:
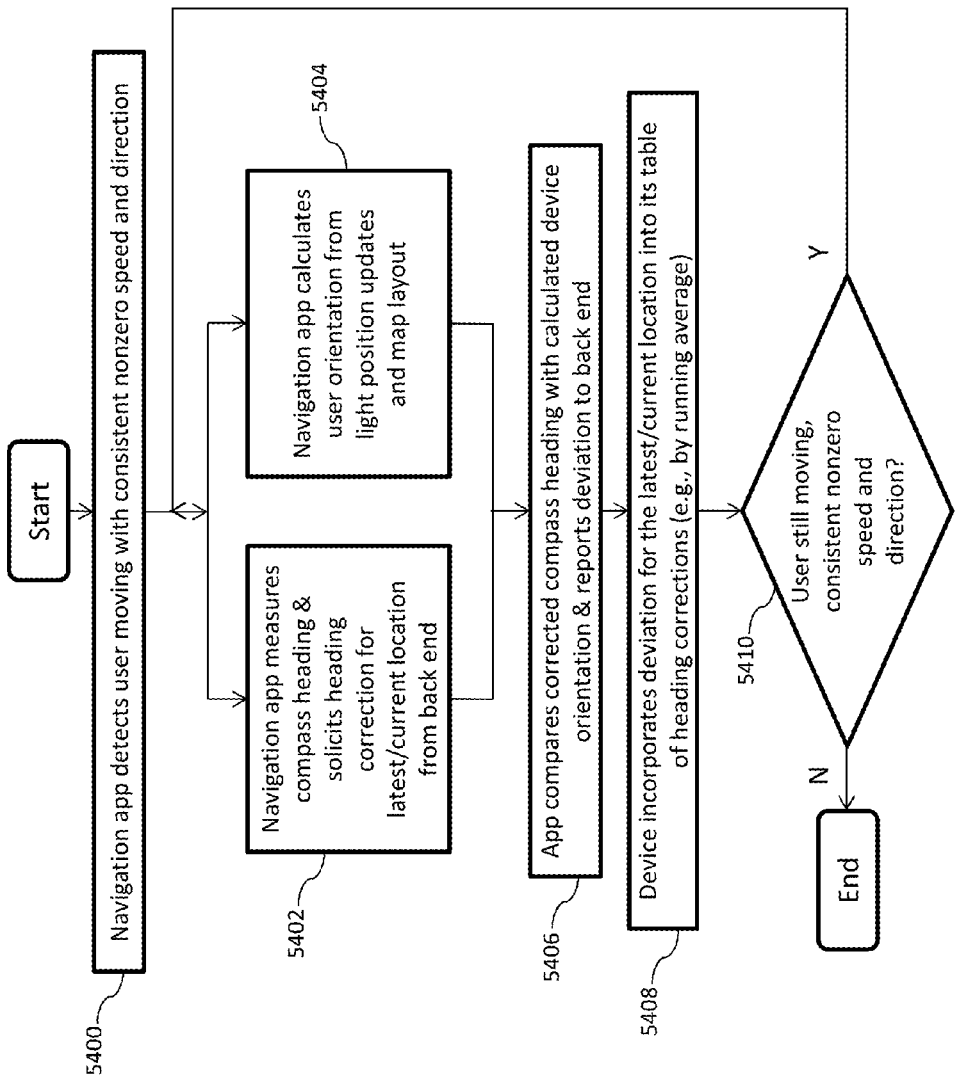
FIG. 54 is a high level schematic of a method for continuously recalibrating a system for correcting the compass headings measured by a mobile device.

FIG. 54 is a high-level flow chart of an illustrative version of the Continuous Calibration Method according to various embodiments of the invention. It is presumed that an indoor positioning system is operable in the space in question, and that at least some users (e.g., shoppers) are moving about the space holding mobile devices and running an app, herein termed the "navigation app," that allows their mobile devices to perform the light ID detection and other navigation functions described herein that are necessary for the implementation of the Continuous Calibration Method as described. After starting, the algorithm is cyclic and may be exited at any point by software interrupt (quitting the program).

First, the navigation app detects, by noting two or more distinct location estimates in series, that the user is in motion at a consistent speed and in a consistent direction (block 5400). Here, "consistent" means within some specified range of variation (e.g., the user's speed need not be perfectly constant). Concurrently, the navigation app proceeds to (a) measure a raw compass heading and to solicit a heading collection from the back end for its latest or current location estimate (block 5402) and to (b) calculate the likely orientation of the device from light position detections and map layout (block 5404). For example, if a series of position estimates shows that the user is likely moving in a straight line down an Aisle Z, the orientation of the device may with reasonable probability be conjectured to be in the user's direction of travel and parallel to the run of Aisle Z. Next, the navigation app compares the corrected compass heading obtained in block 5402 with the calculated device heading obtained in block 5404, and reports the apparent deviation between the two headings to the back end (block 5408). The back end then incorporates this apparent deviation for the current location of the device into its Deviation Table by one of a variety of calculational methods (e.g., by maintaining the deviation recorded in the Deviation Table as a running average of reported apparent deviations). Although some error will tend to be associated with each apparent deviation, as users may hold their mobile devices across a range of angles as they move, such errors are likely to average out over time, enabling the Continuous Calibration method to successfully compensate for changes in local deviations from the Earth field over time. After updating its Deviation Table entry, the back end checks (or the navigation app reports) whether the user continues to be in motion with a consistent speed and direction (decision point 5410); if Yes, the algorithm returns to blocks 5402 and 5404. If No, the algorithm ends until the same user, or another user, is detected in motion with a consistent speed and direction, upon which the algorithm restarts.

In various embodiments, a calibration process such as the illustrative process described with reference to FIG. 53 may be dispensed with, and a Deviation Table may be derived entirely by the Continuous Calibration method described with reference to FIG. 54.

In various embodiments, another technique, herein termed "fingerprinting," may be employed additionally or alternatively to the other techniques described herein for providing accurate orientation and location information to a mobile device user. In fingerprinting, a calibration procedure is used to map the light signals produced throughout a working space (e.g., retail store interior) by a light-based positioning system. The calibration procedure may employ walk-through techniques similar to the calibration procedure described herein with reference to FIGS. 52-54, or other means of obtaining a sufficiently closely spaced set of measurements characterizing the light signal pattern or functional field within the working space: in various embodiments, airborne devices (small drones) quarter a space, either autonomously or under remote control, and acquire measurements that are either stored on board or transmitted to a back end. Measurement data may include imagery, overall brightness, signal detections, orientation of the measuring device, and other data. The grid or mesh of measurements so obtained may be stored in a fingerprint database. In such embodiments, mobile devices (or computers with which the mobile devices are in communication) may compare local light-field measurements with the fingerprint database. Single measurements or series of measurements may be compared to characterize, or to improve the characterization of, the location, motion, and orientation of the mobile device.

Moreover, as will be clear to persons familiar with the science of inertial navigation, a mobile device may estimate changes in its position, velocity, and orientation by measuring accelerations to which the device is subjected and calculating the device's spatial movements therefrom according to the principles of kinematics. Thus, given an initial estimate of position and velocity, suitable acceleration measurements may enable a mobile device to maintain an updated estimate of the device's position and orientation, although the accuracy of the estimate will tend to decrease over time after the initial estimate. Modern mobile devices often contain accelerometers (acceleration-measuring devices). The employment, in various embodiments, of inertial navigation techniques based on data from accelerometers of mobile devices, additionally or alternatively to the other illustrative methods of updating position and orientation estimates described hereinabove, is contemplated and within the scope of the invention.

Frequency Sweep Techniques to Compensate for Unpredictable Camera Exposure

Figure 19A:
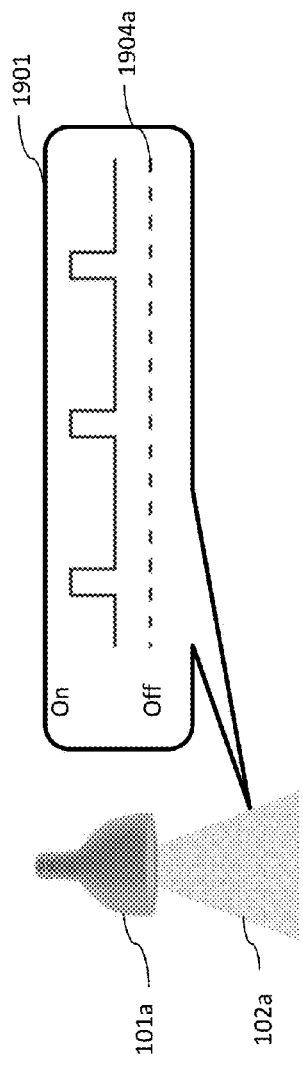
FIGS. 19A-C are representations of a light source undergoing pulse-width-modulation at varying duty cycles with a DC offset, according to some embodiments of the present disclosure.
Figure 19B:
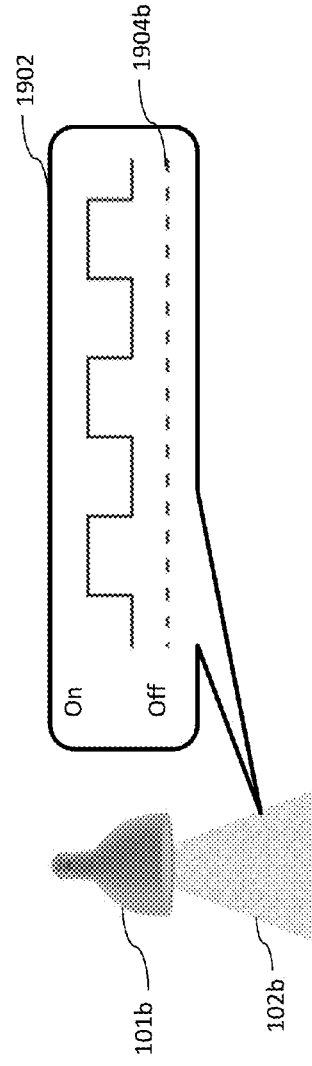
Figure 19C:
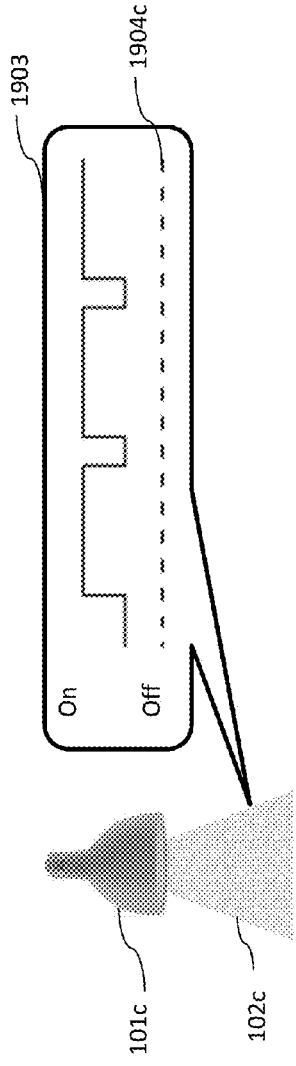

In various embodiments, a light source in an indoor positioning system signals its identity, or transmits information through pulse width modulated DPR as described hereinabove, in the form of a periodic or quasi-periodic variation in brightness (e.g., a square-wave variation in brightness, as in FIGS. 19A-C, or a sinusoidal variation in brightness). The frequency of a brightness variation may be identified by searching for a dominant peak in a spectrum (e.g., FFT) that is derived from one or more digital images or some other series of ambient light measurements: the frequency at which a strong peak is found (e.g., approximately 650 Hz in FIG. 45) is, in general, the frequency of the sought-for periodic variation in the ambient brightness. An identified frequency may be translated to a code symbol or light-source identifier. Moreover, more than one light source or code symbol may be identified in a single digital image or other series of ambient light measurements by observing multiple peaks in an FFT.

However, complications arise from the use of rolling-shutter digital imaging to sample ambient light containing periodic brightness variations. As shall be made clearer below, the pixels composing such images may be exposed for various lengths of time, as $\frac{1}{30}$ second, $\frac{1}{40}$ second, $\frac{1}{60}$ second, or $\frac{1}{120}$ second. If the time of pixel exposure is exactly or approximately equal to an integer multiple of the period (peak-to-peak duration) of the periodic brightness variation (signal), the signal may be rendered undetectable.

Because cameras may autonomously set their exposures over a wide range, it may be difficult or impractical to set a number of distinguishable light-source ID frequencies such that the ID signals always remain detectable regardless of camera self-setting of exposure time.

A brief review of the rolling shutter exposure process will clarify the relevant relationships between signal frequency and exposure time. A typical CMOS image sensor consists of an M by N rectangular array of CCD sensors which may be considered as a series of M adjacent rows, each N pixels long. In a rolling shutter exposure, one entire row of the array is "exposed" simultaneously—that is, all CCD sensors in that row are simultaneously electronically switched to a state in which light-induced charge is collected in each sensor. Exposure of the row continues for some fixed exposure or integration time $T_I$ (e.g., 1/40 sec) set by the mobile device user or automatically by the mobile device itself the exposure time. Shortly (i.e., $T_S$ seconds) after exposure of the jth row begins, exposure of the (j+1)th row begins. (Numbering conventionally begins with 0, so row number is j=0, 1, . . . M−1.) Typically, $T_I$ is much longer than $T_S$, so a number of row exposures will be commenced during the time it takes to expose a single row. The total time required to expose the whole array of M rows is approximately $(M \times T_S)+T_I$. After all rows have been fully exposed (or, in some cases, beginning as soon as the first row is fully exposed) a readout wave sweeps through the sensor array, harvesting accumulated charge from each CCD pixel and assigning a digital numerical value to each CCD charge magnitude. Each array row is subject to the same exposure interval $T_I$, but begins and ends its exposure at a different time.

These relationships are clarified in FIG. 55A and FIG. 55B. FIG. 55A is a plot of an illustrative sinusoidal brightness signal s(t) 5500 emitted by a light source. The vertical axis 5502 corresponds to brightness and the horizontal axis 5504 corresponds to time. The signal s(t) 5500 has an added DC bias comparable to that added to the square-wave signals depicted in FIGS. 19A-C; that is, even during the dimmest part of its cycle, s(t) 5500 is nonzero (the light is not completely off). FIG. 55A also indicates the time window 5506 of a rolling-shutter row exposure. It is here assumed that acquisition of the rolling shutter frame begins at time t=0, so row j begins exposure at t=$jT_S$ (j=0, 1, 2, . . . M−1) and ends $T_I$ seconds later at t=$jT_S+T_I$. All pixels of row j are exposed simultaneously during this time interval.

FIG. 55B depicts the same set of relationships for exposure of the next row of the array, the (j+1)th row. The exposure interval 5506 for the (j+1)th row begins $T_S$ seconds after exposure of the jth row, at t=(j+1)$T_S$, and ends $T_I$ seconds later, at t=(j+1)$T_S+T_I$. Thus, the rolling-shutter digital image is acquired as a staggered or overlapping series of row exposures.

Because a scene image is usually projected by the camera lens upon the CMOS array, each pixel in each row will typically accumulate a different amount of charge than its neighbors during its exposure interval $T_I$. However, because the brightness signal s(t) is part of overall scene illumination, it will tend to contribute approximately the same amount of charge to every pixel in a given row (i.e., it illuminates the sensor more or less uniformly). The contribution of s(t) to the charge accumulated by each row (as opposed to the pixels within each row) will tend to differ because the interval over which each row integrates s(t) begins and ends at a different time. The result is the characteristic striping contributed to a rolling-shutter image by a DPR modulated light source as described hereinabove.

No striping will appear in the detected image, however, under certain conditions. As will be clear to persons familiar with the art of signal analysis, when the exposure interval $T_I$ is equal to the period $T_S$ of s(t) (indicated in FIG. 55A) the contribution of s(t) to the exposure of any row will be equal to the contribution of s(t) to the exposure of any other row. That is, the integral of s(t) over any interval of length $T_S$ is equal to the integral of s(t) over any other interval of length $T_S$, regardless of when the intervals begin. It follows that all integrations over integer multiples of $T_S$ are also equal.

More formally, if $C_j$ is the magnitude of the charge accumulated by the pixels in the jth row as a result of exposure to the s(t) component of the light impinging on the image sensor, where s(t) is any periodic signal, not necessarily a sinusoid, then in general $$C_j \propto \int_{jT_S}^{jT_S+T_I} s(t)dt$$

But if $T_I=wT_S$, with w an integer, then $C_j=C_k=C$ for all j, k<M−1. That is, all row exposures to s(t) will be equal, there will be no striping, and s(t) will go undetected. An illustration of this effect is depicted in FIG. 56A. The horizontal axis 5600 is the row index j, and the vertical axis 5602 is the integrated pixel charge magnitude $C_j$ (here presumed identical for all pixels in row j). The plotted curve 5604 consists of $C_j$ values over an arbitrary range of j. The $C_j$ values, being discrete numbers, are indicated by dots, but a continuous line has been added to curve 5600 for visual clarity. In effect, curve 5604 is a slice across the rolling shutter image (ignoring nonuniform background features), perpendicular to its rows and hence to potential DPR striping. In FIG. 56A, $T_I=wT_S$ with w a positive integer, so all $C_j$ values are equal, no striping is visible, and s(t) goes undetected.

In FIG. 56B, $T_I$ is approximately equal to $wT_S$, with w a positive integer. In other words, the exposure interval $T_I$ is close to the period $T_S$ (which is indicated in FIG. 56B) of the periodic signal s(t). The result is that not all $C_j$ values making up the sample signal 5606 are equal, so s(t) is in principle detectable in the $C_j$ values; however, the amplitude $A(T_I)$ of the oscillation in the sample signal 5606 is small. (Here, the notation "$A(T_I)$" signifies that amplitude A is a function of exposure interval $T_I$. In FIG. 56A, $A(T_I)=0$ and is not indicated.) Thus, when $T_I$ is approximately equal to $wT_S$, with w a positive integer, s(t) will be more difficult to detect in the presence of noise.

In FIG. 56C, $T_I$ differs significantly from $wT_S$. Thus, different rows of the image array accumulate distinctly different quantities of charge during their exposure to s(t), and s(t) is robustly detectable in the sample signal 5608. It will be apparent to persons familiar with the art of signal analysis that the amplitude $A(T_I)$ of the oscillation in the sample signal 5606 will be at a maximum if $T_I=(w+\frac{1}{2})T_S$, where w is any integer from 0 on up. However, $A(T_I)$ need not be at a maximum in order for s(t) to be detected: $A(T_I)$ need only be large enough, relative to noise also present in a digital image, to enable sufficiently robust detection of s(t).

In sum, FIGS. 56A-C demonstrate how three different values of $A(T_I)$ corresponding to three values of $T_I$ for an illustrative sinusoidal DC-offset brightness signal s(t): i.e., zero $A(T_I)$ for FIG. 56A, small $A(T_I)$ for FIG. 56B, and large $A(T_I)$ for FIG. 56C.

FIG. 57A is a plot showing values of $A(T_I)$ corresponding to a range of values of $T_I$ for an illustrative sinusoidal DC-offset brightness signal s(t) (not shown). In FIG. 57A, the horizontal axis 5700 corresponds to $T_I$ (with ten evenly-spaced values of $T_I$ labeled in inverse seconds according to the convention for naming camera exposure times; note, horizontal axis 5700 orders exposure times from longer at the left to shorter at the right). The vertical axis 5702 corresponds to the magnitude of the $A(T_I)$ curve 5704. The period $T_S$ of the simulated signal s(t) sampled for FIG. 57A is 1/675 second; therefore, per the foregoing discussion, $A(T_I)$ should equal zero—that is, s(t) should be undetectable—at exposure times that are integer multiples of 1/675 second, i.e., at $T_I$=$wT_S$ with w a positive integer. This is indeed the case, as shown in FIG. 57A (although due to coarseness in the representation, the $A(T_I)$ curve 5704 does not always go exactly to zero). For example, $A(T_I)$ should equal zero for w=8, a positive integer, in which case $T_I$=$8T_S$=8/675 second=1/84.375 second. That is, there should be a zero in the $A(T_I)$ curve 5704 at 1/84.375 second. The zero is indeed there, as indicated by dashed circle 5706.

Moreover, per the foregoing discussion there should be maxima in the $A(T_I)$ curve at $T_I$=(w+½)$T_S$, where w is any integer from 0 on up. For example, for w=8, $T_I$=(8+½)/675=1/79.4 seconds. The maximum is indeed there, as indicated by dashed circle 5708.

Typically, a mobile device chooses its camera exposure automatically from a small number of available presets, seeking to maximize image contrast. In FIG. 57A, vertical lines 5710, 5712, 5714, and 5716 mark common exposure times ($T_I$ values): 1/30 sec (line 5710), 1/40 sec (line 5712), 1/60 sec (line 5714), and 1/120 sec (line 5716). Dark arrows point to the values of $A(T_I)$ corresponding to these four exposure times. As is apparent, $A(T_I)$ is relatively large for exposures of 1/30 sec, 1/60 sec, and 1/120 sec for this s(t) with period 1/675 sec, but relatively low for an exposure time of 1/40 sec. Thus, if a mobile device happens to self-set its exposure time to 1/40 second, the signature of s(t) in the $A(T_I)$ curve 5704 may be too weak to detect, particularly in the presence of noise.

Figure 57C:
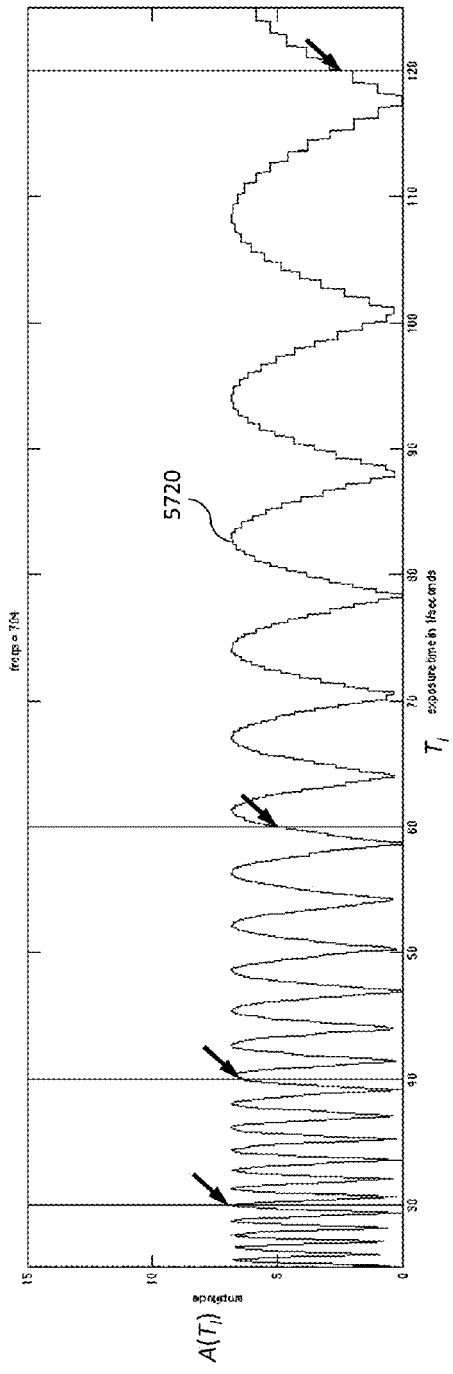
FIG. 57C depicts the amplitude of a sinusoidal brightness signal, frequency 704 Hz, detected in a rolling shutter image for a range of exposure durations.

FIG. 57B and FIG. 57C illustrate that this problem is not generally resolvable by changing $T_S$. In FIG. 57B, the simulated s(t) (not shown) has $T_S$ equal to 1/644 second, and the $A(T_I)$ curve 5718 has shifted leftward, but $A(T_I)$ is still low for $T_I$=1/40 sec. In FIG. 57C, the simulated s(t) has $T_S$ equal to 1/704 sec, and the $A(T_I)$ curve 5720 has shifted rightward, and $A(T_I)$ is now low for $T_I$=1/120 sec.

Figure 57D:
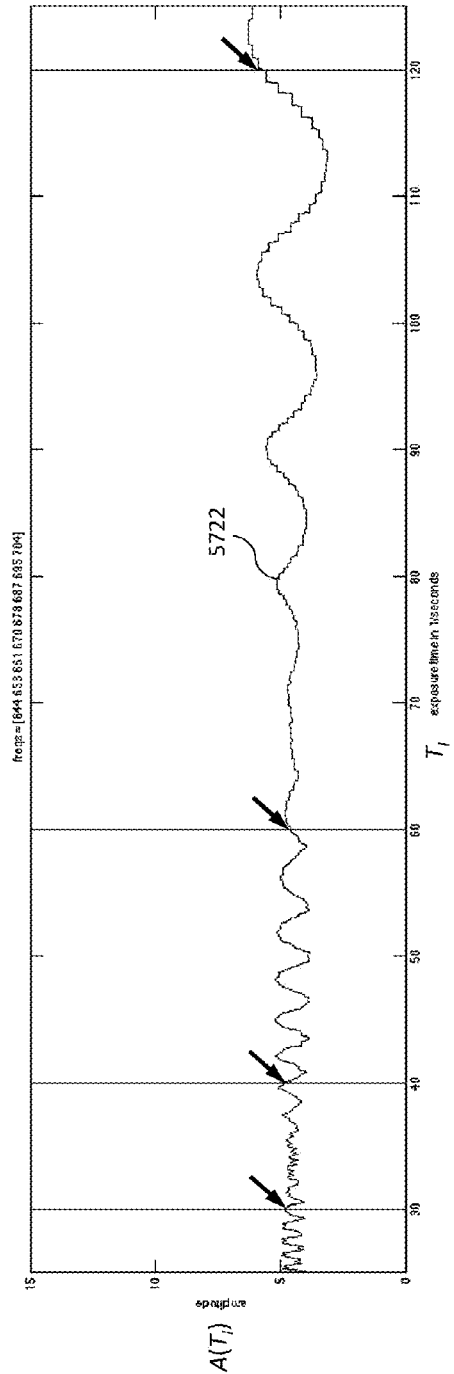
FIG. 57D depicts the amplitude of a frequency-swept brightness signal, center frequency 675 Hz, detected in a rolling shutter image for a range of exposure durations.

In various embodiments, the problem explicated by FIGS. 55A-B, 56A-C, and 57A-B may be mitigated by making s(t) a nonperiodic signal. The brightness signal s(t) may be made nonperiodic, yet remain detectable using the FFT peak detection approach described hereinabove, by "sweeping" its frequency in a relatively narrow range. For a signal period T seconds, the frequency of the signal is by definition f=1/T (units of Hertz [Hz], cycles per second). One method of frequency sweeping is to broadcast a repeating or randomly ordered series of sinusoidal brightness signals of the form s(t)=sin($\omega_i$t), where $\omega_i$=$2\pi/T_{S(i)}$ (in radians per second), the ith of a set of F signal frequencies. The F frequencies $1/T_{S(i)}$ are preferably relatively closely spaced (evenly or otherwise) around a center frequency $1/T_{S(c)}$ that may or may not itself be one of the F frequencies. For example, for a center frequency of 675 Hz, the brightness signal may be swept by cycling through F=8 frequencies spaced at intervals of 15 Hz above and below the center frequency. Thus, signals are broadcast from the light source at 615 Hz, 630 Hz, 645 Hz, 660 Hz, 690 Hz, 705 Hz, 720 Hz, and 735 Hz. The cycle is repeated every 2 seconds, so each signal is broadcast for 2/8=¼ seconds. Other values of F and other cycle repeat periods may be employed. FIG. 57D shows the $A(T_I)$ curve 5722 when this frequency sweeping scheme is implemented for sampling by the same rolling-shutter method posited for FIGS. 57A-C. Although the $A(T_I)$ curve 5722 varies in magnitude, it nowhere approaches zero and the values of $A(T_I)$ at the four exemplary exposures (marked by bold arrows) are similar.

The camera will detect the brightness signal s(t) in image frames exposed significantly or entirely when a frequency is being broadcast that is compatible with the exposure that happens to have been chosen by the camera. Thus, some frames will reveal s(t) strongly and others will not. By averaging multiple frames, detection of s(t) is enabled.

Other methods of frequency sweeping are also contemplated for various embodiments. For example, the frequency of a quasi-sinusoidal signal could be continuously varied. In this approach, instead of modulating a light source to broadcast a sinusoidal brightness signal such as s(t)=sin($\omega$t), where $\omega$=$2\pi/T_S$, the light source is modulated to transmit a brightness signal s(t)=sin(($\omega$+R sin($\varphi$t))t) where R is a constant that sets the width of the sweep range and $\varphi$ is the frequency (in radians per second) of the sweep cycle applied to the center frequency $\omega$. Or, sweeping could occur in a randomized fashioned (random range of sweep, random speed of sweep, randomized jumping to discrete frequencies within the sweep range, etc.). It will be clear to persons familiar with the art of signal processing that these and many other schemes for frequency sweeping are conceivable, have various advantages and disadvantages, and could be implemented in various embodiments of the invention without undue experimentation. It will also be clear that some methods of frequency sweeping may be applied to any periodic signal, not only the sinusoidal signals illustrated herein. All such embodiments are contemplated and within the scope of the invention.

Modulation of Light Signals to Transmit Positional Information

In various embodiments, as discussed hereinabove, modulated brightness may encode information distinctively identifying light sources. This identifying information may be used to look up the physical location of the light source in a database. In various other embodiments, modulation of light from light sources may directly encode location and other information. In one illustrative embodiment, this is accomplished as follows: (1) An x-y coordinate system is defined over a rectangular physical space (planar area) that is large enough to cover or include a given working space, e.g., a retail store interior, that is to be served by a light-based positioning system. The working space may or may not be itself rectangular but is covered by the coordinate system. (2) The brightness of each of one or more light sources in the physical space is modulated by a signal that includes or consists essentially of two or more superimposed sinusoids. In one example, a frequency of one of the sinusoids has a defined relationship to the x coordinate and a frequency of another of the sinusoids has a defined relationship to the y coordinate. The frequency of one of the two sinusoids broadcast by the source, for example, is set, during an initial commissioning or programming process, to be proportional to the x coordinate of the light source in the physical space. Similarly, the frequency of the other sinusoid, for example, is set to be proportional to the y coordinate of the light source. The proportionality may be either direct (e.g., a constant ratio such as $f_x$:x, $f_y$:y) or linear (e.g., $f_x$=mx+c, $f_y$=my+c, where m is a slope defined by a ratio and c is a constant). If no light sources in the working space are co-located, then the x-coordinate frequency and y-coordinate frequency associated with a given light will uniquely specify the light's location (and thus identity). (3) A mobile device detects the frequencies of the x-coordinate and y-coordinate sinusoidal signals (by, e.g., detecting peaks in an FFT of camera or light-sensor data acquired by the mobile device). (4) Software in the mobile device, or in a computer with which the mobile device is in communication, matches the measured sinusoid frequencies to a light's physical x-y coordinates in a database or lookup table, establishing the physical location of the mobile device.

Figure 58A:
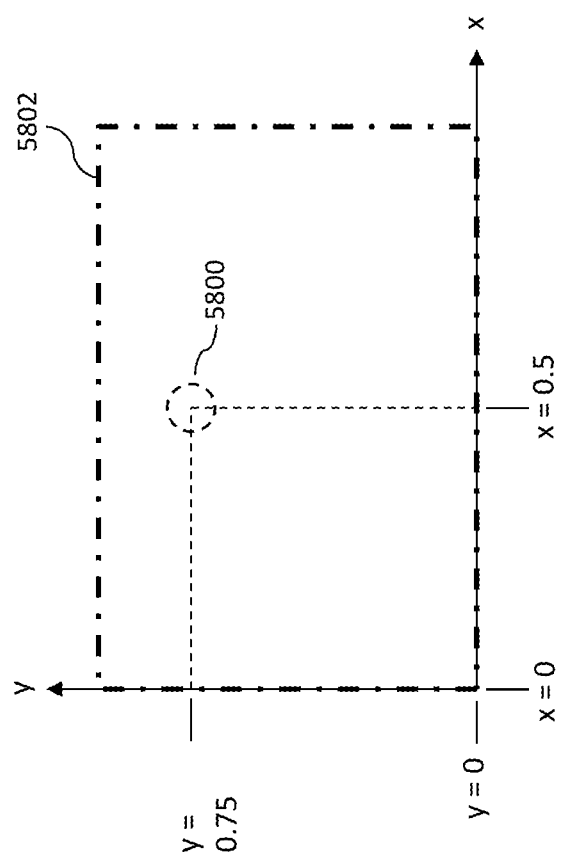
FIG. 58A depicts the alignment of a rectangular physical space containing a light source with a Cartesian coordinate system.

FIG. 58A is a schematic overhead view of the location of light source 5800 in a rectangular physical space 5802, according to an illustrative embodiment of the invention. Light 5800 is part of a light-based positioning system that may contain a multiplicity of similar light sources. Not all of the rectangular space 5802 need be navigable (e.g., some portions of space 5802 may lie within a building, and other portions may lie outside the building), but in general the rectangular space 5802 will be large enough to include a working space served by the light-based positioning system. As indicated in FIG. 58A, the location of light source 5800 is specified by x and y coordinates of a Cartesian coordinate system aligned with the rectangular space 5802. The x and y coordinate axes are defined so that both the x and y dimensions of the space 5802 correspond to a numerical range of [0,1], with the origin or (0,0) point of the x-y coordinate system coinciding with one corner of the space 5802. The physical distance of a point in the space 5802 in the x dimension, as measured from the origin, is found by multiplying the point's x coordinate on [0,1] by the physical width of the space 5802 in the x dimension. The physical y coordinate of a point in the space 5802 is similarly obtained. For example, in the illustrative case depicted in FIG. 58A, the light source 5800 is located at (x, y)=(0.5, 0.75). If the space 5802 is 100 meters wide in the x dimension and 50 meters wide in the y dimension, the physical coordinates of the light source 5801 are therefore $(x_{physical}, y_{physical})=(0.5\times 100 m, 0.75\times 75 m)=(50 m, 37.5 m)$.

Various embodiments encode the (x, y) coordinates of the light source 5800 in the light emitted by the light 5800. In one embodiment, the brightness of the light 5800 is modulated simultaneously by two sinusoids, $S_x$ and $S_y$, that may have different frequencies. The $S_x$ sinusoid encodes the x coordinate of the light 5800 and the $S_y$ sinusoid encodes the y coordinate. The frequency of $S_x$ is herein termed $f_x$, and the frequency of $S_y$ is termed $f_y$. The sinusoids may be detected and their frequencies measured by a mobile or other device using various methods, including peak-detection of an FFT of a series of brightness observations made by a digital camera or any other suitable optical sensor.

A device that has detected two brightness sinusoids 5804, 5806 in light broadcast by source 5800 in FIG. 58A must be able to distinguish which is $S_x$ and which is $S_y$ in order to correctly infer the location of source 5800. FIG. 58B depicts the spectral character of $S_x$ 5804 and $S_y$ 5806 according to an illustrative embodiment that enables such distinction. In the amplitude-coding scheme depicted in FIG. 58B, $S_x$ and $S_y$ broadcast by source 5800 at (x, y) are assigned frequencies $f_x$ and $f_y$ between a lower limit $f_{start}$ and an upper limit $f_{stop}$. In particular, $f_x$ is offset from $f_{start}$ by an amount proportional to x (i.e., $f_x=f_{start}+x(f_{stop}-f_{start})$ and $S_y$ is assigned a frequency $f_y$ by the same method (i.e., $f_y=f_{start}+y(f_{stop}-f_{start})$. A receiving device may distinguish $S_x$ from $S_y$ by the fact that $S_x$ has a greater amplitude than $S_y$. A drawback of this method is that it deliberately makes $S_y$ more difficult to detect than $S_x$.

FIG. 58C depicts the spectral character of $S_x$ 5804 and $S_y$ 5806 according to another illustrative embodiment. In the frequency-coding scheme depicted in FIG. 58C, $S_x$ 5804 is assigned a frequency in one frequency band (i.e., between a lower limit $f_{x-start}$ and an upper limit $f_{x-stop}$) and $S_y$ 5806 is assigned a frequency in a second frequency band (i.e., between a lower limit $f_{y-start}$ and an upper limit $f_{y-stop}$). To assure that the two signals $S_x$ 5804 and $S_y$ 5806 are always distinguishable by a detecting device, the upper frequency of one band is separated from the lower frequency of the other band by a buffer difference $\Delta$buff. To encode the x-y coordinates of a source 5800 (FIG. 58A), $f_x$ is offset from $f_{x-start}$ by an amount proportional to x (i.e., $f_x=f_{x-start}+x(f_{x-stop}-f_{x-start})$) and $f_y$ is offset from $f_{y-start}$ by an amount proportional to y (i.e., $f_y=f_{y-start}+y(f_{y-stop}-f_{y-start})$). The two sinusoids $S_x$ 5804 and $S_y$ 5806 may, in this illustrative embodiment, be of approximately equal magnitude. In various embodiments, the two frequency bands employed may or may not be of equal width; also, the coding scheme may be modified to employ more than two bands, thus conveying additional information or spreading the x and y coordinate information over multiple, non-contiguous bands.

To decode the broadcast information, a detecting device detects the two sinusoids and infers from the positions of their frequencies within their non-overlapping bands the physical coordinates of the source 5800 in FIG. 58A.

Figure 59:
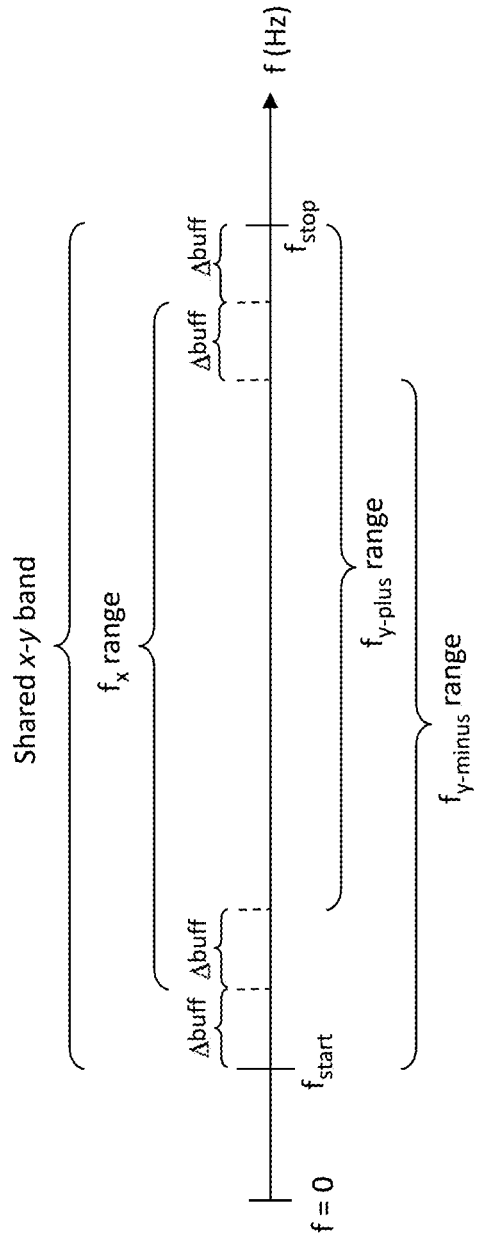
FIG. 59 depicts frequency-domain relationships using a third position-encoding method according to various embodiments of the invention.

The scheme depicted in FIG. 58C has the drawback of employing two nonoverlapping frequency bands, even though in communications systems it is in general desirable to minimize the use of bandwidth. In various other embodiments, a single frequency band (shared x-y band) is employed to broadcast a source's x and y coordinates. Coding schemes of this type are herein termed "XY compression" schemes. FIG. 59 depicts the meaning of several terms pertaining to an illustrative XY compression scheme. The shared x-y band begins at a lower limit $f_{start}$ f and ends at an upper limit $f_{stop}$. Three sinusoids are broadcast simultaneously, i.e. (1) $S_x$ (not depicted), having frequency $f_x$, (2) $S_{y-plus}$ (not depicted), having frequency $f_{y-plus}$, and (3) $S_{y-minus}$ (not depicted), having frequency $f_{y-minus}$. All three sinusoids may have approximately the same amplitude (e.g., the maximum amplitude that may be feasibly broadcast). To assure that all sinusoids may be distinguished by a detecting device, the frequency difference between any two sinusoids is always equal to or greater than a buffer difference $\Delta$buff. As depicted in FIG. 60A, the ranges permitted to the frequencies of the three sinusoids $S_x$, $S_{y-plus}$, and $S_{y-minus}$ are as follows: For $f_x$, the start frequency (lower limit) is $f_{x-start}=f_{start}+\Delta$buff and the end frequency (upper limit) is $f_{x-stop}=f_{stop}-\Delta$buff. For $f_{y-plus}$, the start frequency is $f_{y-plus-start}=f_{start}+2\Delta$buff and the end frequency $f_{y-plus-stop}=f_{stop}$. For $f_{y-minus}$, the start frequency is $f_{y-minus-start}=f_{start}$ and the end frequency is $f_{y-minus-stop}=f_{stop}-2\Delta$buff.

Figure 60:
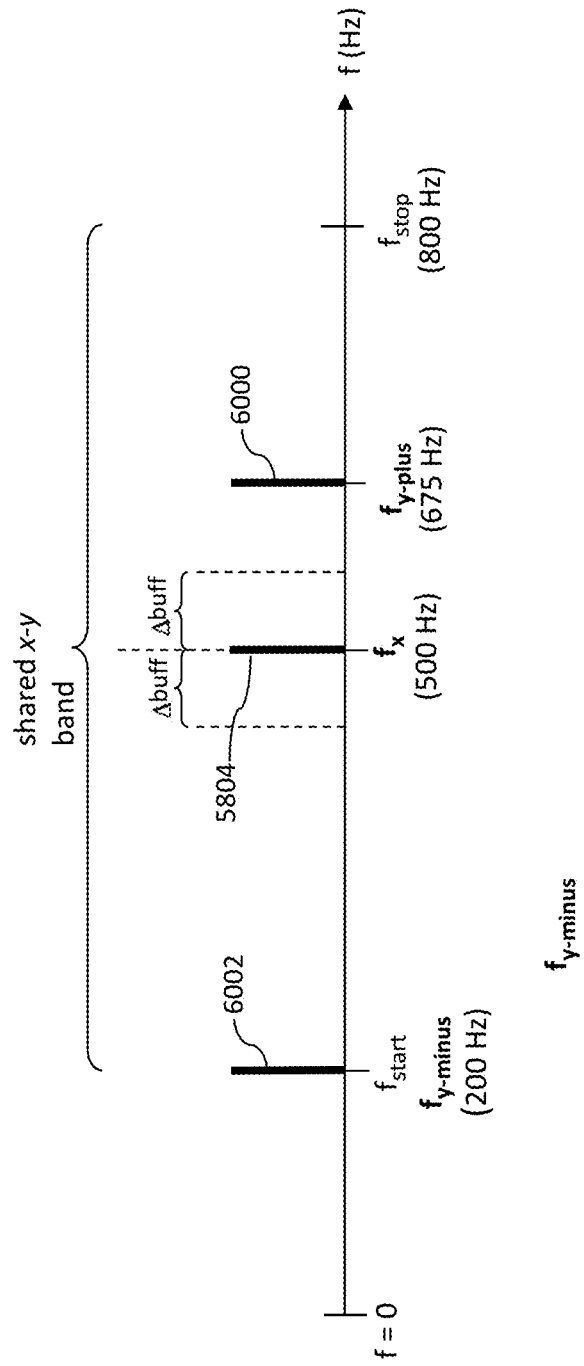
FIG. 60 depicts encoding of the location of the light source in FIG. 58A using the third position-encoding method according to various embodiments of the invention.

FIG. 60 depicts the encoding of the same illustrative light-source coordinates depicted in FIG. 58A using a version of the scheme partly depicted in FIG. 59. Three sinusoids are broadcast simultaneously between $f_{start}$ and $f_{stop}$, i.e. (1) $S_x$ 5804, having frequency $f_x$, (2) $S_{y-plus}$ 6000, having frequency $f_{y-plus}$, and (3)$S_{y-minus}$ 6002, having frequency $f_{y-minus}$. A minimum difference of $\Delta$buff is maintained between adjacent frequencies. The x coordinate is encoded by the position of $f_x$ in the shared band and the y coordinate is encoded jointly by the positions of $f_{y-minus}$ and $f_{y-plus}$ in the shared band. First, $f_x$ is determined as a proportional fraction of the x-frequency range: $f_x=f_{x-start}+x(f_{x-stop}-f_{x-start})$. Second, $f_{y-minus}$ is set equal to $f_{start}$. Third, $f_{y-plus}$ is set to a proportional fraction of the $f_{y-plus}$ frequency range: $f_{y-plus}=f_{y-plus-start}+y(f_{y-plus-stop}-f_{y-plus-start})$. However, if this value of $f_{y-plus}$ is less than $f_x+\Delta$buff, then $f_{y-minus}$ and $f_{y-plus}$ are both right-shifted, as explained below, to assure that (a) $f_x$ remains between $f_{y\text{-}minus}$ and $f_{y\text{-}plus}$ and/or that (b) a difference of $\Delta buff$ is preserved between adjacent frequencies.

In an illustrative case, $f_{start}=200$ Hz, $f_{stop}=800$ Hz, $\Delta buff=50$ Hz, and the x-y coordinate pair to be broadcast is (0.5, 0.75). Therefore, $$f_{x\text{-}start} = f_{start} + \Delta buff = 200 + 50 \text{ Hz} = 250 \text{ Hz}$$

$$f_{x\text{-}stop} = f_{stop} - \Delta buff = 800 - 50 = 750 \text{ Hz}$$

$$f_{y\text{-}plus\text{-}start} = f_{start} + 2\Delta buff = 200 + 2(50) \text{ Hz} = 300 \text{ Hz}$$

$$f_{y\text{-}plus\text{-}stop} = f_{stop} = 800 \text{ Hz}$$

$$f_{y\text{-}minus\text{-}start} = f_{start} = 200 \text{ Hz}$$

$$f_{y\text{-}minus\text{-}stop} = f_{stop} 2\Delta buff = 800 - 2(50) \text{ Hz} = 700 \text{ Hz}$$

Also, $$f_x = f_{x\text{-}start} + x(f_{stop} - f_{start} - 2\Delta buff) =$$
$$f_{x\text{-}start} + x(f_{x\text{-}stop} - f_{x\text{-}start}) = 250 + 0.5(750 - 250) = 500 \text{ Hz}$$

$$f_{y\text{-}minus} = f_{start} = 200 \text{ Hz}$$

$$f_{y\text{-}plus} =$$
$$f_{y\text{-}plus\text{-}start} + y(f_{y\text{-}plus\text{-}stop} - f_{y\text{-}plus\text{-}start}) = 300 + 0.75(800 - 300) = 675 \text{ Hz}.$$

These illustrative values are depicted in FIG. 60.

Figure 61A:
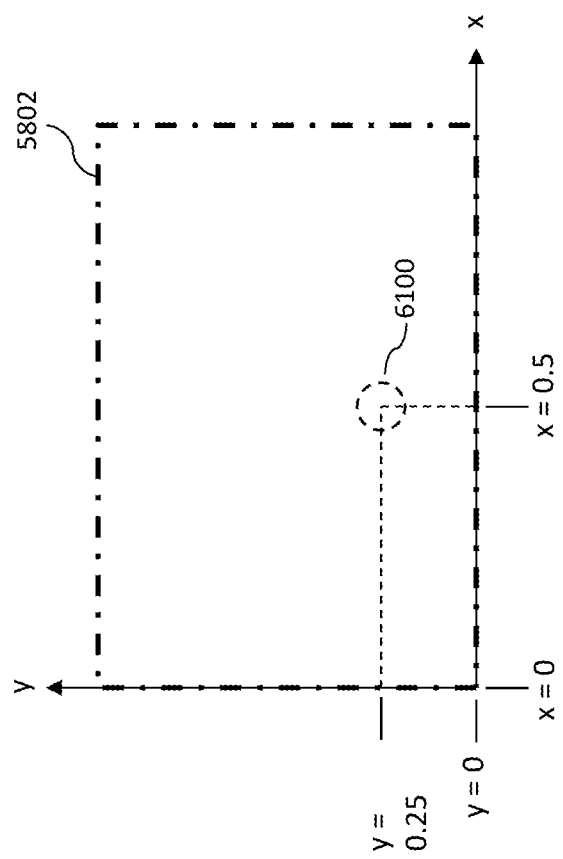
FIG. 61A depicts the location of a second light source in the space depicted in FIG. 58A.

In another illustrative case, the x-y coordinate pair to be broadcast is (0.5, 0.25). This case is schematically depicted in FIG. 61A. In this case, $$f_x = f_{x\text{-}start} + x(f_{stop} - f_{start} - 2\Delta buff) =$$
$$f_{x\text{-}start} + x(f_{x\text{-}stop} - f_{x\text{-}start}) = 250 + 0.5(750 - 250) = 500 \text{ Hz}$$

However, here the default value for $f_{y\text{-}plus}$ is less than $f_x + \Delta buff$ (=550 Hz):

$$f_{y\text{-}plus\text{-}start} + y(f_{y\text{-}plus\text{-}stop} - f_{y\text{-}plus\text{-}start}) = 300 + (0.25)(800-300) = 425 \text{ Hz} < 550 \text{ Hz}$$

Therefore, $f_{y\text{-}minus}$ and $f_{y\text{-}plus}$ are assigned right-shifted values according to the following rules:

$$f_{y\text{-}plus} = f_x + \Delta buff = 500 + 50 \text{ Hz} = 550 \text{ Hz}$$

$$f_{y\text{-}minus} =$$
$$f_{y\text{-}minus\text{-}start} + f_x + \Delta buff - (f_{y\text{-}plus\text{-}start} + y(f_{y\text{-}plus\text{-}stop} - f_{y\text{-}plus\text{-}start})) =$$
$$200 + 500 + 50 - 425 \text{ Hz} = 325 \text{ Hz}$$

Figure 61B:
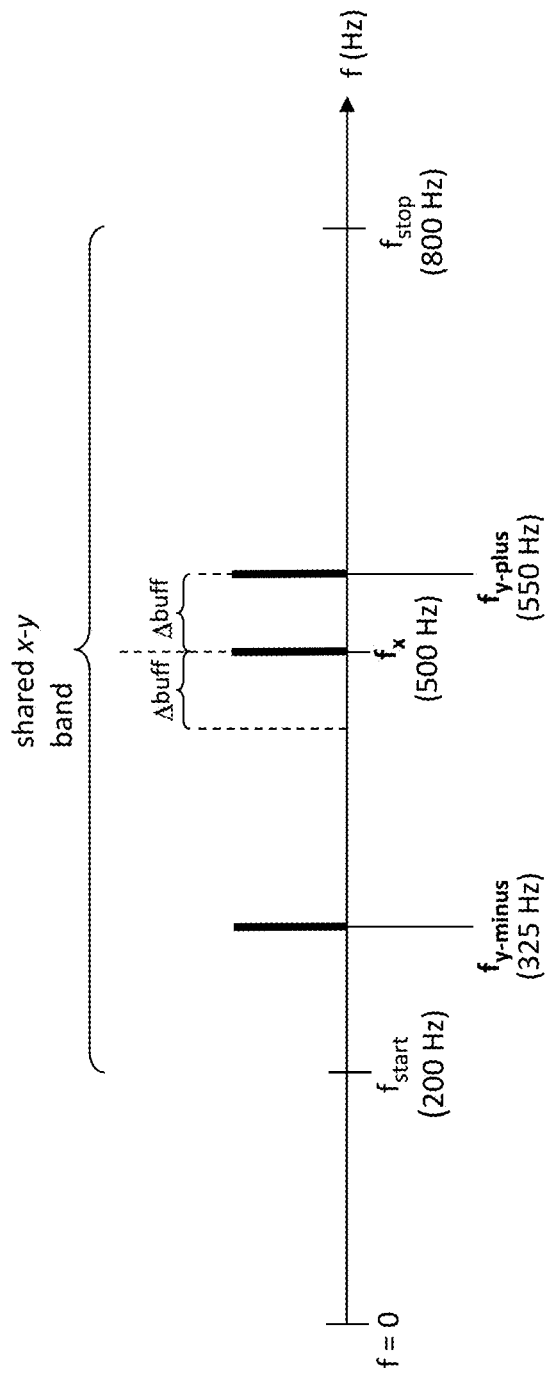
FIG. 61B depicts encoding of the location of the light source in FIG. 61A using the third position-encoding method according to various embodiments of the invention.

These illustrative values are depicted in FIG. 61B.

Figure 62:
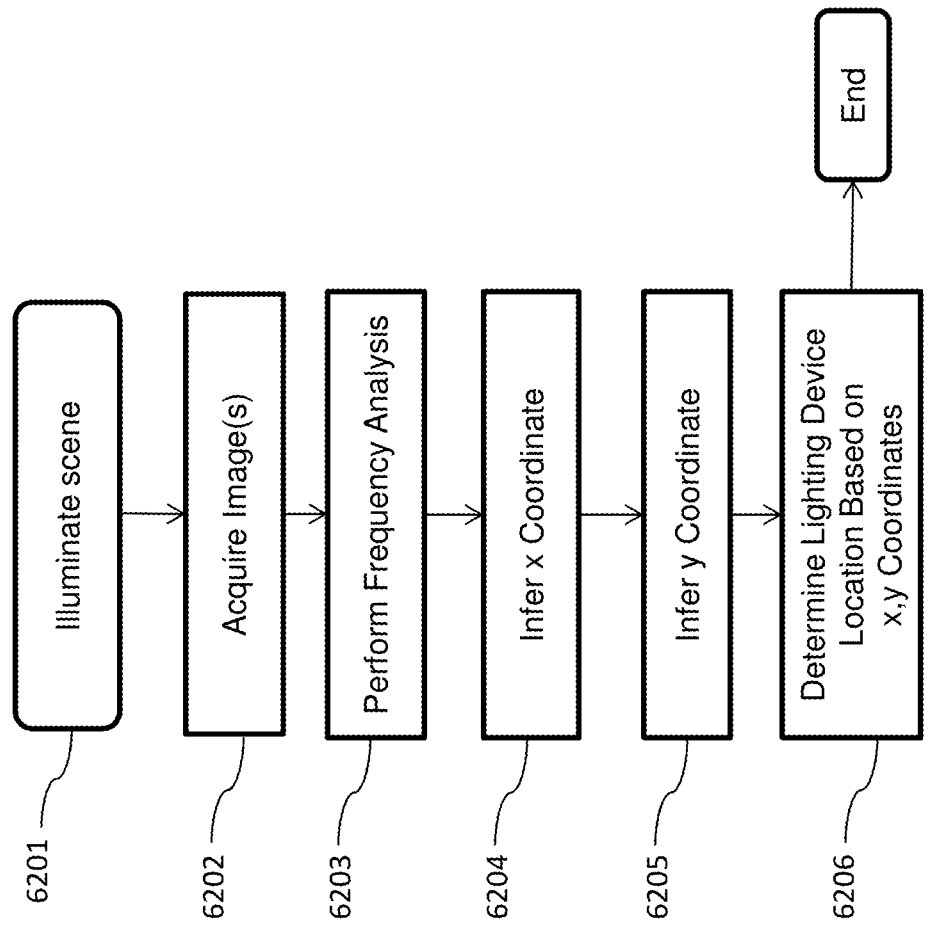
FIG. 62 is a high level flow chart of an example of a process performed by a mobile device to determine a location of a lighting device within a space.

FIG. 62 depicts an example of a process performed by a mobile device to identify a location of a lighting device within a space. In step 6201, a lighting device emits visible artificial light within a space. In one example, the emitted visible artificial light includes modulated intensities representing at least two frequencies corresponding to at least two sinusoids, such as described above in relation to FIGS. 58A-61B. An image sensor of a mobile device, in step S6202, captures one or more images including the emitted visible light. The mobile device performs frequency analysis in step 6203. As part of the frequency analysis, the mobile device obtains the at least two frequencies.

In step 6204, the mobile device infers an x coordinate corresponding to the location of the lighting device. In step 6205, the mobile device infers a y coordinate corresponding to the location of the lighting device. The x and y coordinates, for example, represent a physical location of the lighting device within a space, as described above in relation to FIGS. 58A and 61A. Based on the inferred x,y coordinates, the location of the lighting device is determined in step 6206 and the process ends.

In one example, corresponding to the shared-band, 2-amplitude coding described above in reference to FIG. 58B, the mobile device identifies the obtained frequency having the greater amplitude as representing the x coordinate and the obtained frequency having the lesser amplitude as representing the y coordinate. The mobile device, in this example, also determines a lower limit frequency and an upper limit frequency. In this example, the value of the x coordinate is equal to the difference between the obtained frequency having the greater amplitude and the lower limit frequency divided by the difference between the upper limit frequency and the lower limit frequency. Similarly, the value of the y coordinate is equal to the difference between the obtained frequency having the lesser amplitude and the lower limit frequency divided by the difference between the upper limit frequency and the lower limit frequency.

In a different example, corresponding to the split-band coding described above in relation to FIG. 58C, the mobile device identifies a first of the two obtained frequencies between a first lower limit frequency and a first upper limit frequency as representing the x coordinate. The mobile device, in this different example, also identifies a second of the two obtained frequencies between a second lower limit frequency and a second upper limit frequency as representing the y coordinate. The mobile device further determines a buffer difference between the two frequency ranges. In this different example, the value of the x coordinate is equal to the difference between the first obtained frequency and the first lower limit frequency divided by the difference between the first upper limit frequency and the first lower limit frequency. Similarly, the value of the y coordinate is equal to the difference between the second obtained frequency and the second lower limit frequency divided by the difference between the second upper limit frequency and the second lower limit frequency.

In yet another example, corresponding to the shared-band, three-frequency coding described above in relation to FIG. 59, the mobile device obtains three frequencies modulated within the emitted light. The mobile device first determines a lower limit frequency, an upper limit frequency and a buffer difference. The mobile device, in this yet another example, identifies a first of the three obtained frequencies between a first additional lower limit frequency and a first additional upper limit frequency as representing the x coordinate. The first additional lower limit frequency is equal to the lower limit frequency plus the buffer difference and the first additional lower limit frequency is equal to the upper limit frequency minus the buffer difference. The mobile device then identifies a second of the three obtained frequencies between a second additional lower limit frequency and a second additional upper limit frequency. The second additional lower limit frequency is equal to the lower limit frequency and the second additional lower limit frequency is equal to the upper limit frequency minus twice the buffer difference. The mobile device also identifies a third of the three obtained frequencies between a third additional lower limit frequency and a third additional upper limit frequency as representing the y coordinate. The third additional lower limit frequency is equal to the lower limit frequency plus twice the buffer difference and the third additional upper limit frequency equal to the upper limit frequency. That is, the frequency corresponding to the y frequency is always the highest obtained frequency and the frequency corresponding to the x frequency is always between the other two obtained frequencies.

In this yet another example, the value of the x coordinate is equal to the difference between the first obtained frequency and the first additional lower limit frequency divided by the difference between the first additional upper limit frequency and the first additional lower limit frequency. Similarly, the value of the y coordinate is equal to the difference between the third obtained frequency and the third additional lower limit frequency divided by the difference between the third additional upper limit frequency and the third additional lower limit frequency.

It will be clear to a person of ordinary skill in the science of communications and signaling that the rules demonstrated with reference to FIGS. 59-61B will (a) always produce values of the frequencies $f_x$, $f_{y\text{-}plus}$, and $f_{y\text{-}minus}$ that (a) always place $f_x$ between $f_{y\text{-}minus}$ and $f_{y\text{-}plus}$, (b) never allow two of the frequencies to be closer than $\Delta$buff, and (c) uniquely and simultaneously map any x coordinate on [0, 1] and any y coordinate on [0,1] to the shared frequency band, enabling a receiving device to infer the transmitted coordinates. It will also be clear that various details of these illustrative schemes may be varied without the introduction of meaningful inventive novelty; for example, non-sinusoidal modulations of brightness could be employed, the roles of x and y could be reversed, different algebraic rules for setting the three frequencies could be employed, and so forth. All such variations are contemplated and within the scope of the invention.

Frequency Sweeping to Mitigate Destructive Interference

A limitation of the illustrative XY compression scheme described with reference to FIGS. 59-61B is that two or more light sources employing the same frequency range for the broadcast of x and y coordinate information may illuminate a given area using sinusoids having identical frequencies: e.g., two light sources may have different y coordinates but the same x coordinate. Although such frequency matching will not introduce informational ambiguity (e.g., if two light sources detectable by a mobile device have the same x coordinate then it does not matter if one source's $S_x$ signal, or the other's, or both are detected by the mobile device), but destructive interference by out-of-phase sinusoids of identical frequency may occur. Such destructive interference may make the sinusoids undetectable at various points in the illuminated physical space, producing "dead spots." Therefore, in various embodiments of the invention featuring multiple light sources that broadcast location information using the XY compression scheme, destructive interference is avoided by causing each light source to sweep its broadcast sinusoid frequencies repetitively over a randomly or pseudorandomly varied sweep period. For example, a light source broadcasting a sinusoid having a nominal frequency of 310 Hz may sweep the actual frequency of the sinusoid from 305 to 315 Hz over a period of 2.1 minutes, while another light source, also broadcasting a sinusoid having a nominal frequency of 310 Hz, may sweep the actual broadcast frequency of its sinusoid from 305 to 315 Hz over a period of 2.0 minutes. Sweep periods may be randomly and permanently assigned to individual light sources, or individual light sources may vary their own sweep periods in a random fashion; sweeping may occur either continuously or in discrete steps of frequency change. In either case, the result is that any interference patterns occurring in the illuminated space are impermanent and there are no fixed "blind spots." For example, any destructive interference from nominal 310 Hz signals broadcast by two light sources cannot be locked in, but will be fleeting.

Additionally or alternatively to modulation of the brightness of light sources in order to convey identifier and/or location information, modulation of the frequency of light sources to convey such information is contemplated and within the scope of the invention. Perceptible frequency modulation (color modulation) would likely be irksome to users of a beacon-illuminated space, but color modulation will not be perceptible if (a) the modulation is over a sufficiently narrow frequency range, (b) the modulation is sufficiently rapid compared to human persistence of vision, and/or (c) the light being modulated is not visible, e.g., the light is infrared light. Color modulation is readily detectable by a range of devices, including digital cameras such as those built into many mobile devices.

Moreover, devices exist for modulating the polarization of light (e.g., electronically controlled Faraday rotators), and such devices may be miniaturized (using, e.g., micro-electromechanical systems [MEMS] techniques). Polarity-modulated light may thus also be broadcast by a light source. Not all the light broadcast by a light source need be so modulated. Changes in polarization may both be detected by a variety of means, as will be clear to persons familiar with the science of physical optics. Thus, information may be broadcast by modulating the brightness and/or frequency and/or polarization of some or all of the light from a light source in either a fixed or a time-varying fashion. Indeed, modulation of two or more of brightness, frequency, and polarization may be performed simultaneously, effectively conveying light-identifying information, x-y coordinate information, and other information along two or more parallel channels and so increasing the effective bandwidth of the source, which is advantageous. Mobile devices are not yet typically equipped with sensors enabling the detection of infrared frequency modulation and/or polarization modulation, but mobile devices could be so equipped. All techniques discussed herein that employ brightness modulation as a means of broadcasting information from light sources, or that are contemplated and within the scope of the invention though not explicitly discussed, are also contemplated and within the scope of the invention insofar as these techniques may also employ forms of light modulation other than, or in addition to, brightness modulation. For example, position determination by a mobile device may entail identifying nearby light sources by distinctive sinusoidal variations in color or polarization rather than, or in addition to, distinctive sinusoidal variations in brightness.

The techniques and methods disclosed herein for use in light-based positioning systems can be used with a variety of camera equipped mobile or stationary devices, such as mobile phones, tablet computers, netbooks, laptops, desktops, wearable computers, computer-enhanced eyeglasses, or custom-designed hardware.

Having described one embodiment of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A mobile device, comprising:
an image sensor;
a compass;
a processor coupled to the image sensor and the compass;
a user interface element comprising a display screen;
a wireless interface configured to communicate through a network over a wireless medium;
a memory configured to store for each of a plurality of visible light sources located within an interior space for light-based positioning, a respective location of a respective visible light source and a respective heading correction value for the respective visible light source; and
software in the memory to be run by the processor, wherein running of the software by the processor configures the mobile device to implement functions, including functions to:
  operate the image sensor to capture one or more images including a plurality of signals modulated within visible light, wherein:
    the visible light is transmitted from the plurality of visible light sources located within the interior space for light-based positioning;
    each signal is modulated within visible light transmitted by the respective visible light source located within the interior space for light-based positioning; and
    each signal corresponds to a respective identity of the respective visible light source;
  process the one or more images captured by the image sensor to determine, based at least in part on the plurality of signals, an estimated location of the mobile device within the interior space, the estimated location being an intermediate point between the plurality of visible light sources that is not directly underneath any of the visible light sources;
  operate the compass to capture a raw heading measurement at the intermediate point;
  obtain a corrected heading estimate for the intermediate point, wherein the function to obtain the corrected heading estimate further includes functions to:
    for each modulated signal by the respective visible light source:
      obtain the respective location of the respective visible light source; and
      retrieve, based on the respective location of the respective visible light source, the respective heading correction value, wherein the function to retrieve includes functions to:
        receive, via the wireless interface, the respective heading correction value and the respective location for each of the respective visible light sources; and
        store the respective heading correction value and the respective location for each of the respective visible light sources in the memory;
      determine, based on the retrieved heading correction values, an estimated heading correction value for the intermediate point, wherein the function to determine includes functions to:
        weight the retrieved heading correction values of the visible light sources by an inverse of distance from the respective location of the respective visible light source to the intermediate point; and
        average the inversely weighted heading correction values to produce the estimated heading correction value for the intermediate point;
    determine, based on the raw measurement and the estimated heading correction value, the corrected heading estimate for the intermediate point; and
  operate the user interface element to display a map of the interior space, the displayed map including a depiction of the determined estimated location of the mobile device that is based on processing the one or more images captured by the image sensor including each signal modulated within visible light transmitted by the respective visible light source located within the interior space for light-based positioning and the displayed map being rotated, based on the corrected heading estimate, to be consistent with a physical orientation of a user of the mobile device within the interior space.

2. The mobile device of claim 1, wherein the implemented functions further include functions to:
receive, upon entry into the interior space and via the wireless interface, data representing the map of the interior space; and
store data representing the map in the memory.

3. A mobile device, comprising:
an image sensor;
a compass;
a processor coupled to the image sensor and the compass;
a user interface element comprising a display screen;
a wireless interface configured to communicate through a network over a wireless medium;
a memory configured to store for each of a plurality of visible light sources located within an interior space for light-based positioning, a respective location of a respective visible light source and a respective heading correction value for the respective visible light source; and
software in the memory to be run by the processor, wherein running of the software by the processor configures the mobile device to implement functions, including functions to:
  operate the image sensor to capture one or more images including a plurality of signals modulated within visible light, wherein:
    the visible light is transmitted from the plurality of visible light sources located within the interior space for light-based positioning;
    each signal is modulated within visible light transmitted by the respective visible light source located within the interior space for light-based positioning; and
    each signal corresponds to a respective identity of the respective visible light source;
  process the one or more images captured by the image sensor to determine, based at least in part on the plurality of signals, an estimated location of the mobile device within the interior space, the estimated location being an intermediate point between the plurality of visible light sources that is not directly underneath any of the visible light sources;
  operate the compass to capture a raw heading measurement at the intermediate point;
  obtain a corrected heading estimate for the intermediate point, wherein the function to obtain the corrected heading estimate further includes functions to:
    for each modulated signal by the respective visible light source:

obtain the respective location of the respective visible light source; and retrieve, based on the respective location of the respective visible light source, the respective heading correction value, wherein the function to retrieve includes functions to:

receive, via the wireless interface, the respective heading correction value and the respective location for each of the respective visible light sources; and store the respective heading correction value and the respective location for each of the respective visible light sources in the memory;

determine, based on the retrieved heading correction values, an estimated heading correction value for the intermediate point, wherein the function to determine includes functions to:

weight the retrieved heading correction values of the visible light sources by distance from the respective location of the respective visible light source to the intermediate point such that closer visible light sources have a heavier weighting; and average the weighted heading correction values to produce the estimated heading correction value for the intermediate point;

determine, based on the raw measurement and the estimated heading correction value, the corrected heading estimate for the intermediate point; and operate the user interface element to display a map of the interior space, the displayed map including a depiction of the determined estimated location of the mobile device that is based on processing the one or more images captured by the image sensor including each signal modulated within visible light transmitted by the respective visible light source located within the interior space for light-based positioning and the displayed map being rotated, based on the corrected heading estimate, to be consistent with a physical orientation of a user of the mobile device within the interior space.

4. The mobile device of claim 3, wherein:

the function to process the one or more images includes a function to determine, for each modulated signal, the respective identity of the respective visible light source; and the function to obtain the respective location of the respective visible light source includes functions to:
transmit, via the wireless interface, the respective identity; and
receive, via the wireless interface, the respective location.

5. The mobile device of claim 3, wherein:
the function to process the one or more images includes a function to determine, for each modulated signal, the respective identity of the respective visible light source; and
the function to obtain the respective location of the respective visible light source includes a function to retrieve, from the memory and based on the respective identity of the respective visible light source, the respective location of the respective visible light source.

6. The mobile device of claim 3,
wherein the implemented functions further include functions to:
receive, upon entry into the interior space and via the wireless interface, data representing the map of the interior space; and
store data representing the map in the memory.

7. A method, comprising steps to:
capture, via an image sensor of a mobile device, one or more images including at least one signal modulated within visible light, wherein:
the visible light is transmitted from a plurality of visible light sources located within an interior space for light-based positioning;
each signal is modulated within visible light transmitted by a respective one visible light source located within the interior space for light-based positioning; and
each signal corresponds to a respective identity of a respective visible light source;
process the one or more images captured via the image sensor to determine, based at least in part on the plurality of signals, an estimated location of the mobile device within the interior space, the estimated location being an intermediate point between the plurality of visible light sources that is not underneath the visible light sources;
capture, via a compass of the mobile device, a raw heading measurement at the intermediate point;
obtain a corrected heading estimate based at least in part on the raw heading measurement for the intermediate point, wherein the function to obtain the corrected heading estimate further includes steps to:
for each modulated signal by the respective visible light source:
obtain a respective location of a respective visible light source; and
retrieve, based on the respective location of the respective visible light source, a respective heading correction value, the function to retrieve including functions to:
receive, via a wireless interface, the heading correction value and the respective location for each of the respective visible light sources; and
store the respective heading correction value and the respective location for each of the respective visible light sources in a memory; and
determine, based on the retrieved heading correction values, an estimated heading correction value for the intermediate point, wherein the step to determine includes steps to:
weight the retrieved heading correction values of the visible light sources by an inverse of distance from the respective location of the respective visible light source to the intermediate point; and
average the inversely weighted heading correction values to produce the estimated heading correction value for the intermediate point.

8. A method, comprising steps to:
capture, via an image sensor of a mobile device, one or more images including at least one signal modulated within visible light, wherein:
the visible light is transmitted from a plurality of visible light sources located within an interior space for light-based positioning;

each signal is modulated within visible light transmitted by a respective one visible light source located within the interior space for light-based positioning; and each signal corresponds to a respective identity of a respective visible light source;

process the one or more images captured via the image sensor to determine, based at least in part on the plurality of signals, an estimated location of the mobile device within the interior space, the estimated location being an intermediate point between the plurality of visible light sources that is not underneath the visible light sources;

capture, via a compass of the mobile device, a raw heading measurement at the intermediate point;

obtain a corrected heading estimate based at least in part on the raw heading measurement for the intermediate point, wherein the function to obtain the corrected heading estimate further includes steps to:

for each modulated signal by the respective visible light source:

obtain a respective location of a respective visible light source; and retrieve, based on the respective location of the respective visible light source, a respective heading correction value, the function to retrieve including functions to:

receive, via a wireless interface, the heading correction value and the respective location for each of the respective visible light sources; and store the respective heading correction value and the respective location for each of the respective visible light sources in a memory; and determine, based on the retrieved heading correction values, an estimated heading correction value for the intermediate point, wherein the step to determine includes steps to:

weight the retrieved heading correction values of the visible light sources by distance from the respective location of the respective visible light source to the intermediate point such that closer visible light sources have a heavier weighting; and average the weighted heading correction values to produce the estimated heading correction value for the intermediate point.

9. The method of claim 8, wherein:

the step to process the one or more images further comprises a step to determine, for each modulated signal, the respective identity of the respective visible light source; and the step to obtain the respective location of the respective visible light source comprises steps to:

transmit, via a wireless interface of the mobile device, the respective identity; and receive, via the wireless interface, the respective location.

10. The method of claim 8, wherein:

the step to process the one or more images further comprises a step to determine, for each modulated signal, the respective identity of the respective visible light source; and the step to obtain the respective location of the respective visible light source comprises a step to retrieve, from the memory and based on the respective identity of the respective visible light source, the respective location of the respective visible light source.

11. A non-transitory tangible computer readable medium embodying instructions to cause a mobile device to perform the method of claim 8-9.

12. A method, comprising steps to:

for each of a plurality of visible light sources located within an interior space for light-based positioning:

capture, via an image sensor of a mobile device, one or more images including a modulated visible light signal transmitted from the respective visible light source;

process the one or more images captured via the image sensor to determine, based at least in part on the modulated visible light signal, an estimated location of the mobile device within the interior space, the estimated location being an intermediate point between the plurality of visible light sources;

capture, via a compass of the mobile device, a raw heading of the mobile device;

obtain a corrected heading estimate based at least in part on the raw heading measurement for the intermediate point, wherein the function to obtain the corrected heading estimate further includes steps to:

for each modulated signal by the respective visible light source:

obtain a respective location of a respective visible light source; and retrieve, based on the respective location of the respective visible light source, a respective heading correction value;

determine, based on the retrieved heading correction values, an estimated heading correction value for the intermediate point, wherein the step to determine includes steps to:

weight the retrieved heading correction values of the visible light sources by an inverse of distance from the respective location of the respective visible light source to the intermediate point; and average the inversely weighted heading correction values to produce the estimated heading correction value for the intermediate point; and transmit, via a wireless interface of the mobile device, the corrected heading estimate and the estimated location of the mobile device.

13. A method, comprising steps to:

for each of a plurality of visible light sources located within an interior space for light-based positioning:

capture, via an image sensor of a mobile device, one or more images including a modulated visible light signal transmitted from the respective visible light source;

process the one or more images captured via the image sensor to determine, based at least in part on the modulated visible light signal, an estimated location of the mobile device within the interior space, the estimated location being an intermediate point between the plurality of visible light sources;

capture, via a compass of the mobile device, a raw heading of the mobile device;

obtain a corrected heading estimate based at least in part on the raw heading measurement for the intermediate point, wherein the function to obtain the corrected heading estimate further includes steps to:

for each modulated signal by the respective visible light source:

obtain a respective location of a respective visible light source; and retrieve, based on the respective location of the respective visible light source, a respective heading correction value;

determine, based on the retrieved heading correction values, an estimated heading correction value for the intermediate point, wherein the step to determine, based on the retrieved heading correction values, an estimated heading correction value for the intermediate point includes steps to:

weight the retrieved heading correction values of the visible light sources by distance from the respective location of the respective visible light source to the intermediate point such that closer visible light sources have a heavier weighting; and average the weighted heading correction values to produce the estimated heading correction value for the intermediate point; and transmit, via a wireless interface of the mobile device, the corrected heading estimate and the estimated location of the mobile device.

* * * * *